(12) United States Patent
Schuck et al.

(10) Patent No.: US 10,049,627 B2
(45) Date of Patent: Aug. 14, 2018

(54) MULTI-PRIMARY BACKLIGHT FOR MULTI-FUNCTIONAL ACTIVE-MATRIX LIQUID CRYSTAL DISPLAYS

(71) Applicant: RealD Inc., Beverly Hills, CA (US)

(72) Inventors: Miller H. Schuck, Erie, CO (US); Gary D. Sharp, Boulder, CO (US); Douglas J. McKnight, Boulder, CO (US); Terry Norton, Denver, CO (US)

(73) Assignee: RealD Inc., Beverly Hills, CA (US)

( * ) Notice: Subject to any disclaimer, the term of this patent is extended or adjusted under 35 U.S.C. 154(b) by 488 days.

(21) Appl. No.: 14/758,943

(22) PCT Filed: Jan. 3, 2014

(86) PCT No.: PCT/US2014/010239
§ 371 (c)(1),
(2) Date: Jul. 1, 2015

(87) PCT Pub. No.: WO2014/107616
PCT Pub. Date: Jul. 10, 2014

(65) Prior Publication Data
US 2015/0339996 A1 Nov. 26, 2015

Related U.S. Application Data

(60) Provisional application No. 61/749,208, filed on Jan. 4, 2013.

(51) Int. Cl.
*F21V 7/04* (2006.01)
*G09G 3/36* (2006.01)
(Continued)

(52) U.S. Cl.
CPC ..... *G09G 3/3648* (2013.01); *G02F 1/133603* (2013.01); *G02F 1/133615* (2013.01);
(Continued)

(58) Field of Classification Search
CPC .............. G02F 1/0105; G02F 1/1335; G02F 1/133509; G02F 1/133514;
(Continued)

(56) References Cited

U.S. PATENT DOCUMENTS

| 5,751,384 A | 5/1998 | Sharp |
| 7,106,509 B2 | 9/2006 | Sharp |

(Continued)

FOREIGN PATENT DOCUMENTS

| CN | 102317845 A | 1/2012 |
| CN | 102738358 A | 10/2012 |

(Continued)

OTHER PUBLICATIONS

International search report and written opinion of international searching authority in co-pending PCT/US2014/010239, dated April 24, 2014.

(Continued)

*Primary Examiner* — Jason Moon Han
(74) *Attorney, Agent, or Firm* — Penny L. Lowry; Neil G. Mothew

(57) ABSTRACT

A direct view display provides a light modulating panel and a backlight including first and second sets of spectral emitters. Several modes of operation may be provided including an advanced 2D mode, and an enhanced color gamut mode employing simultaneous illumination of the first and second set of spectral emitters. Another embodiment may be an optical structure for a multi-functional LCD display with wide color gamut and high stereo contrast. The optical structure may also be used to produce more saturated colors for a wider display color gamut and also may be used to produce a brighter backlight structure through light recycling of the wider bandwidth light back into the optical structure.

18 Claims, 28 Drawing Sheets

(51) Int. Cl.
  *H04N 13/04* (2006.01)
  *G02F 1/1335* (2006.01)
  *G09G 3/00* (2006.01)
  *G09G 3/34* (2006.01)

(52) U.S. Cl.
  CPC ............ *G09G 3/003* (2013.01); *G09G 3/3413* (2013.01); *H04N 13/0431* (2013.01); *G02F 2001/133614* (2013.01); *G02F 2001/133622* (2013.01); *G02F 2001/133624* (2013.01); *G09G 2310/024* (2013.01)

(58) Field of Classification Search
  CPC ............ G02F 1/133524; G02F 1/1336; G02F 1/133603; G02F 1/133609; G02F 1/133614; G02F 1/133615; G02F 1/133621; G02F 2001/133616; G02F 2001/133622; G02F 2001/133624; G09G 3/003; G09G 3/34; G09G 3/3406; G09G 3/3413; G09G 3/342; G09G 3/3426; G09G 3/3648; H04N 13/0431

USPC ... 362/249.02, 608, 611–613, 616, 621–622, 362/800
  See application file for complete search history.

(56) References Cited

U.S. PATENT DOCUMENTS

| | | | |
|---|---|---|---|
| 8,233,034 | B2 | 7/2012 | Sharp et al. |
| 2006/0152931 | A1 | 7/2006 | Holman |
| 2007/0188711 | A1 | 8/2007 | Sharp et al. |
| 2012/0287117 | A1 | 11/2012 | Weber et al. |
| 2012/0287381 | A1 | 11/2012 | Li et al. |

FOREIGN PATENT DOCUMENTS

| | | |
|---|---|---|
| JP | 2008-505444 A | 2/2008 |
| JP | 2010-537254 A | 12/2010 |
| JP | 2012-215827 A | 11/2012 |
| KR | 10-2012-0138809 A | 12/2012 |

OTHER PUBLICATIONS

JP 2015-551791 1st Office Action (translated) dated Sep. 26, 2017.
CN-201480011030.0 Chinese Office Action of the State Intellectual Property Office of P.R. dated Jun. 28, 2017.

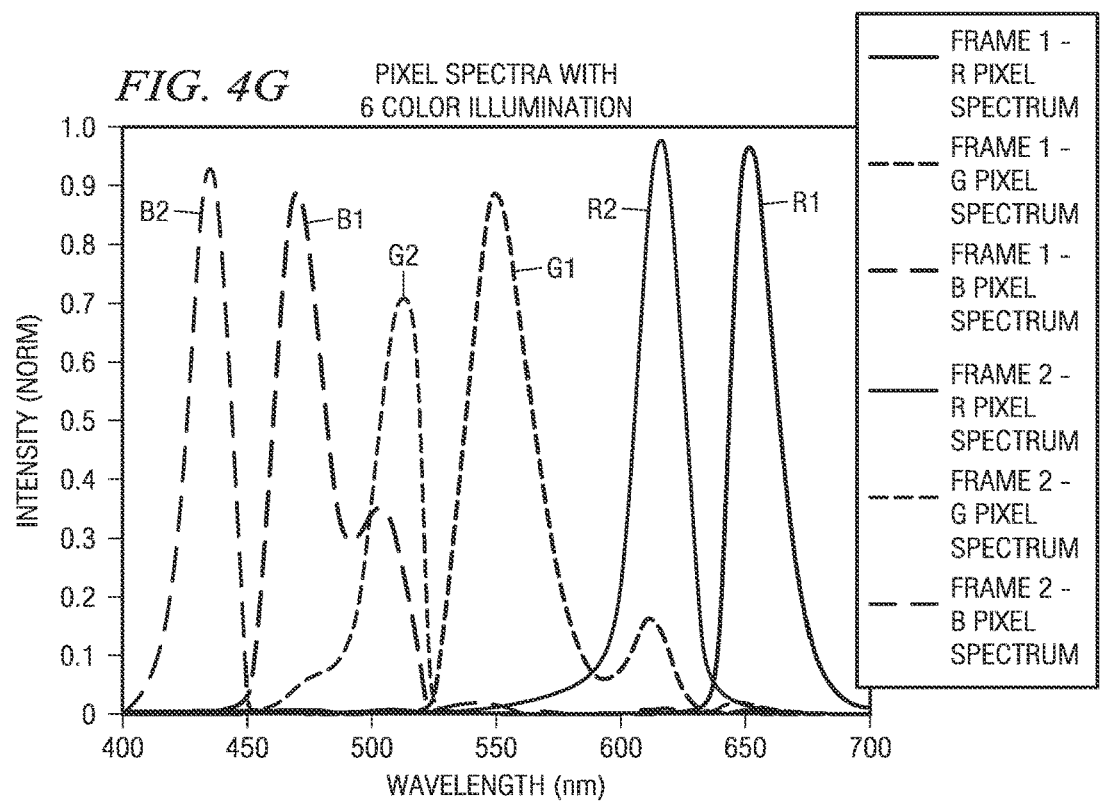
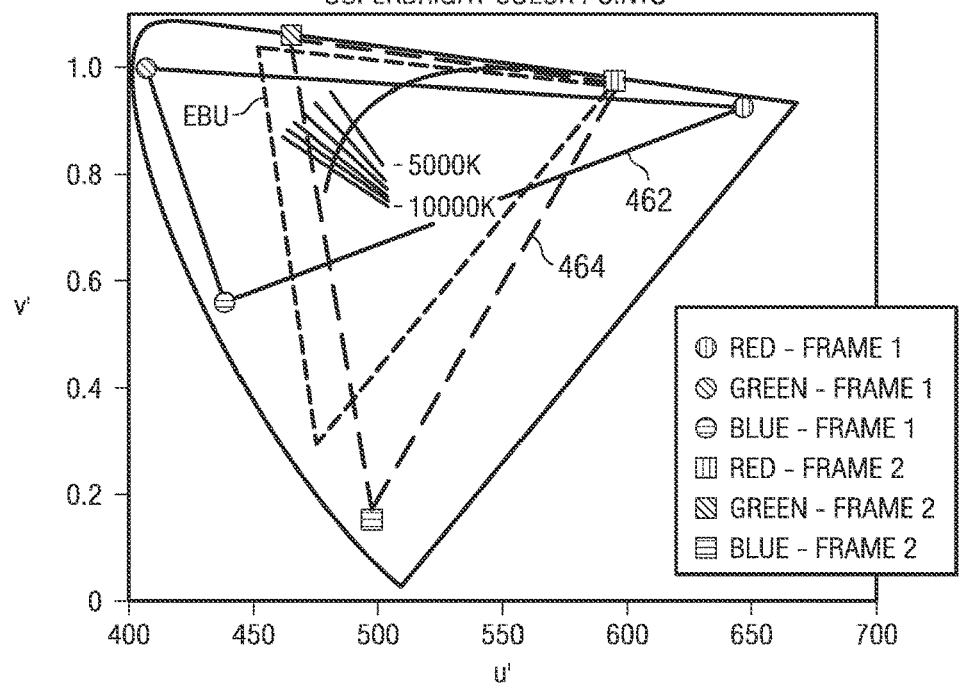

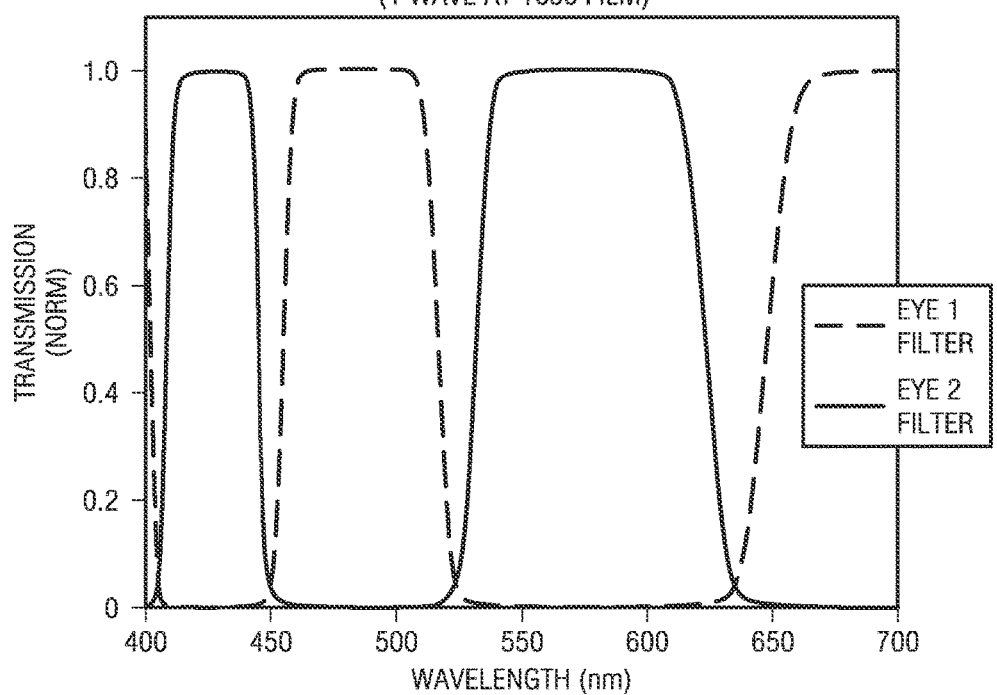
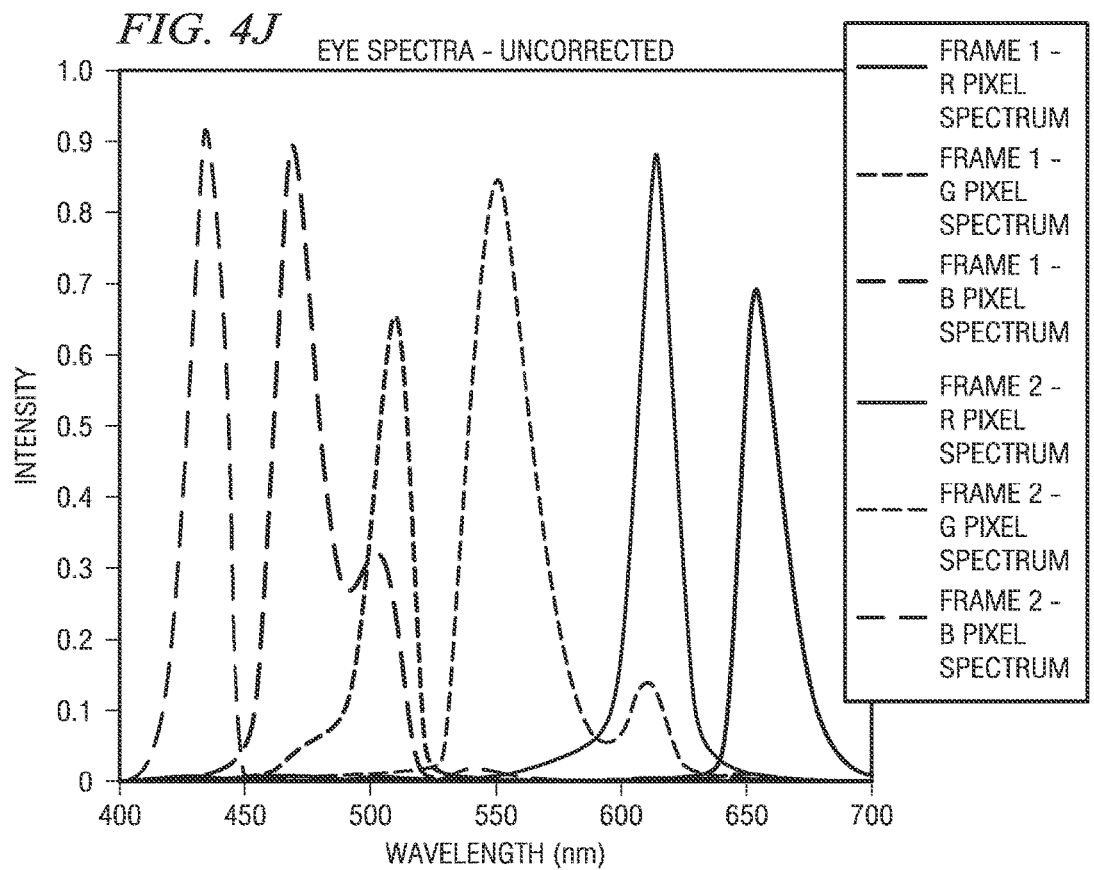

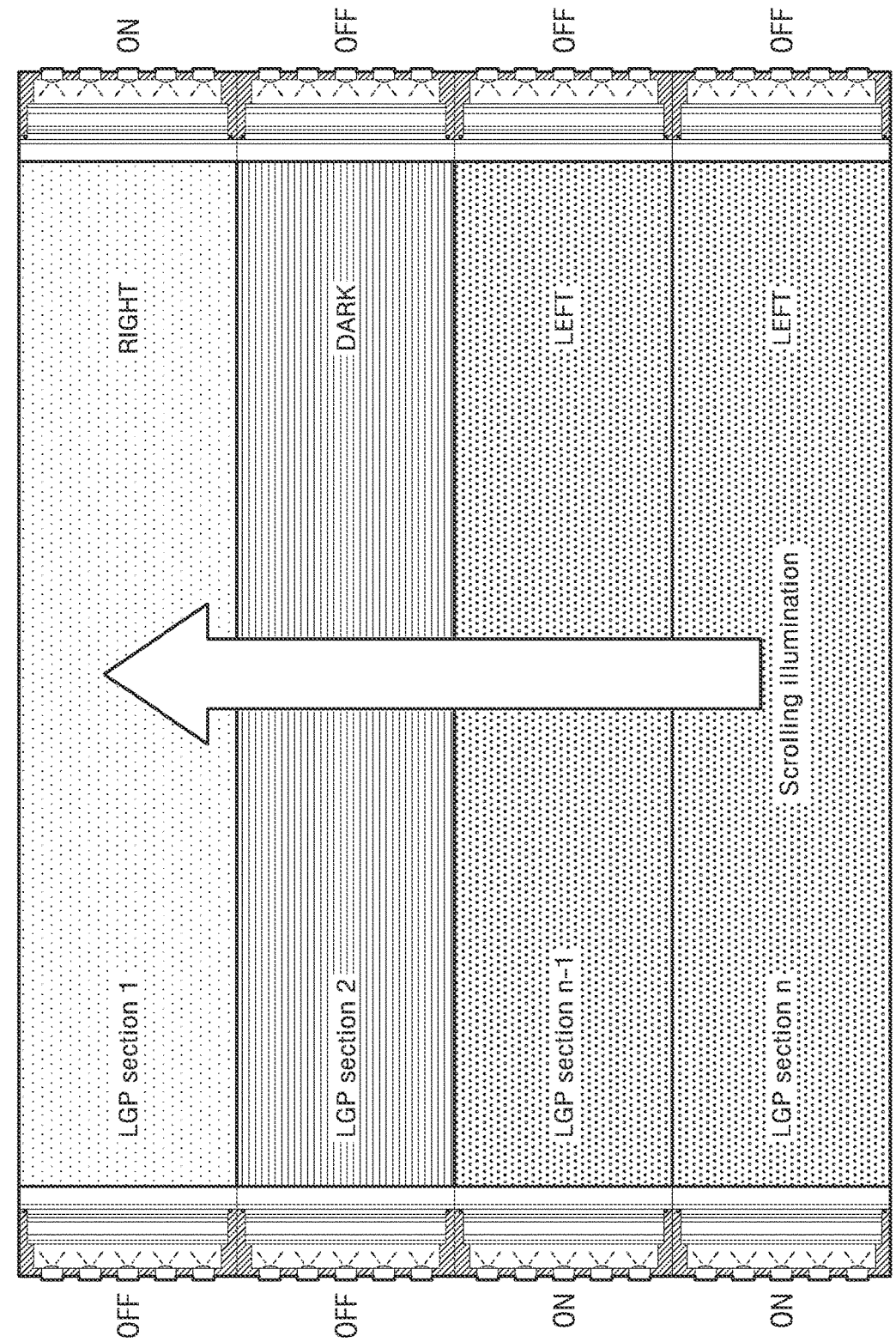

MULTI-PRIMARY BACKLIGHT FOR MULTI-FUNCTIONAL ACTIVE-MATRIX LIQUID CRYSTAL DISPLAYS

CROSS-REFERENCE TO RELATED APPLICATIONS

This application is a non-provisional utility patent application that claims priority to commonly-assigned U.S. patent application Ser. No. 61/749,208, filed Jan. 4, 2013, entitled "Multi-primary backlight for multi-functional active-matrix liquid crystal displays", the entirety of which is herein incorporated by reference.

TECHNICAL FIELD

Disclosed embodiments herein relate generally to direct-view liquid crystal displays (LCDs), and more particularly, to processes, architectures and techniques for achieving improved performance, new applications, and eyewear therefor.

BACKGROUND

Advances in active matrix liquid crystal display (AM-LCD) performance, particularly in television and gaming displays have been achieved by new backlight technology and LCD display driving techniques. For instance, LEDs with improved RGB spectra have shown better gamut/efficiency over displays using conventional cold cathode fluorescent lamps (CCFL).

Multi-primary displays (displays with four or more primary monochromatic light sources) have been demonstrated on several platforms, including projection displays and direct-view AMLCDs. For the former, Jorke teaches a split-path system with a six-primary display using a dual-projector configuration in U.S. Pat. No. 6,698,890. This approach is also used to provide stereo display. Typically, such projection systems are considerably more hardware intensive and compromise the performance (e.g., brightness) attainable with a conventional three-panel projection system.

Lamp-based six-color AMLCDs have also been demonstrated using the hybrid spatial-sequential method. However, gamut enhancement is relatively modest due to the challenges of tailoring the individual lamp emission spectra. In some cases, (non-sequential) enhanced gamut is obtained by simply combining CCFLs with different emission spectra.

There have been demonstrations of 3D using wavelength separation as a means of presenting stereo imagery with a single display. So-called anaglyph displays present the two image views by partitioning the spectrum. Typically, lenses of non-overlapping complementary color (e.g., red and cyan) are used. However, the lack of wavelength selectivity of traditional low-cost (dye) filter technology has prohibited the presentation of full-color information to each eye.

Another anaglyph approach involves filtering of light with greater selectivity, such that non-overlapping spectra presented to each eye provide improved perception of color. In one instance, substantially full color is presented to one eye, with the other receiving a monochrome image. Another technique of multiplexing involves presentation of non-overlapping RGB content to each eye, as taught by Jorke.

SUMMARY

High resolution large screen televisions and flat-screen computer monitors are successfully displacing CRT technology throughout much of the world. The next advancements in display performance will enable yet another level of performance and functionality. In the case of large screen active matrix LCD (AMLCD), technology trends are governed by the requirement of meeting, and even exceeding, the performance achievable with plasma display technology.

The present disclosure provides a direct view display that may operate under one or more modes of operation including (1) an advanced 2D mode, (2) an enhanced color gamut mode using six primary spectral emitters, (3) a privacy screen mode, (4) a dual-image (or channel multiplexed) mode, and (5) a stereoscopic image mode.

The present disclosure additionally provides an optical structure that may be used to produce two sets of colors and which may be used in a stereoscopic backlit liquid crystal display. The optical structure may be used to produce a brighter backlight structure through light recycling of the wider bandwidth light back into the optical structure. The optical structures may be spectrally distinct and may illuminate the same light guide plate. The optical structures may be driven in time-sequential fashion to illuminate the light guide plate in synchrony with left and right eye images sequentially driven to the liquid crystal display panel.

Furthermore, the direct view displays of the present disclosure may overcome performance deficiencies that hamper competitiveness of conventional AMLCD products. In the context of direct-view AMLCD displays, these issues include: (a) motion artifacts due to the image-hold function of the light modulating panel; (b) limited view angle performance; (c) head-on contrast ratio; (d) limited color gamut due to the quality of dyes in color filter arrays, coupled with CCFL lamp spectra, (e) non-optimum power efficiency, due to non-optimum spectrum of CCFL lamps, and (f) environmental concerns regarding mercury in CCFL lamps. Embodiments described herein may address one or more of these performance issues while also providing one or more multi-functional modes. LED backlights may prove beneficial in addressing these issues, as well as gamut enhancement, improved light efficiency, improved contrast, content-dependent dimming, active color temperature control, and sequential color operation.

Examples of methods, processes, architectures and techniques are disclosed herein, but other methods, processes, architectures and techniques can be used without departing from the spirit and scope of the present disclosure.

BRIEF DESCRIPTION OF THE DRAWINGS

Embodiments are illustrated by way of example in the accompanying figures, in which like reference numbers indicate similar parts, and in which:

FIG. 4G is a graph showing the resulting six primary color spectra of FIG. 4F, given as the product of a particular white input spectrum with each of the Color Filter Array spectra, in accordance with the present disclosure;

FIG. 4H is an EBU graph showing first and second light output sets corresponding to the spectral emitters referenced in FIG. 4G, as defined by first and second RGB triangles in a modified color space (u', v'), in accordance with the present disclosure;

FIG. 4I is a graph illustrating transmission profiles for an embodiment including first and second polarization interference filters for viewing respective first and second images illuminated with respective first and second sets of spectral emitters, in accordance with the present disclosure;

FIG. 4J is a graph showing raw spectra from the spectral emitters transmitted to each eye through the aforementioned polarization interference eyewear of FIG. 4I in accordance with the present disclosure;

FIG. 20 is a schematic diagram illustrating an embodiment of a stereoscopic scrolling backlight structure, in accordance with the present disclosure.

DETAILED DESCRIPTION

Figure 1:
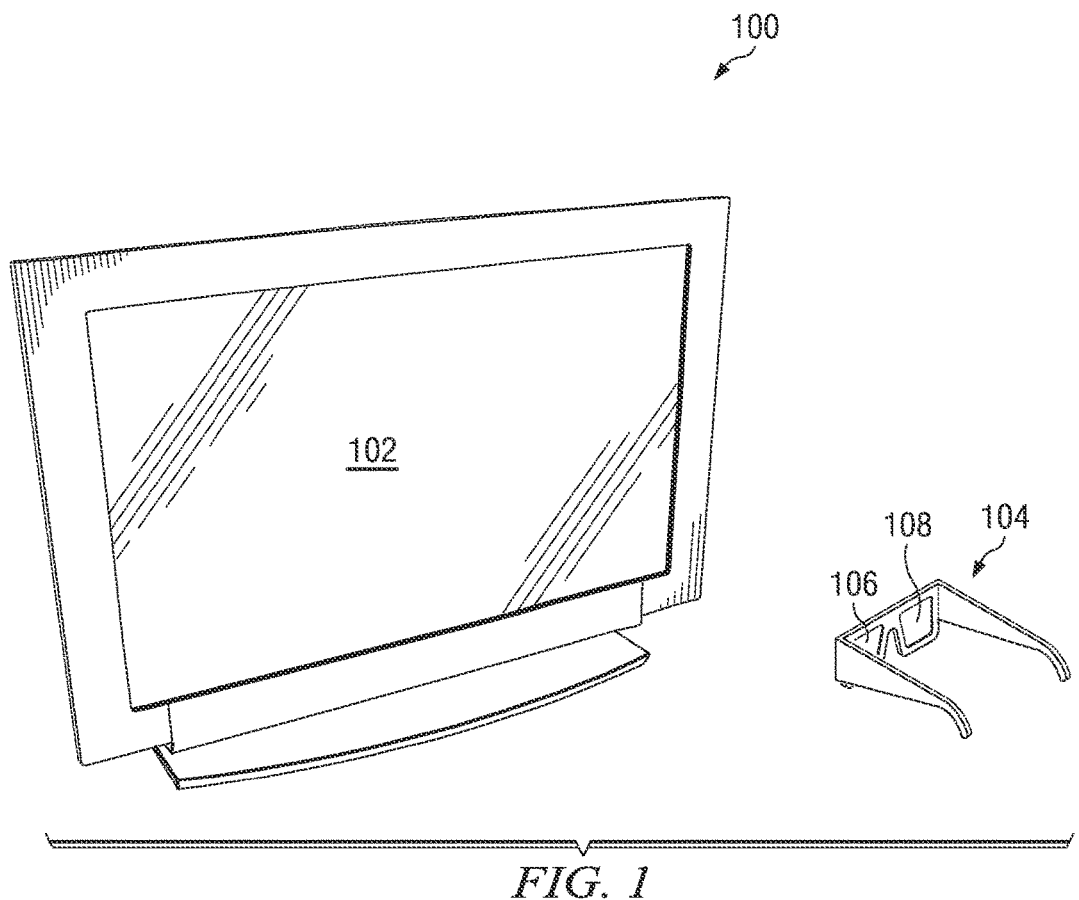
FIG. 1 is a schematic diagram illustrating a direct-view display system in accordance with the present disclosure.

FIG. 1 is a schematic diagram illustrating a direct-view display system 100. The direct-view display system 100 includes a direct view display 102 and, for viewing some modes, eyewear 104. Eyewear 104 includes left eye and right eye filters 106, 108 respectively. Left and right eye filters 106, 108 may include retarder stacks for decoding first and second light bundles emitted from the direct view display 102.

The direct view display 102 may operate under several modes of operation including (1) an advanced 2D mode, (2) an enhanced color gamut mode using six primary spectral emitters, (3) a privacy screen mode, (4) a dual-image (or channel multiplexed) mode, and (5) a stereoscopic image mode. In the enhanced color gamut mode, eyewear 104 is not needed. In modes two through four, eyewear 104 may be used to decode an image on the direct-view display 102. As will be appreciated with reference to the following description, filters 106, 108 may have different configurations to decode images in accordance with a mode of operation.

Figure 2:
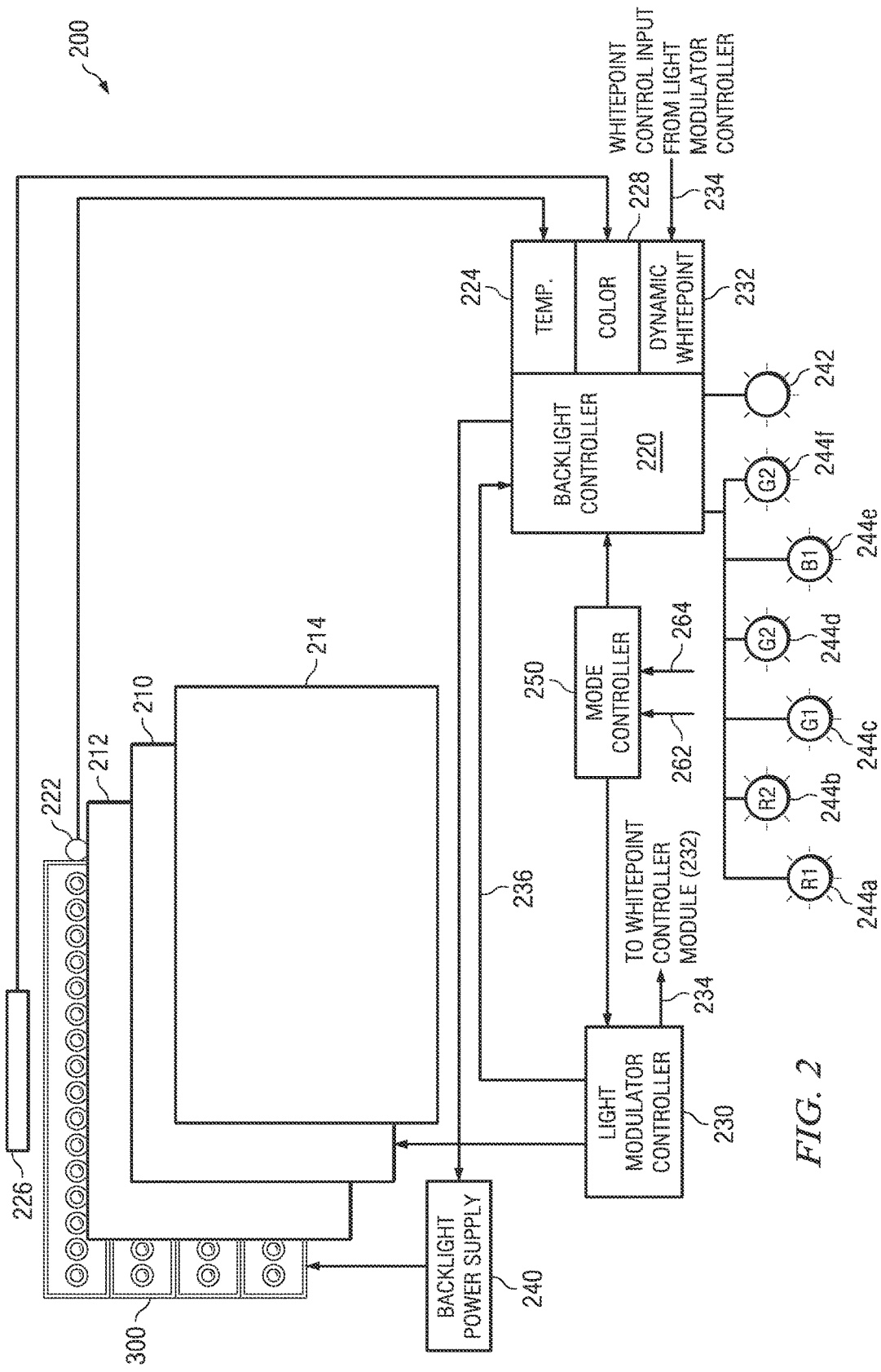
FIG. 2 is a schematic diagram illustrating a direct-view display system in accordance with the present disclosure.

FIG. 2 is a schematic diagram illustrating a direct-view display 200. The direct-view display 200 includes a backlight 300, a light modulating panel 210, a backlight controller 220, a light modulator controller 230, a backlight power supply 240, and a mode controller 250.

When partitioning the spectrum, display performance metrics may include the white point (and matching of white point between first and second sets of spectral emitters), the color gamut (and matching of color coordinates between first and second sets of spectral emitters), and the lumens available from the first and second sets of spectral emitters. Such display performance involves complex analysis, that may include visual perception, hardware for display imagery, the actual content, and software corrections to improve matching between the output for the first and second sets of spectral emitters. Accordingly, temperature control of the backlight 300 may be provided via temperature sensor 222 coupled to temperature feedback module 224. Whitepoint, brightness and color control parameters may be managed by backlight controller 220, which includes feedback for such parameters via color sensor 226 and optical feedback module 228. Backlight controller 220 may provide control signals to backlight power supply 240, which provides current to spectral emitters in backlight 300. Brightness control 242 and respective color controls 244a-f may also provide an input to backlight controller 220 for adjustment of display brightness and respective color intensity. Whitepoint control input may be received by whitepoint controller module 232 over line 234 from light modulator controller 230. Backlight control input may be received by backlight controller module 220 over line 236 from light modulator controller 230.

In this embodiment, mode selection is controlled via mode controller 250, which may switch first and second input video signals 262, 264 and provide signals to the light modulator controller 230 and backlight controller 220 in accordance with the selected mode. For example, in the advanced 2D mode and the enhanced color gamut mode, a single video signal is input to the mode controller 250. In channel multiplexed mode and the stereoscopic image mode, two video signals 262, 264 are input to the direct view display 200. In the privacy screen mode, a single video signal 262 may be input into the direct view display for a first image, while the second image is synthesized by an image generating function in the mode controller 250. Image processing functions may be performed by mode controller 250 and/or light modulator controller 230. As shown, entrance polarizer 212 and exit polarizer 214 may be located on either side of light modulating panel 210, respectively. Thus, direct-view display 200 outputs polarized light to a viewer.

Figure 3:
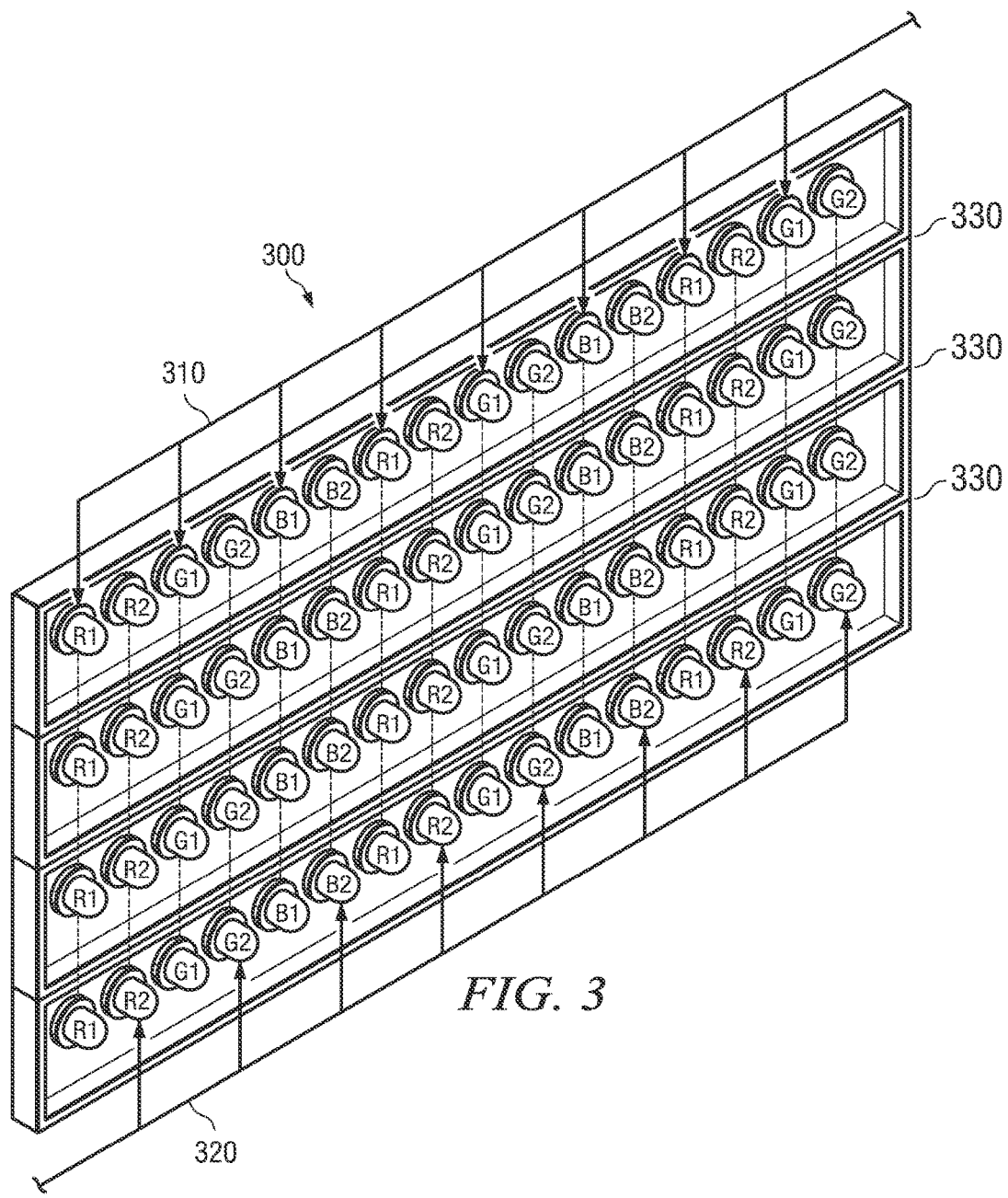
FIG. 3 is a schematic diagram illustrating an embodiment of an LED-based scanning backlight, in accordance with the present disclosure.

FIG. 3 is a schematic diagram illustrating an embodiment of LED-based scanning backlight 300. Backlight 300 includes a first set of spectral emitters 310 and a second set of spectral emitters 320. As shown by this embodiment, optically separated sub-arrays may be formed using boundary structures 330.

In an embodiment, the first set of spectral emitters 310 are operable to output narrow transmission ranges R1, G1, B1; and the second set of spectral emitters 320 are operable to output narrow transmission ranges R2, G2, B2. As shown, the spectral emitters may be arranged in rows, with columns alternating between first and second set emitters 310, 320 (e.g., in the sequence R1, R2, G1, G2, B1, B2, . . . , R1, R2, G1, G2, B1, B2), however, it should be apparent that alternative sequences and physical configurations of spectral emitters may be employed in other embodiments. Care should be taken to control homogeneity in illumination in the vicinity of the boundary structures 330. Uniform brightness and hue depend upon the extent of any physical gap between sub-arrays, the matching of LED luminance and chrominance in the sub-arrays, and the timing in the driving of the sub-arrays.

The ability of the human eye to distinguish colors is based upon the varying sensitivity of different cells in the retina to light of different wavelengths. The retina contains three types of color receptor cells, or cones. One type, relatively distinct from the other two, is most responsive to light that we perceive as violet, with wavelengths around 420 nm. (Cones of this type are sometimes called short-wavelength cones, or S cones). The other two types are closely related genetically and chemically. One of them (sometimes called long-wavelength cones, or L cones) is most sensitive to light we perceive as yellowish-green, with wavelengths around 564 nm; the other type (sometimes called middle-wavelength cones, or M cones) is most sensitive to light perceived as green, with wavelengths around 534 nm.

Figure 9:
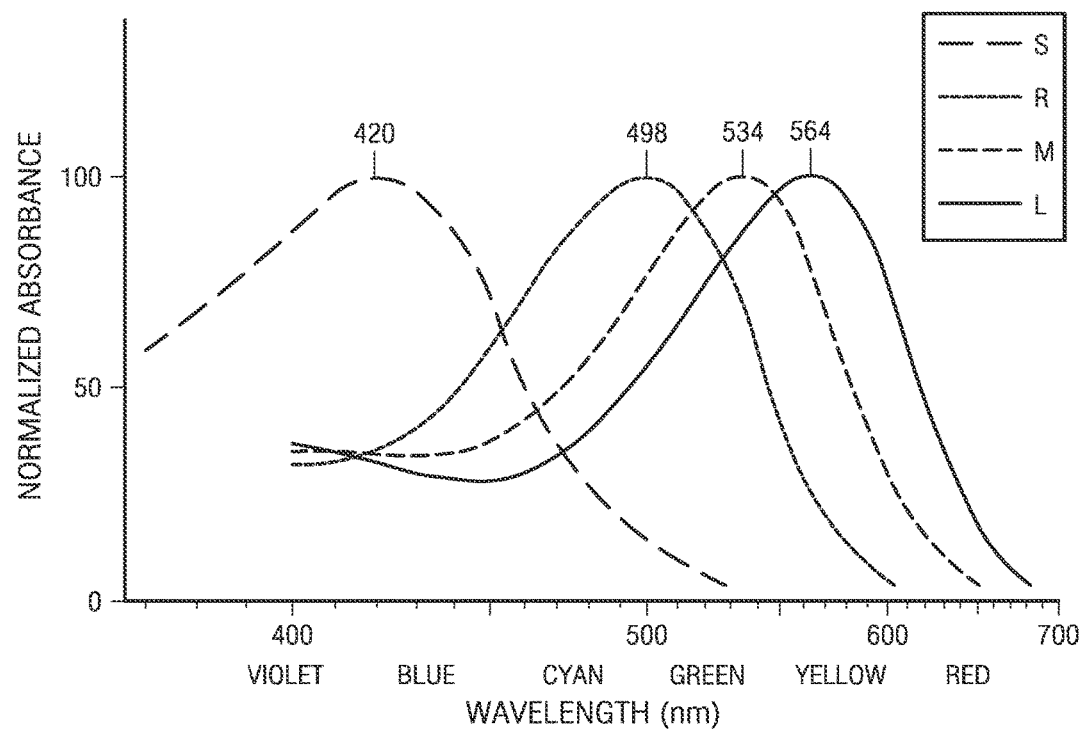
FIG. 9 is a graph showing tristimulus curves describing the spectral sensitivity of three retinal sensors in a typical eye.

Light, no matter how complex its composition of wavelengths, is reduced to three color components by the eye. For each location in the visual field, the three types of cones yield three signals based on the extent to which each is stimulated. These values are called tristimulus values. The response curve as a function of wavelength for each type of cone is illustrated in FIG. 9. Because the curves overlap, some tristimulus values do not occur for any incoming light combination. For example, it is not possible to stimulate primarily the mid-wavelength/"green" cones; the other cones will inevitably be stimulated to some degree at the same time. The set of all possible tristimulus values determines the human color space. It has been estimated that humans can distinguish roughly 10 million different colors.

Generally, the R1 and R2 narrow transmission ranges lie substantially within the sensitive wavelengths of the L-cone receptors in a human eye (as illustrated by FIG. 9); the G1 and G2 narrow transmission ranges lie substantially within the sensitive wavelengths of the M-cone receptors in the human eye; and the B1 and B2 narrow transmission ranges lie substantially within the sensitive wavelengths of the S-cone receptors in the human eye. As used herein, the term "transmission ranges" refers to the output spectra from a spectral emitter, whether direct or as a product of a spectral emitter through a color filter array.

Figure 4A:
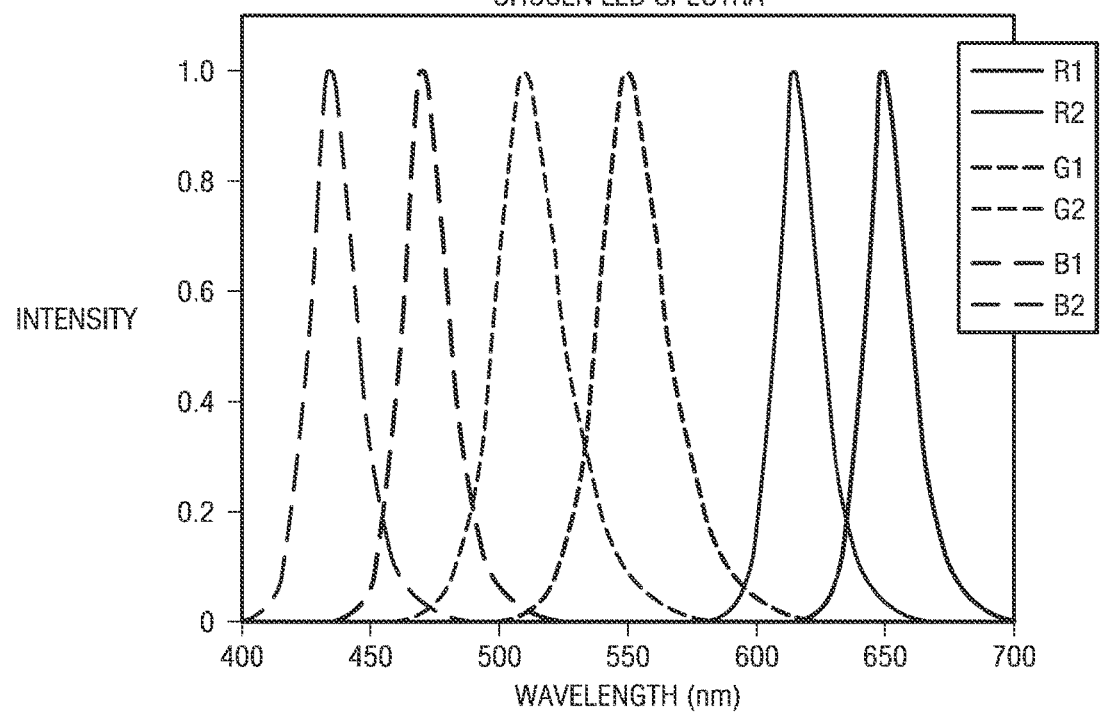
FIG. 4A is a graph showing intensity against wavelength for first and second sets of spectral emitters, in accordance with the present disclosure.

FIG. 4A is a graph showing intensity against wavelength for first and second sets of spectral emitters. The LED spectra for the first and second sets of spectral emitters (R1, R2, G1, G2, B1, B2) are scaled to unity peak emission. The center wavelengths are selected so as to provide a high degree of spectral separation, thereby enabling the disclosed modes of operation with little loss of light in the partitioning process. Such separation is also beneficial in maximizing the gamut area for the enhanced color gamut mode as well.

Figure 4B:
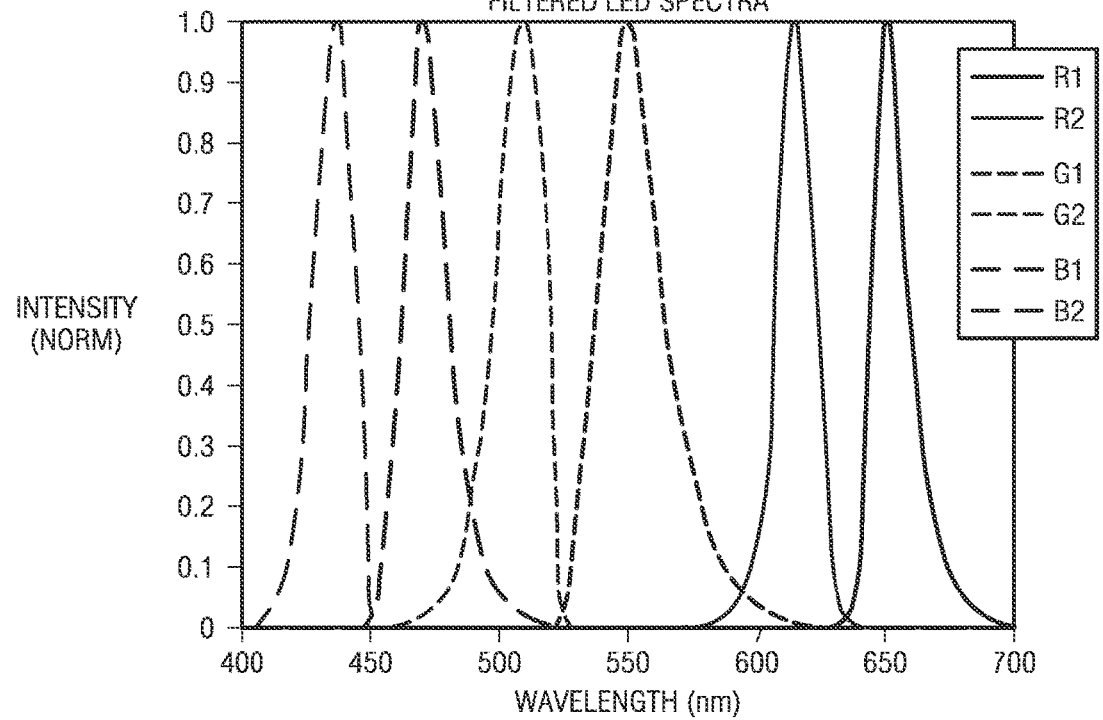
FIG. 4B is a graph showing intensity against wavelength for filtered first and second sets of spectral emitters, in accordance with the present disclosure.

FIG. 4B is a graph showing intensity against wavelength for filtered first and second sets of spectral emitters. In this embodiment, the first set narrow transmission ranges (R1, G1, B1) are substantially non-overlapping with the second set narrow transmission ranges (R2, G2, B2). As used herein, the term "substantially non-overlapping" refers to most of the spectral emission being independent of an adjacent emission from another spectral emitter, such that cross talk between channels is preferably minimized. It should be appreciated by a person of ordinary skill in the art that using some off-the-shelf non-ideal spectral emitter technology, some spectral overlap may be present, for instance between channels B1 and G2, and channels G1 and R2, as shown by FIG. 4B. However, care should be taken in selection of spectral emitters (and in some embodiments, spectral filters) to minimize such cross-talk between spectral emitter channels. By careful selection of center wavelengths for spectral emitters, optimized color coordinates with enhanced gamut may be obtained. It will be appreciated that other types of spectral emitters such as lasers and super resonant LEDs have a narrower transmission range than typical LED structures, thus will be less likely to have spectral ranges that 'overlap.' With sufficient "non-overlapping" wavelength separation, the demands placed on the eyewear 104 for efficient separation of imagery of first and second spectral light sets may be relaxed. This can be contrasted with conventional UHP lamp spectra, which may use significant auxiliary filtering to accomplish similar performance, representing additional cost, and loss in light efficiency.

As shown in FIG. 4B, notches ideally exist both between short/long primary emission bands (for example, B2/B1, G2/G1, R2/R1), as well as emission bands of the other primary colors. This separation is preferably maximized, with the understanding that the color coordinates should be acceptable and remain within a reasonable photopic sensitivity range (e.g., the short blue emission B2>430 nm; the long red emission R1<660 nm) for efficiency reasons. Such separation may accomplished directly, though additional filtering that may be incorporated into the spectral emitter (for example, LED) package to provide adequate color performance of the display. This may include filters that eliminate reject light, or filters incorporated into the emitting structure (e.g., Bragg reflectors) that redirect light back to the light generating medium. This filtering may have little influence on efficiency, provided that the main emission lobe is substantially captured, and the tail of the emission is attenuated. The tail can be relatively broad, and while it contains relatively little power, it can have significant impact on ghost images when operating in stereo-mode. Such tail emission contributes directly to cross-talk and is independent of the performance of the eyewear 104. This is because it occurs at wavelengths at which the eyewear transmission should be high to ensure efficient transmission of the corresponding image.

Figure 4C:
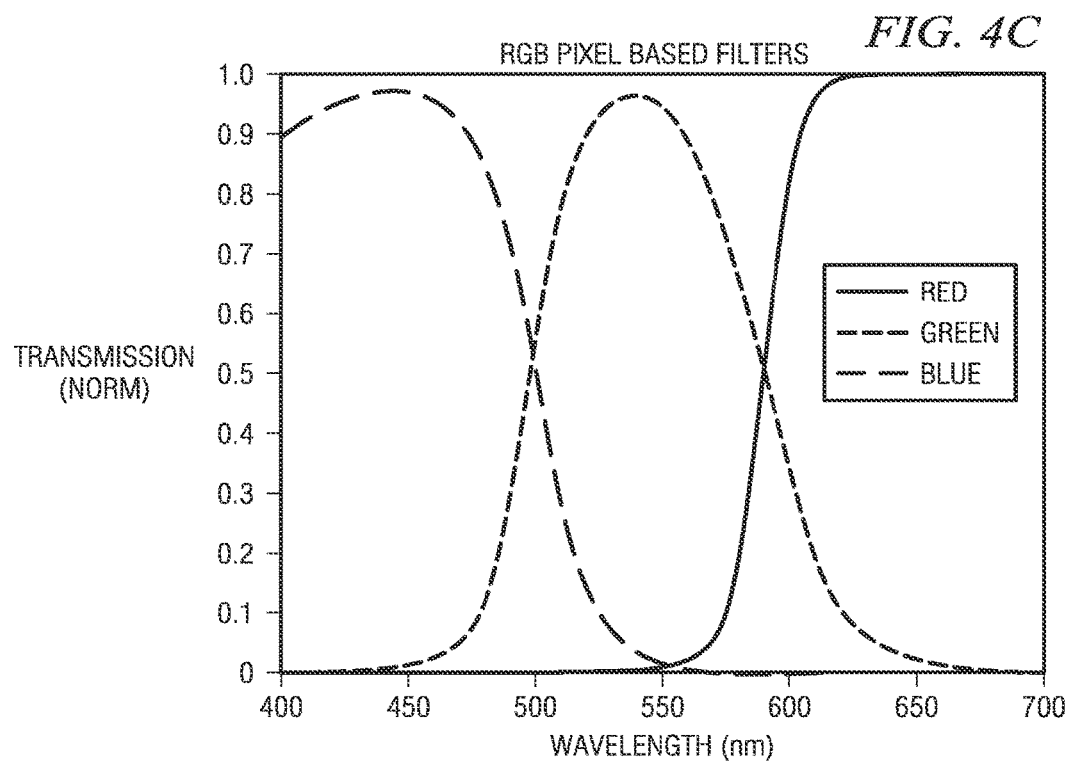
FIG. 4C is a graph showing scaled spectra for an RGB color filter array incorporated into a light modulating panel, in accordance with the present disclosure.

FIG. 4C is a graph showing scaled spectra for an RGB color filter array incorporated into a light modulating panel. Each profile preferably provides high throughput to the corresponding set of LED (or other spectral emitter) emission bands (e.g., R1R2), while simultaneously providing high density blocking of the remaining four primaries (e.g., G1G2B1B2) to maximize saturation. When operated in the enhanced color gamut mode, the product of a CFA spectrum, with the corresponding set of emission bands preferably provides an acceptable color coordinate, while simultaneously providing high throughput. Moreover, the transition slope and stop-band blocking density are sufficient that leakage of the remaining four primary emission bands does not unacceptably desaturate the color coordinate. In one disclosed embodiment, referring back to FIG. 4C, the color filter array spectra are tailored to the specific center wavelengths of the spectral emitter emission bands. For instance, an AMLCD illuminated by a particular set of R1G1B1 primaries, produces greatest saturation of, say, B1, when the blue filter of the color filter array (CFA) provides high optical density absorption of the remaining R1G1 emission. Similarly, the greatest saturation of G1 occurs when the green filter of the CFA provides high optical density absorption of the remaining (R1B1) emission, and so on. When the alternate set of primary bands is displayed, a similar argument applies.

Since dye filters typically used for the CFA have limited transition slopes (as well as blocking density versus throughput), the careful selection of center wavelengths of the primary bands are important to the saturation of the resulting color coordinates. Since six bands are packed into the same wavelength range, enjoying maximum gamut enhancement may be limited by the CFA spectral performance.

Figure 4D:
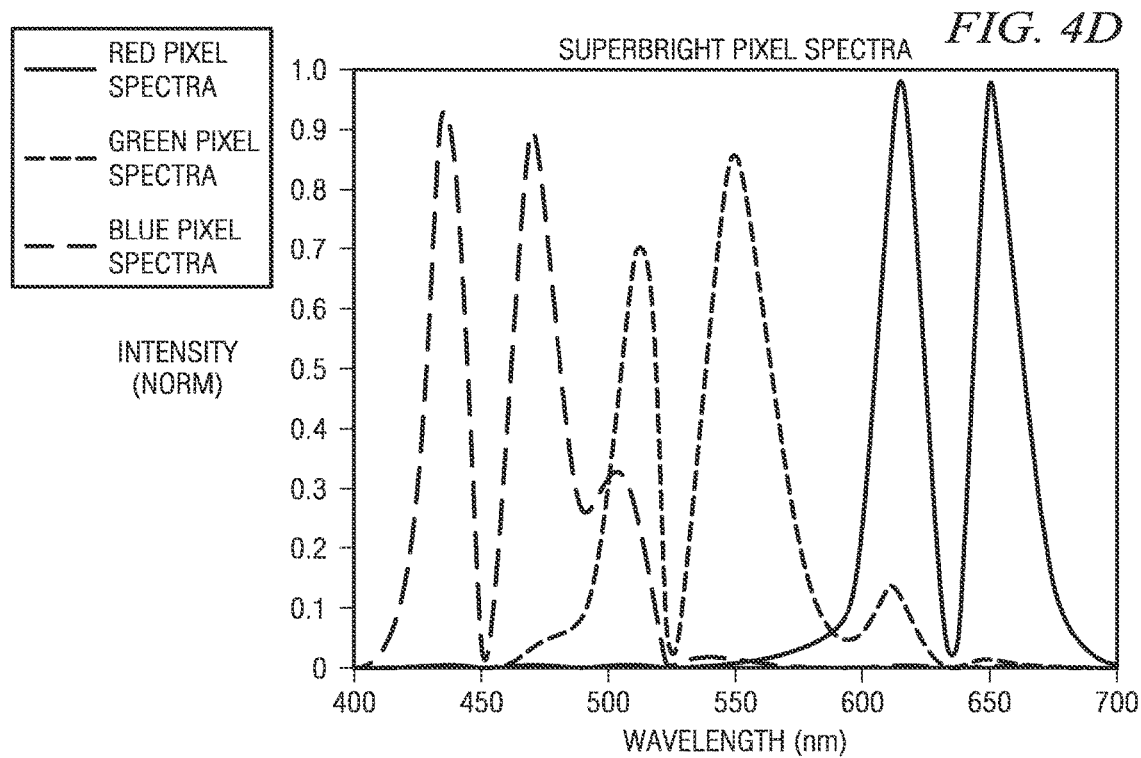
FIG. 4D is a graph showing spectra of first and second sets of spectral emitters through a color filter array in accordance with the present disclosure.
Figure 4E:
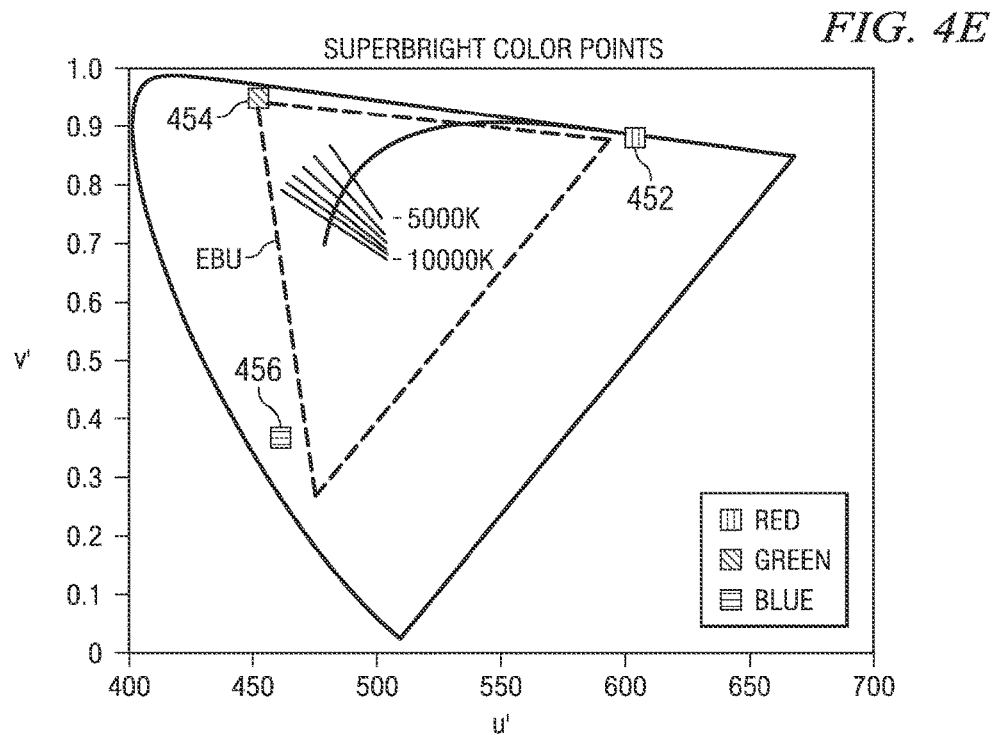
FIG. 4E is an EBU graph showing a light output set defined by an RGB triangle in a modified color space (u', v'), in accordance with the present disclosure.

FIG. 4D is a graph showing spectra of first and second sets of spectral emitters through a color filter array. The corresponding color coordinates, are represented by points 452, 454, 456 in FIG. 4E, which is an EBU graph showing a light output set defined by an RGB triangle in a modified color space (u', v'). Some reduction in the short green (for example, G2) emission may be warranted in order to further saturate the long blue primary (for example, B1).

Figure 4F:
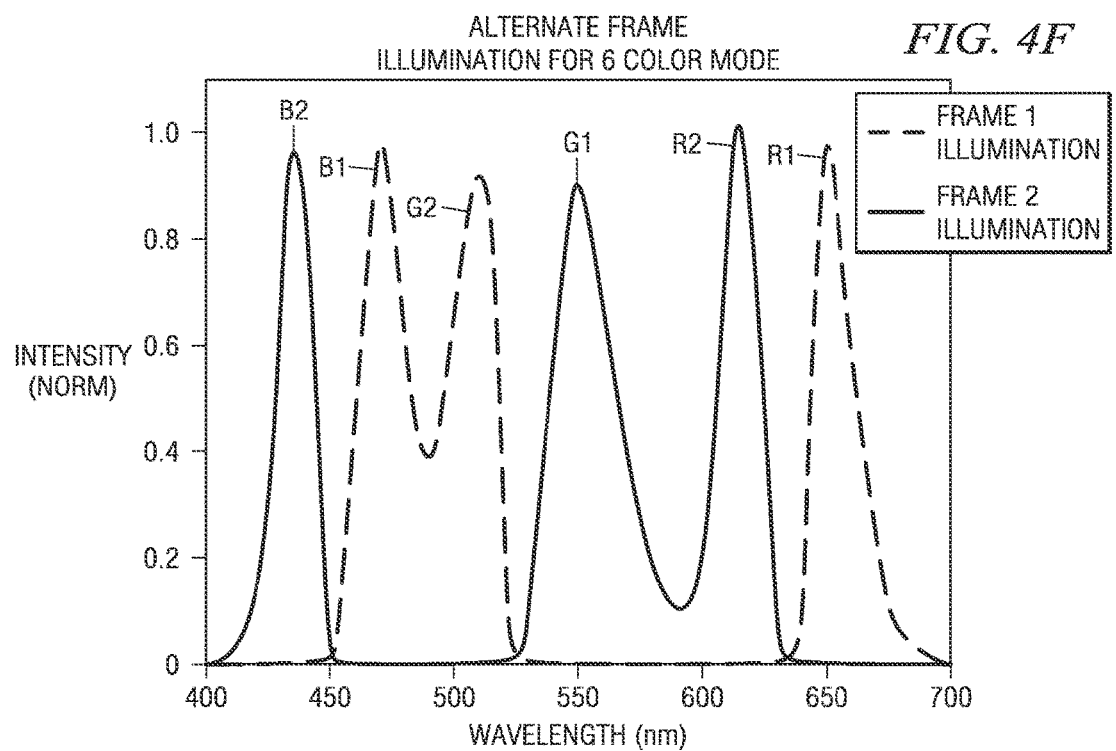
FIG. 4F is a graph showing intensity against wavelength for first and second sets of spectral emitters, in accordance with the present disclosure.

Using six primary spectral emitters, there are four possible groupings of primary bands. For example, although the first spectral emitter set is described in an embodiment as R1G1B1, and the second spectral emitter set is described in an embodiment as R2G2B2, other combinations of spectral emitters are feasible. FIG. 4F shows another combination, corresponding to a first spectral emitter set (R2G1B2) and a second spectral emitter set (R1G2B1). This graph shows the sequential white illumination spectra that are input to the panel. Alternative groupings for spectral emitter sets include R1G1B2/R2G2B1 and R2G1B1/R1G2B2.

FIG. 4G shows the resulting six primary color spectra of FIG. 4F, given as the product of a particular white input spectrum with each of the Color Filter Array spectra (shown in FIG. 4C). The corresponding color coordinates are shown in FIG. 4H, which is an EBU graph showing first and second light output sets corresponding to the spectral emitters referenced in FIG. 4G, as defined by first and second RGB triangles in a modified color space (u', v'). Here, a first set of spectral emitters provides a first light bundle defined by a first RGB triangle 462 of an EBU color gamut diagram, and the second set of spectral emitters provide a second light bundle defined by a second RGB triangle 464 of the EBU color gamut diagram including colors outside the first RGB triangle, such that the enhanced display mode provides an enhanced color gamut to that produced by one light bundle.

In principle, a display operating at 120 Hz will produce a time-averaged output, so the actual grouping is not critical to performance. A time-averaged brightness and white point will result. Subtleties that can come into play include the details of the overlap of spectra in determining the saturation of the primaries. For instance, it may be preferable to group (B2G2) and (B1G1) in order to minimize the constraints on the CFA in separating the blue and green primaries. In addition, it may be beneficial to match the luminance of the white output spectra, in order to mitigate any flicker effects.

In principle, the grouping used to implement multi-primary display can differ from that used in stereo mode. It simply depends upon practical issues regarding flexibility incorporated into the backlight for individually addressing the LEDs.

In stereo mode, substantially non-overlapping spectral filters are used to decode first and second images for left and right eyes respectively. FIG. 4I is a graph illustrating transmission profiles for an embodiment including first and second polarization interference filters for viewing respective first and second images illuminated with respective first and second sets of spectral emitters. An image for the left eye is provided via a retarder stack, with a first duty ratio, followed by an analyzing polarizer that is parallel to the LCD polarizer. An image for the right eye is provided via a retarder stack with a second duty ratio, followed by an analyzing polarizer that is crossed with the LCD polarizer. Note that the parallel/crossed arrangement, with identical film retardance used in each stack, ensures that the spectral overlap point is fixed by the relative duty ratio of the designs.

Figure 4K:
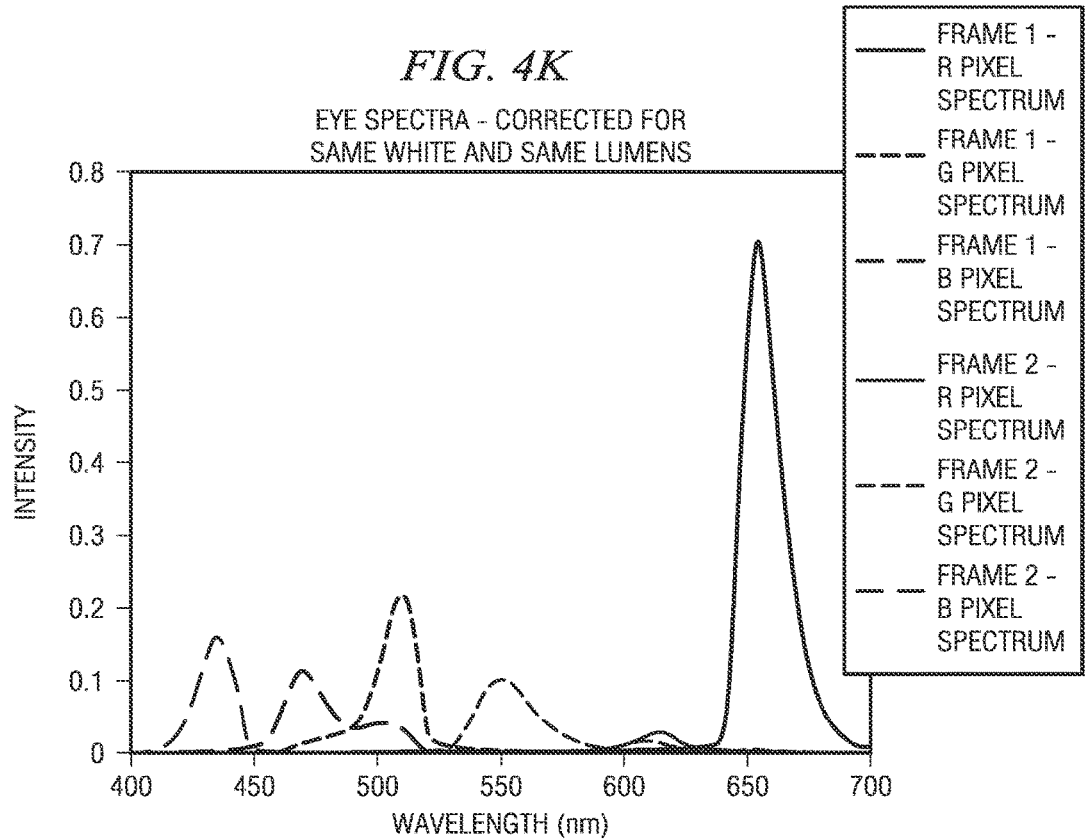
FIG. 4K is a graph showing a scaled version of the FIG. 4J spectra, adjusted to achieve balanced white lumens and color in each eye in accordance with the present disclosure.

FIG. 4J shows the raw spectra from the spectral emitters transmitted to each eye through the aforementioned polarization interference eyewear of FIG. 4I. FIG. 4K shows the scaled version of the FIG. 4J spectra, adjusted to achieve balanced white lumens and color in each eye. A technique for optimizing eyewear filter designs to achieve balanced white lumens and color in each eye involves maximizing net brightness after suitable color correction. Acceptable color corresponds to each eye seeing acceptable primary colors (RGB) with a corrected full white (D65). The brightest channel can then be attenuated to allow for matched left eye/right eye brightness. Under these conditions, each eye can be made to experience effectively the same primary color hues by selectively adding small proportions of two display primaries into an oversaturated third.

Figure 4L:
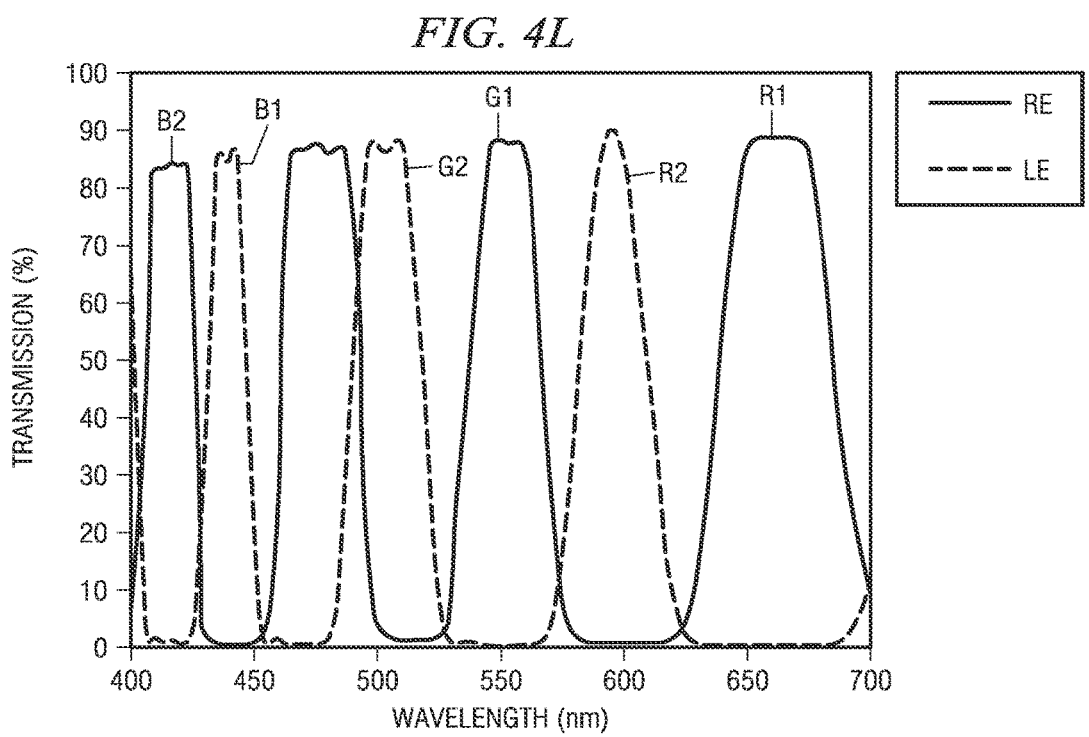
FIG. 4L is a graph illustrating transmission profiles for another embodiment including first and second polarization interference filters for viewing respective first and second images illuminated with respective first and second sets of spectral emitters, in accordance with the present disclosure.

FIG. 4L is a graph illustrating transmission profiles for another embodiment including first and second polarization interference filters for viewing respective first and second images illuminated with respective first and second sets of spectral emitters. In this embodiment, a first filter's transmission spectrum allows a first light bundle (R1,G1,B2) to be transmitted, and a second filter's transmission spectrum allows a second light bundle (R2,G2,B1) to be transmitted. In accordance with the present disclosure, the first filter blocks the spectral frequencies of the second light bundle, and the second filter blocks the spectral frequencies of the first light bundle.

Types of Spectral Emitters

As mentioned earlier, various types of spectral emitters may be used to provide backlight illumination for a direct-view display in accordance with the present disclosure. While LEDs are described throughout as the spectral emitters used in the described embodiments, consistent with the present disclosure, other suitable spectral emitters may be used such as lasers and super resonant LEDs (or sub-threshold lasers). Such spectral emitters provide several benefits in implementing next-generation displays, including narrow spectral emission, rapid modulation, convenient packaging in sub-arrays, long lifetime—and being mercury free, they are more environmentally acceptable than CCFLs. The aforementioned spectral emitters provide operational advantages with regard to rapid modulation. Since the response time of an LED is mainly limited by the driver (typically microseconds), pulsing can be used to optimize power efficiency/thermal management, and manage temporal artifacts of the modulating panel. Other benefits, such as content-dependent dimming, and active color temperature control may be feasible due to the independence in electronic control of the synthesized spectrum. In addition, LEDs lend themselves to building sub-arrays or packaged clusters for implementing scanning-backlight systems, which advantageously provide minimized temporal artifacts. Further, the long lifetime typical of most LEDs, and their mercury free construction provide advantages over conventional CCFL technology. The above features provide initiative for a migration from Cold Cathode Fluorescent Lamps (CCFL) to backlight systems with spectral emitters (for example, LEDs, super resonant LEDs, and lasers), particularly for high performance video.

Spectral emitters suitable for the above functions can take many forms. For example, organic light emitting diode (OLED) stripes can be patterned and or stacked on a substrate in a periodic fashion (e.g., R1,R2,G1,G2,B1,B2). In some embodiments, the spectral emitter sets 310, 320 may be directly optically coupled to the light modulating panel 202, while in other embodiments, the spectral emitter sets 310, 320 may be optically coupled to the light modulating panel 202 via optically transmissive components that include light guides, light pipes, fiber optics, reflectors, wave guides, et cetera. Such optically transmissive components may be plastic, glass, silica on silicon-based, or a combination thereof. Discrete LEDs can also be packaged in linear arrays mounted directly behind the panel, or coupled into light guides from one or more edges. Techniques for providing uniform illumination of the modulating panel are well known, using edge illumination and light guides, or arrays of LEDs mounted behind the panel.

Addressing Problems with Motion Artifacts in LCD Displays

The representation of motion has heretofore been an issue with conventional LCD displays. Contributing factors include, first, the response of typical LCD panels being too slow, and second, the hold-time effect of a display. With regard to the first factor, in conventional LCD displays, a TFT panel is addressed in a scrolling row-by-row fashion. Once an electric field is applied across the LC layer, several milliseconds are required for the LC material to reorient between states representing the gray level difference between consecutive images. During continuous illumination, a moving object can thus appear to have a poorly defined location during this transition, resulting in a perception of image smearing. One technique to reduce this motion artifact problem involves developing faster switching LC materials, alignment recipes and structures (e.g. multi-domain) and addressing schemes (e.g. overdrive).

It is known, however, that a hold-type display operating at 60 Hz will demonstrate perceived image blurring under any circumstances. At certain spatial frequencies, there is an almost complete loss in perceived contrast that occurs even when infinitely fast switching LC is assumed. To combat this problem, redesigns in the panel are underway in the industry to operate at 120 Hz. At such frequencies, alternate images may be inserted via on-the-fly interpolation between bracketing images. Such measures are difficult and expensive, but they also enable some multi-functional displays by allowing, for example, flicker-free stereo display.

Perceived blurring from the hold-type displays notwithstanding, faster LC switching is also desirable for reducing motion artifacts. Presently, panel response time has improved significantly, with 4 ms being fairly standard in high-end displays. This will undoubtedly improve incrementally over time. Such switching speed is also desirable for realizing multifunctional displays in accordance with the present disclosure.

Addressing the hold-time effect, other techniques that mitigate motion artifacts involve modulating the illumination. Sluyterman et al. teach the use of a CCFL with black frame insertion to reduce motion blurring. However, this technique using CCFLs introduces serious problems. While CCFLs can in principle be used to eliminate light loss/efficiency issues, another problem exists: Operation at 60 Hz with black frame insertion introduces flicker.

Considering the above-referenced limitations connected with finite LC switching, the scanning function using spectral emitters disclosed herein may be desirable to optimize the timing of illumination, such that the illumination follows the panel addressing. A scrolling black band can minimize, if not eliminate the appearance of before/after ghost images. Several individually addressable sub-arrays of LEDs (or alternative spectral emitters) can be used to create multiple illumination segments. In embodiments, for the purposes of timing optimization, a course grouping of sub-arrays (e.g., 3-10) may be used. Note that black band cycling at 60 Hz can also introduce some flicker.

Figure 5:
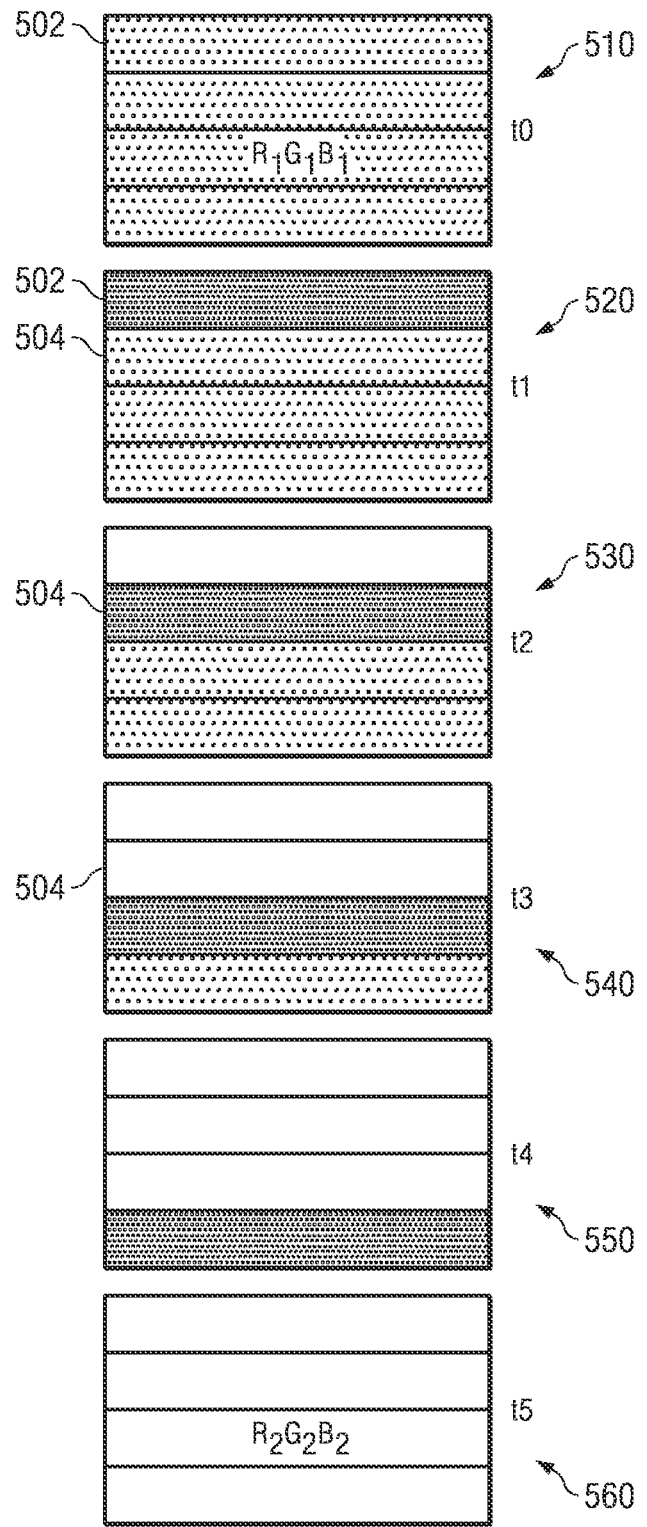
FIG. 5 is a schematic diagram illustrating a scanning backlight with black-band insertion, in accordance with the present disclosure.

FIG. 5 is a schematic diagram illustrating a scanning backlight utilizing a black-band insertion technique. FIG. 5 illustrates a direct-view display at various stages in time cycles t0 through t5, represented by simplified display shots 510, 520, 530, 540, 550, 560 respectively.

Figure 6:
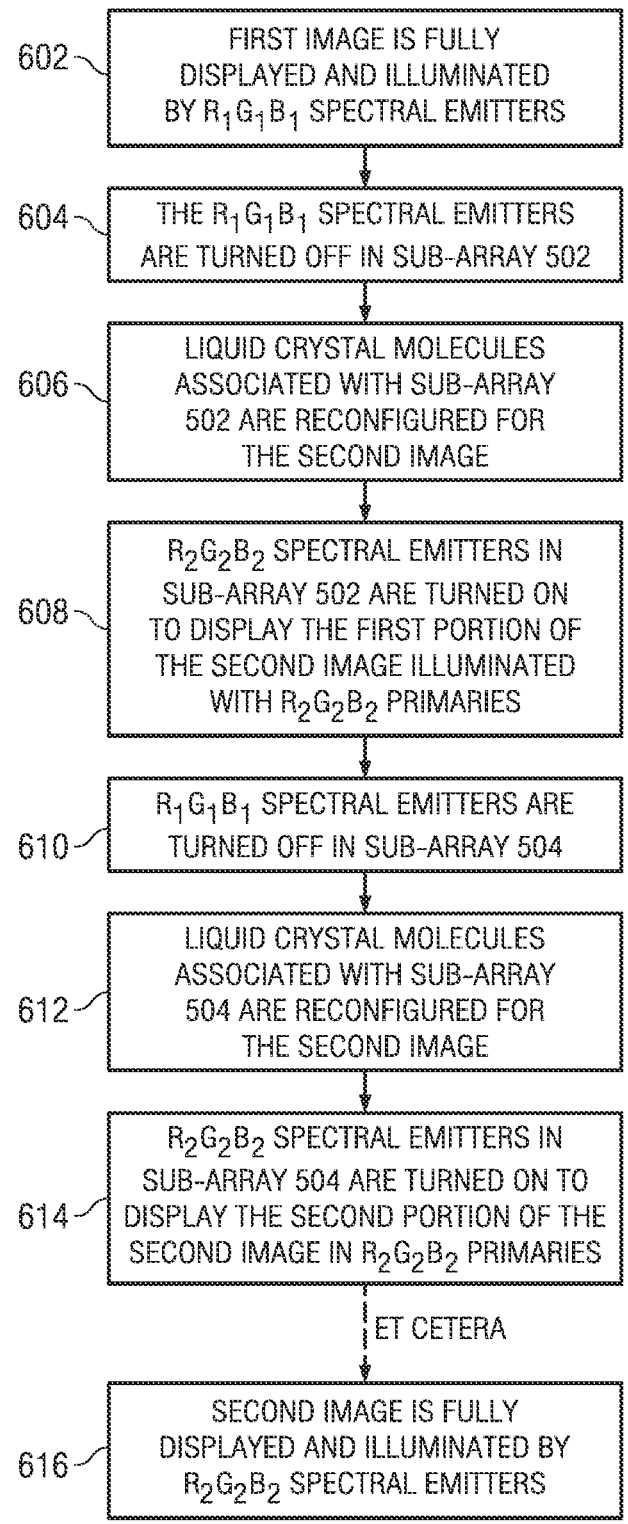
FIG. 6 is a logic diagram illustrating a process of black band insertion in conjunction with a scanning backlight, in accordance with the present disclosure.

FIG. 6 is a logic diagram illustrating a process of black band insertion in conjunction with the scanning backlight illustration of FIG. 5. At time t0, first image 510 is fully displayed and illuminated by R1G1B1 spectral emitters, at step 602. At time t1, the R1G1B1 spectral emitters are turned off in sub-array 502 (at step 604) and the liquid crystal molecules associated with sub-array 502 are reconfigured to display a second image (step 606). At time t2, the R2G2B2 spectral emitters in sub-array 502 are turned on to display the first portion of the second image illuminated with R2G2B2 primaries (step 608). Prior to, simultaneously, or subsequent to step 608, the R1G1B1 spectral emitters are turned off in sub-array 504, at step 610, as the liquid crystal molecules associated with subarray 504 are reconfigured for the second image (step 612). Similarly, at time t3, image 530 illustrates the R2G2B2 spectral emitters in sub-array 504 being turned on to display the second portion of the second image in R2G2B2 primaries (step 614). This sequence continues in a similar fashion with regard to images 540 and 550, until time t5, when the second image is fully displayed in R2G2B2 primaries (step 616). Following that, the sequence repeats to show the next frame of the first image, again using the first set of spectral emitters R1G1B1 for illumination. First and second images can correspond either to six-primary data, to left/right perspectives of a stereo image, to the two images of a privacy screen display, or a channel-multiplexed display.

In another embodiment, a first set of spectral emitters may not be turned all the way off, but may provide a reduced-intensity output that is barely visible through the filter that is designed to pass the emission spectra from the first set of spectral emitters. Similarly, in another phase of the duty cycle, the second set of spectral emitters need not be entirely turned off. Thus, such an embodiment may allow the spectral emitters to be partially biased when they are in their 'off-cycle,' rather than being entirely turned off. This may allow faster switching between illumination/non-illumination states since the respective spectral emitter sets will already be partially biased when in the non-illumination state.

Figure 7A:
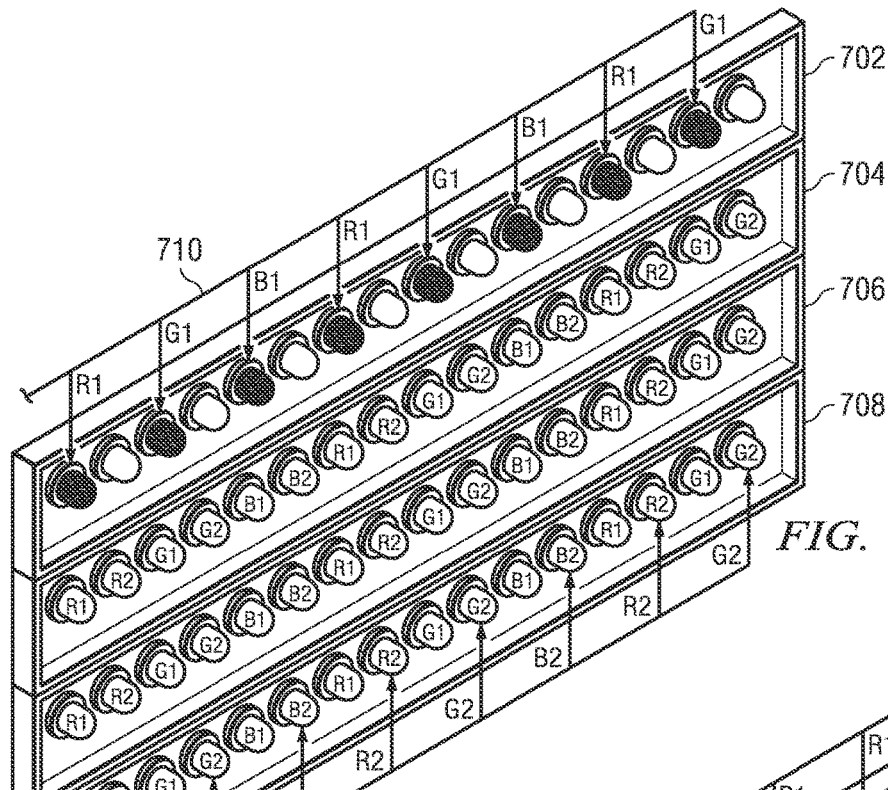
FIGS. 7A-7H are schematic diagrams illustrating an LED-based scanning backlight in operation, in accordance with an embodiment of the present disclosure.
Figure 7B:
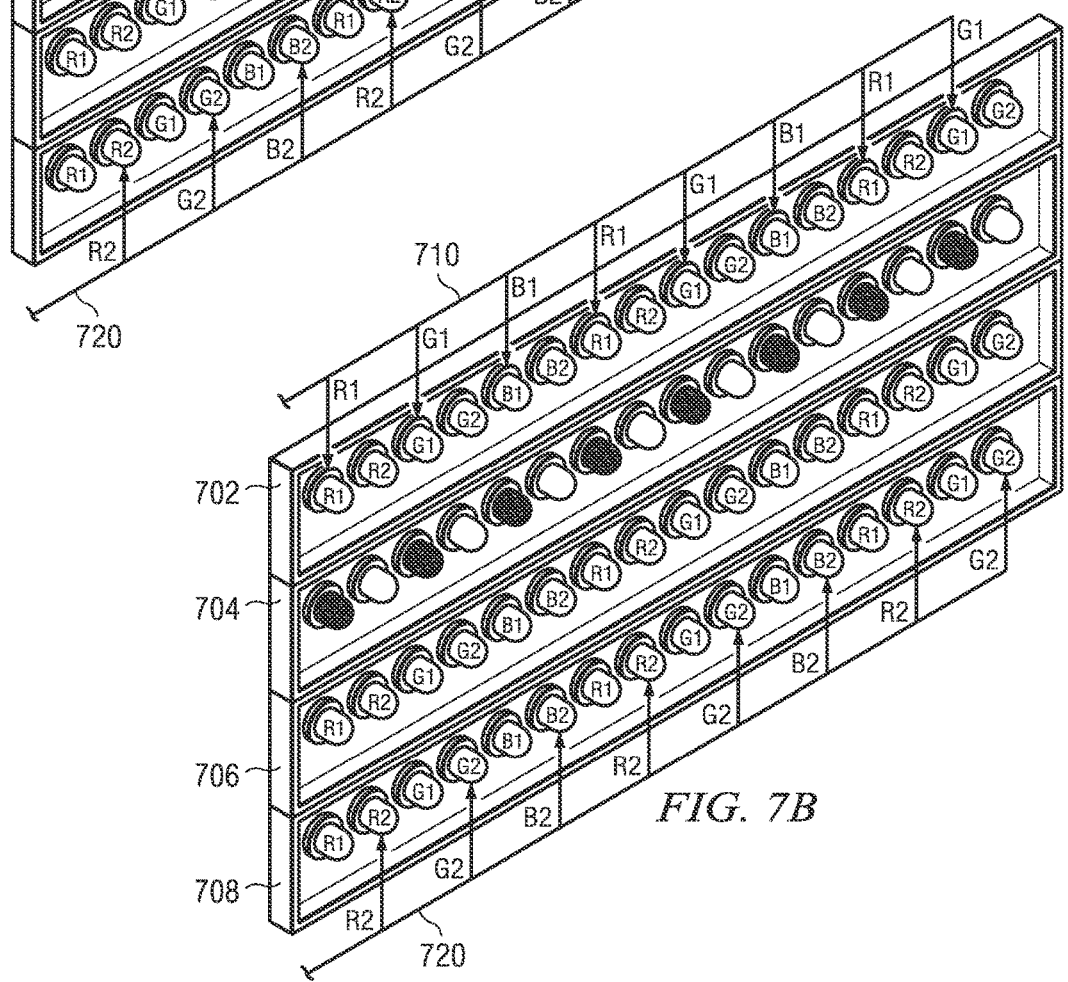
Figure 7C:
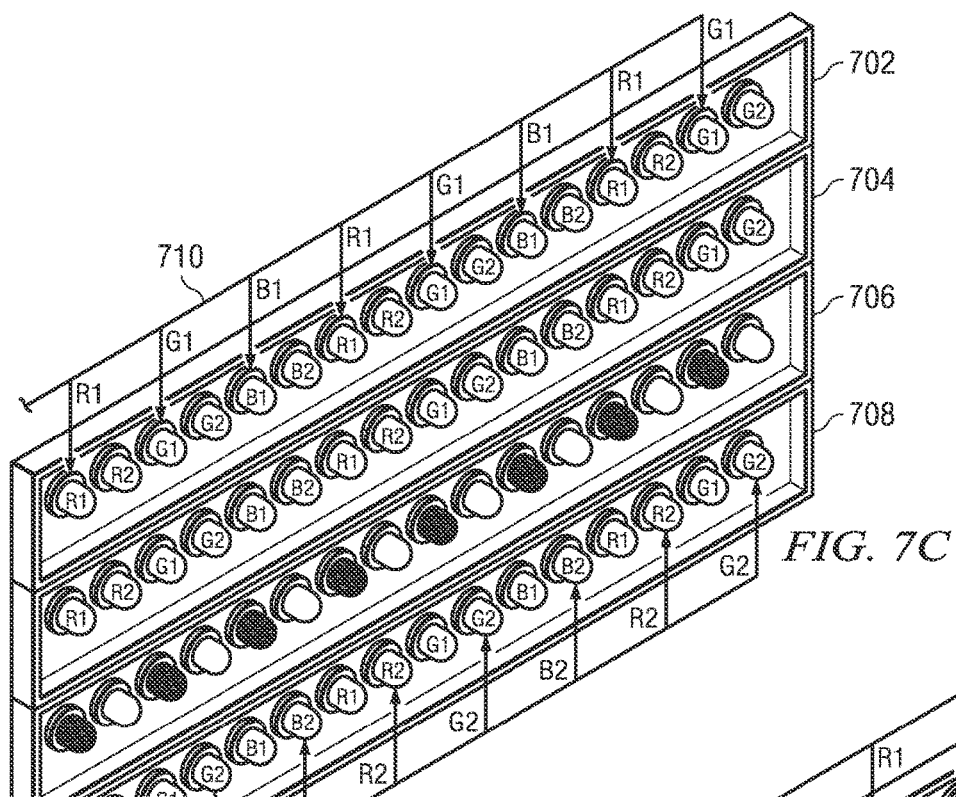
Figure 7D:
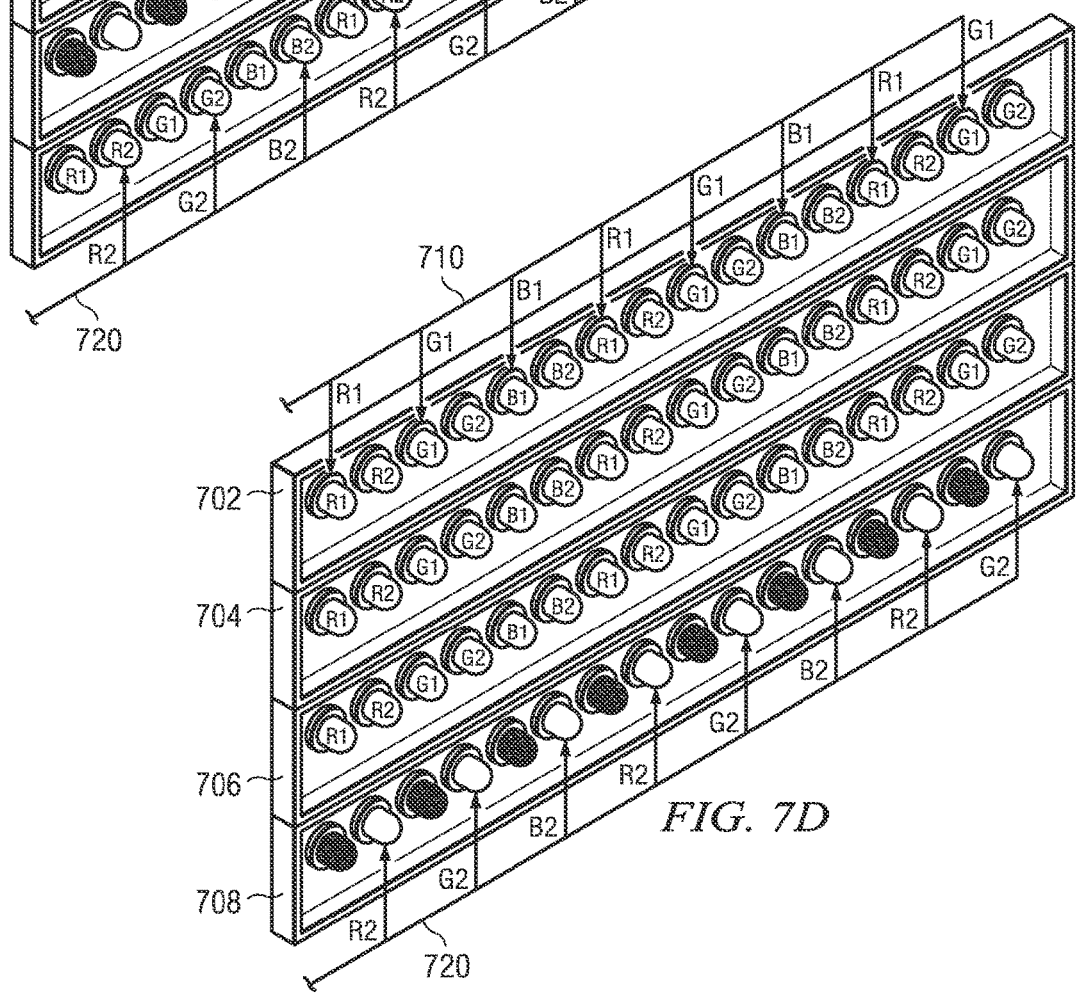
Figure 7E:
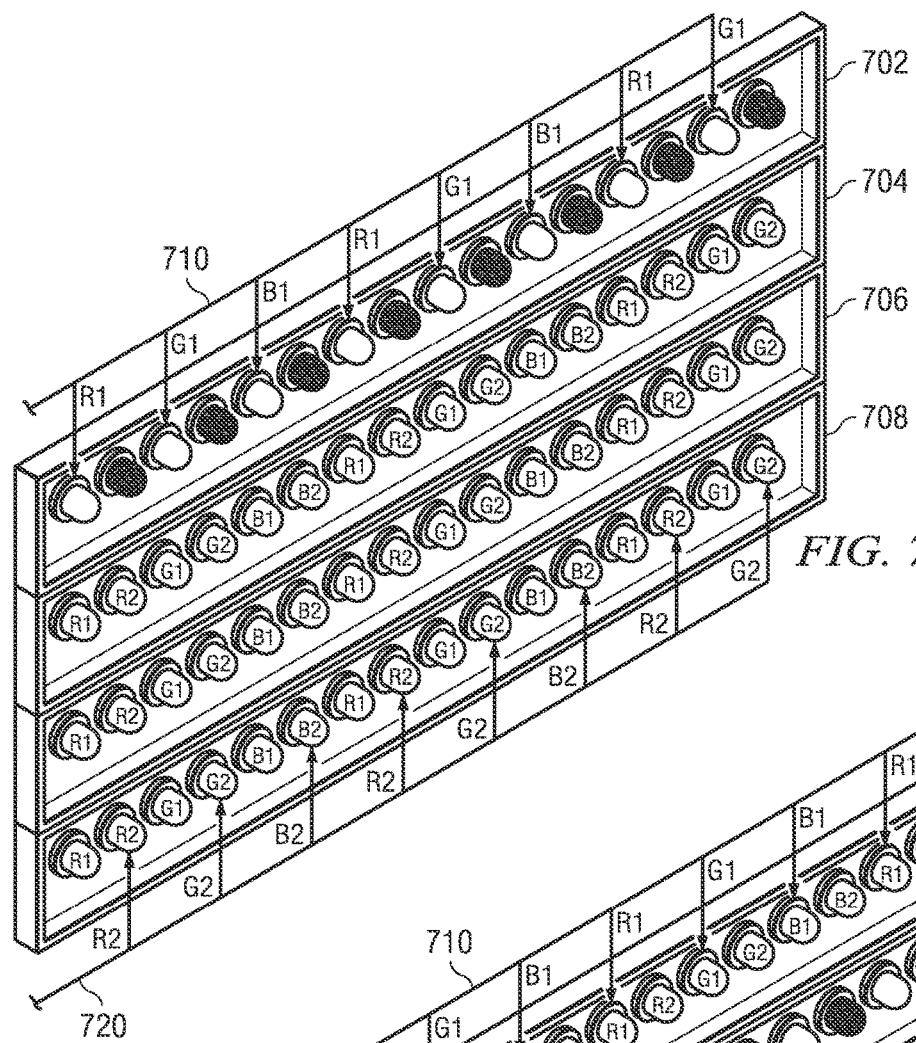
Figure 7F:
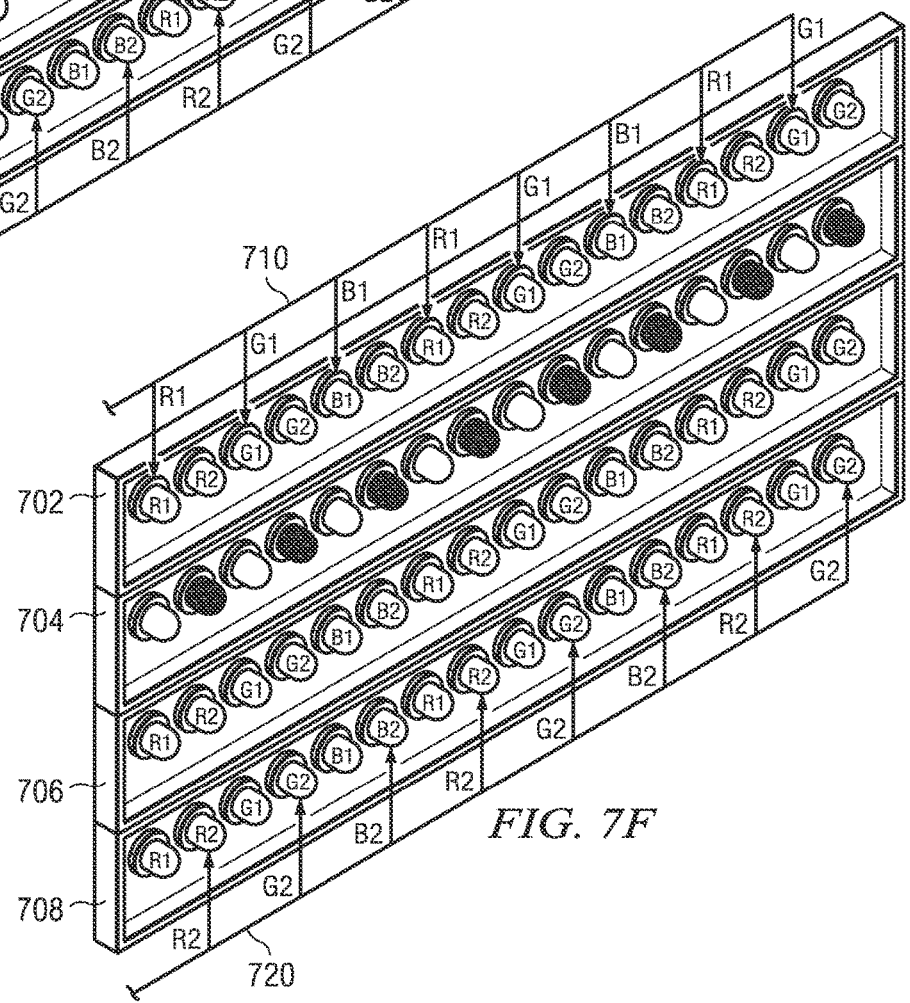
Figure 7G:
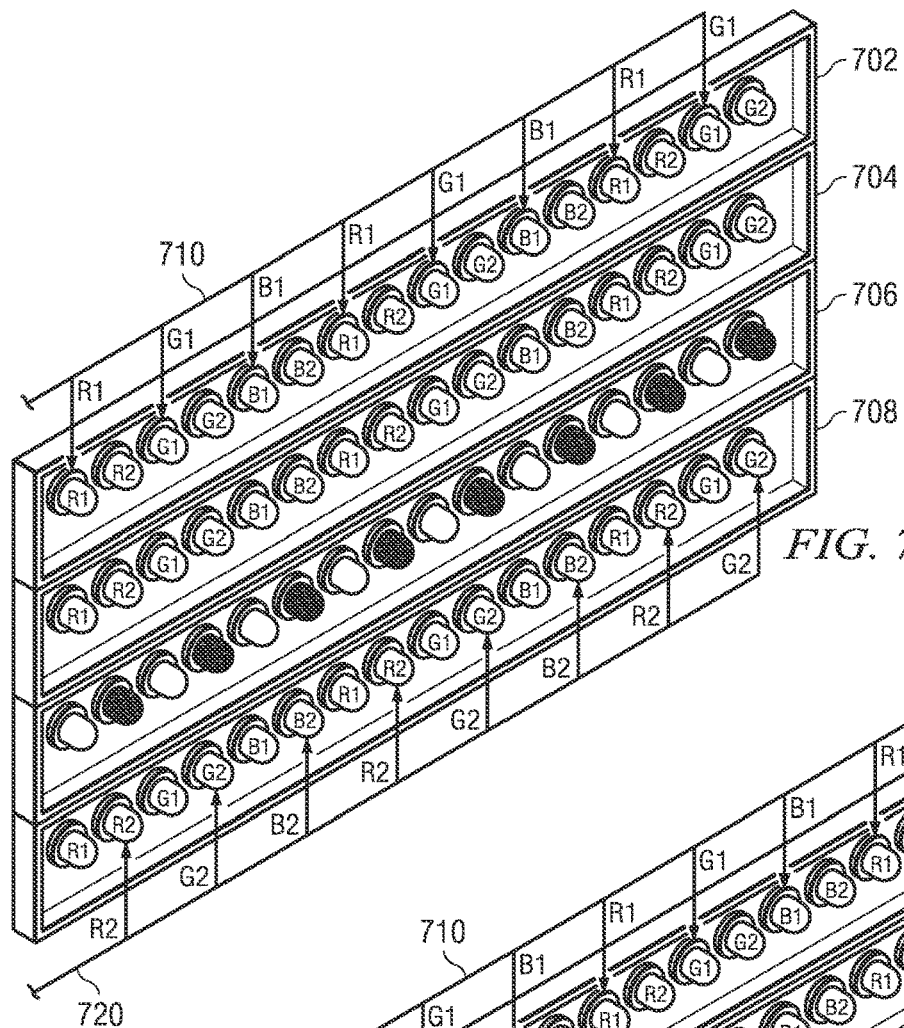
Figure 7H:
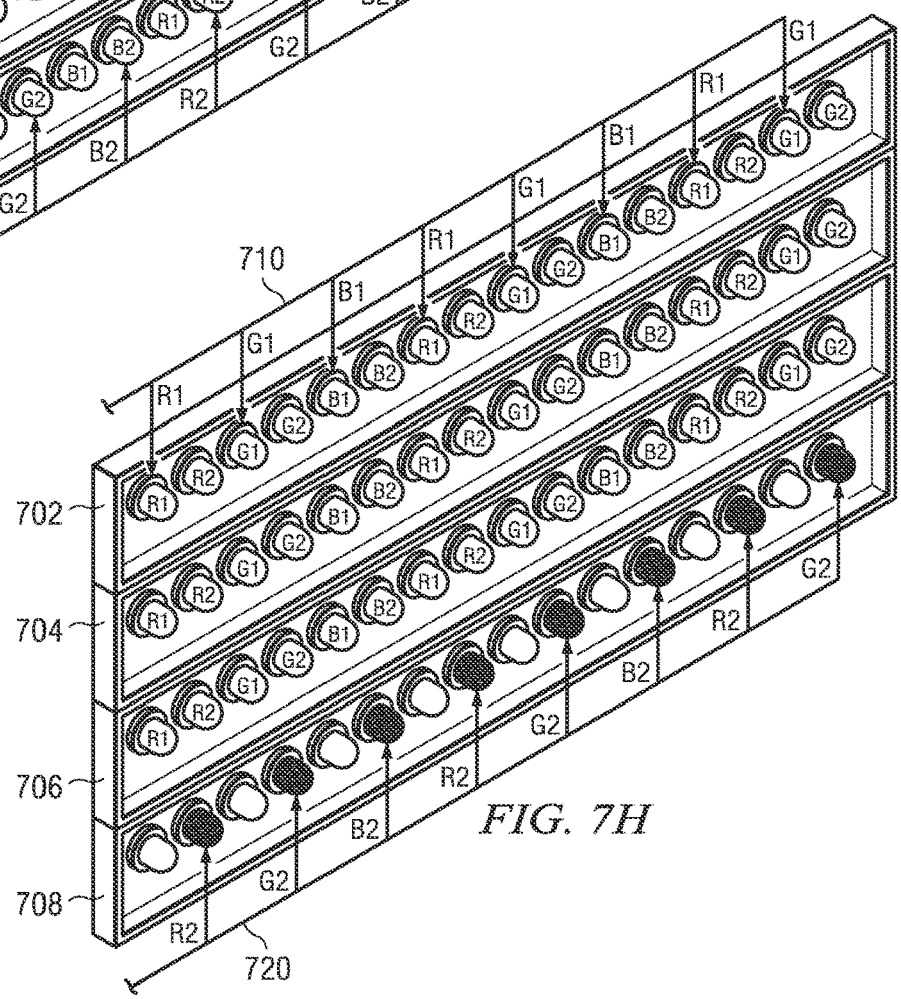
Figure 8A:
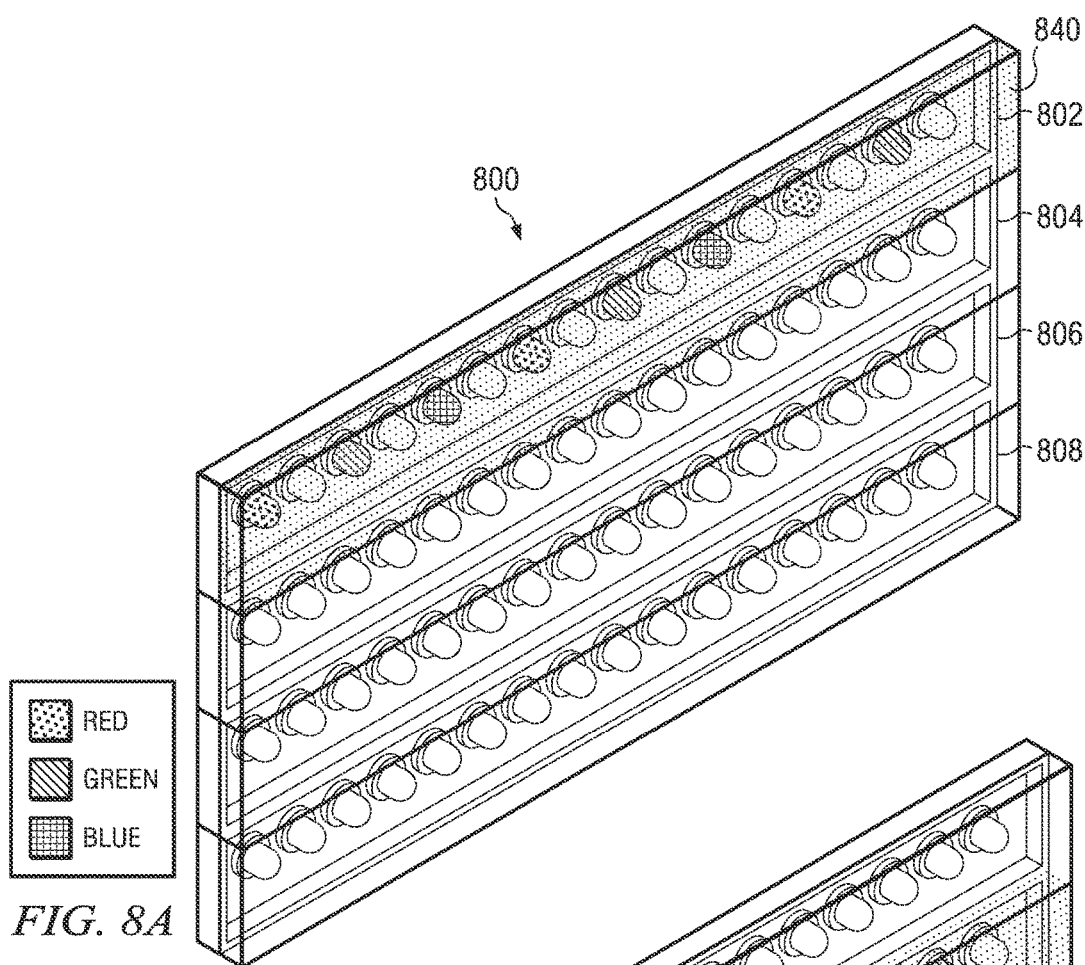
FIGS. 8A-8H are schematic diagrams illustrating an LED-based scanning backlight with light control films in operation, in accordance with an embodiment of the present disclosure.
Figure 8B:
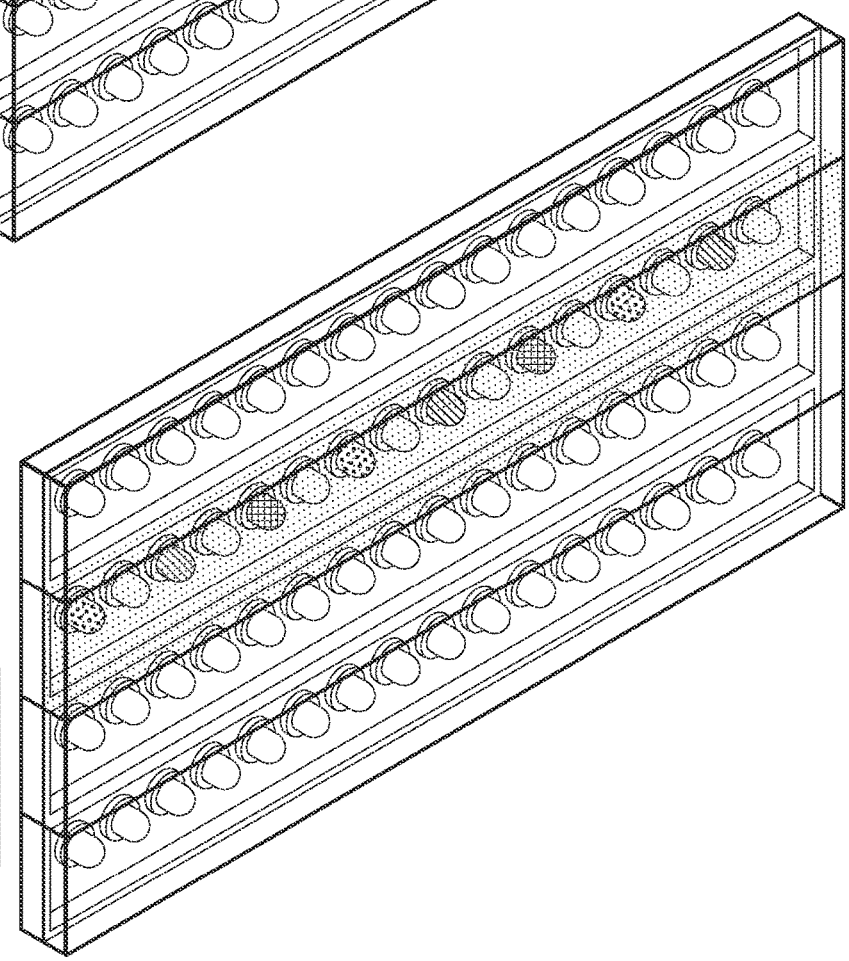
Figure 8C:
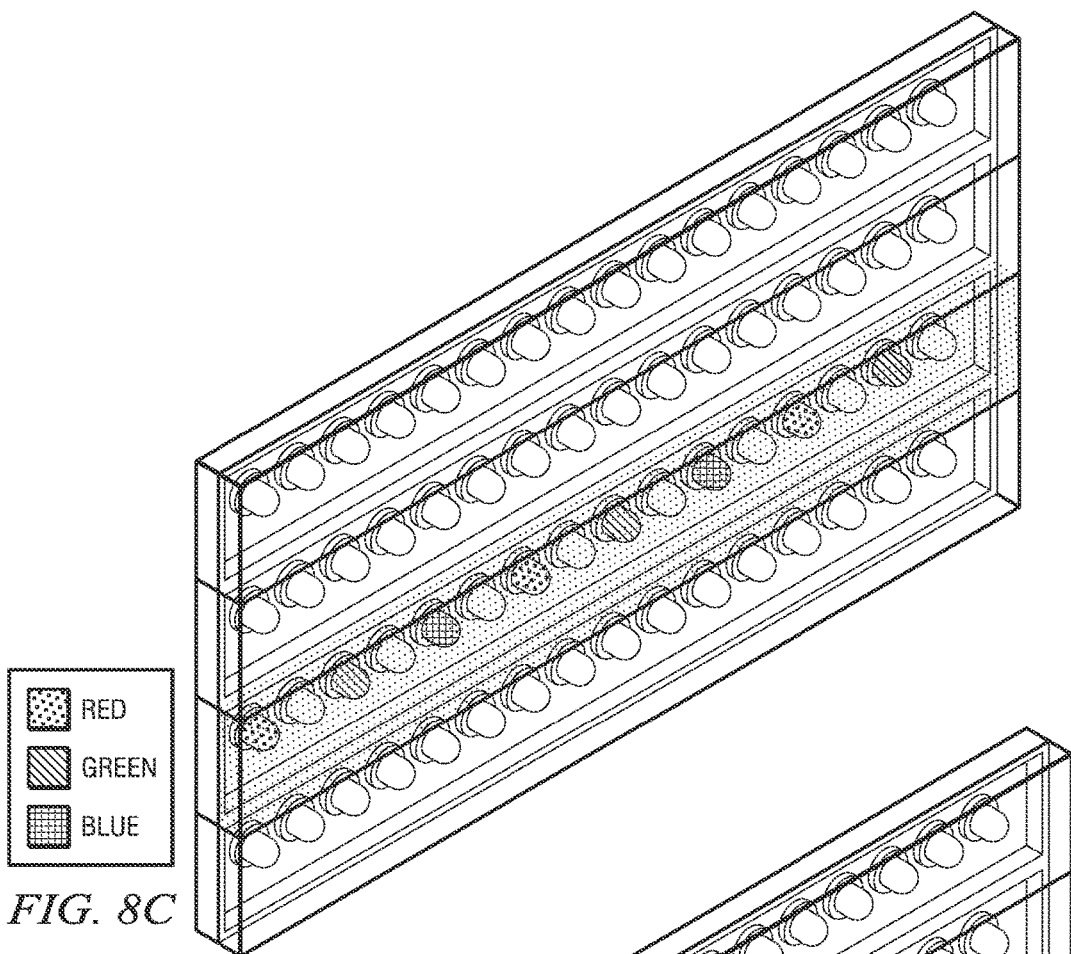
Figure 8D:
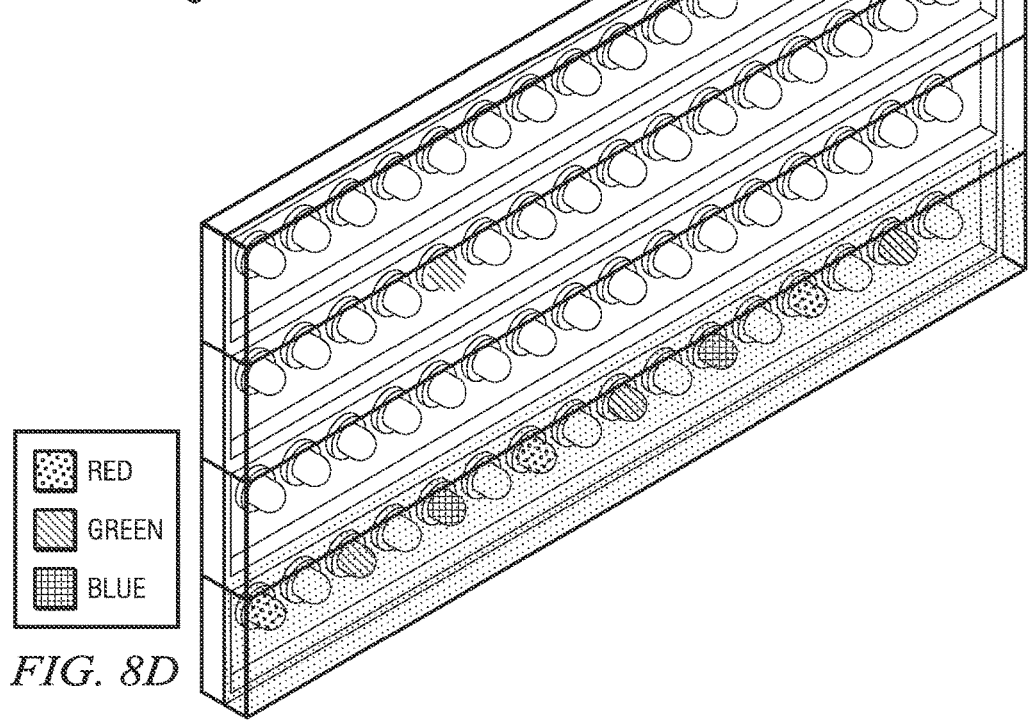
Figure 8E:
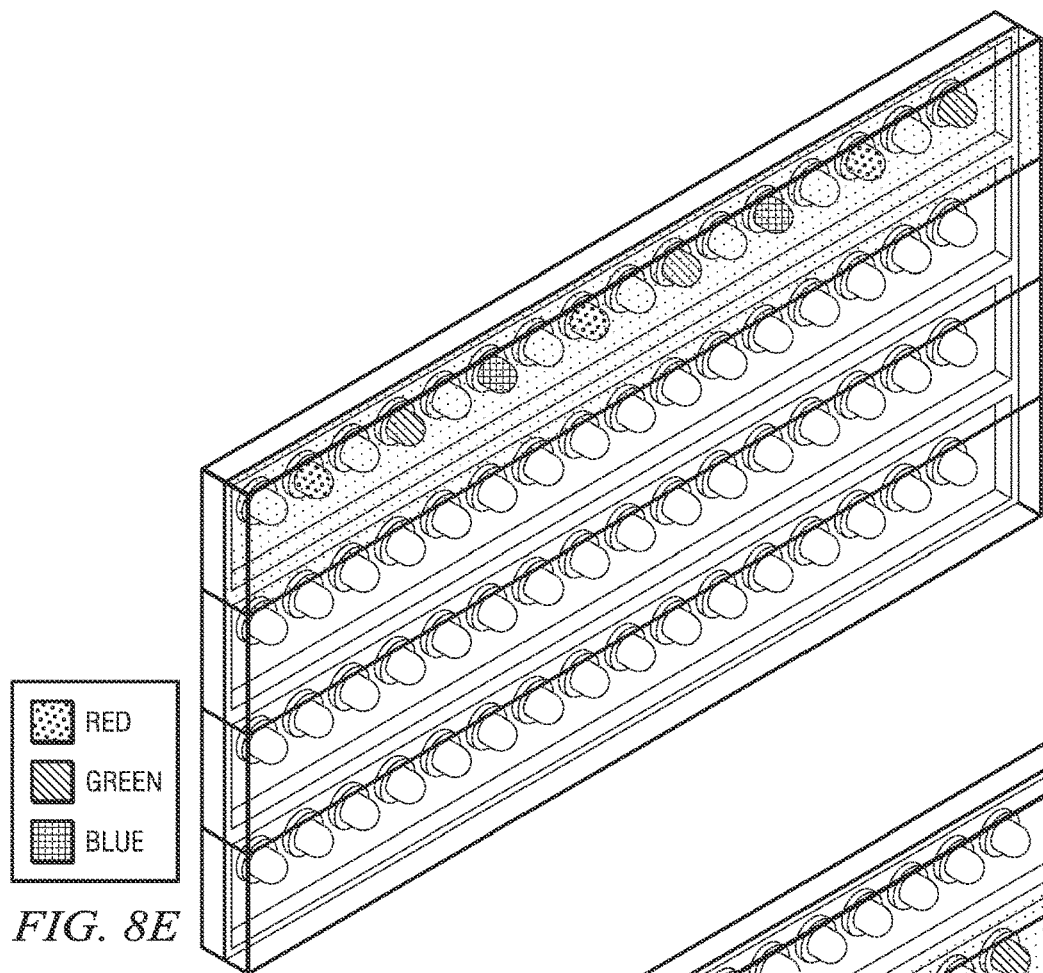
Figure 8F:
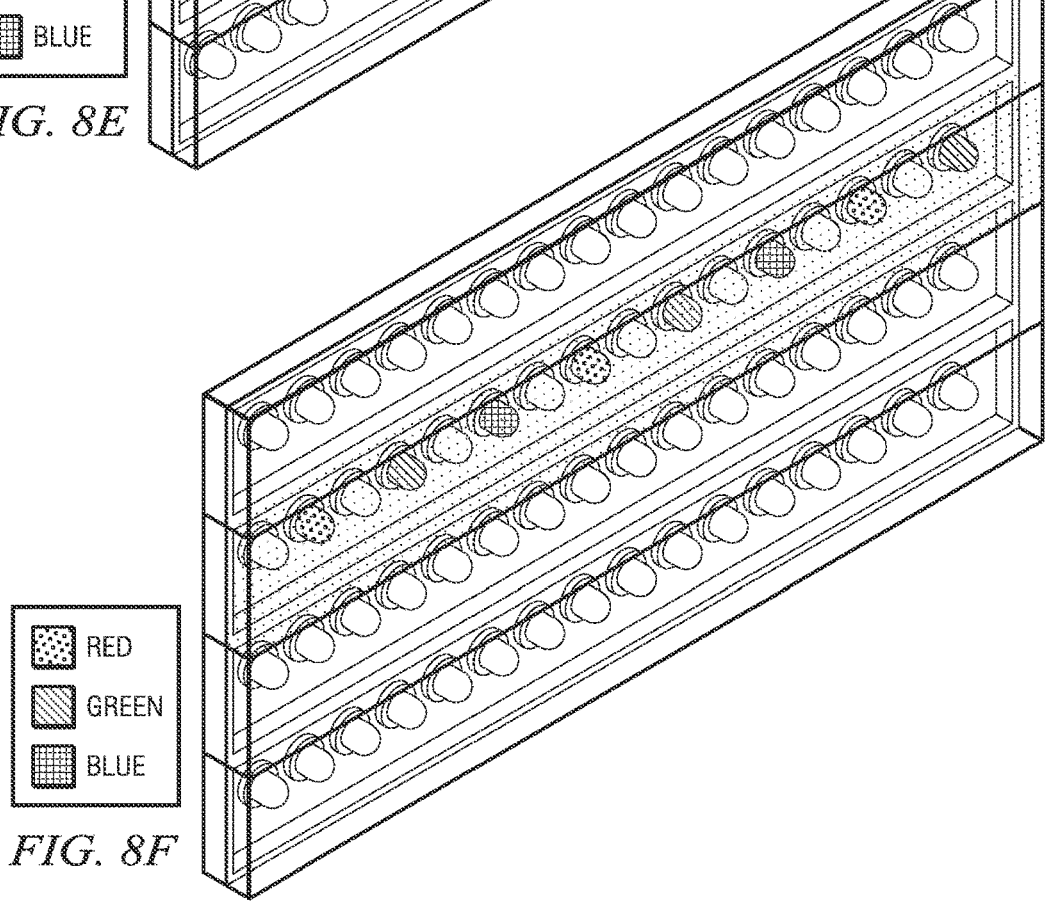
Figure 8G:
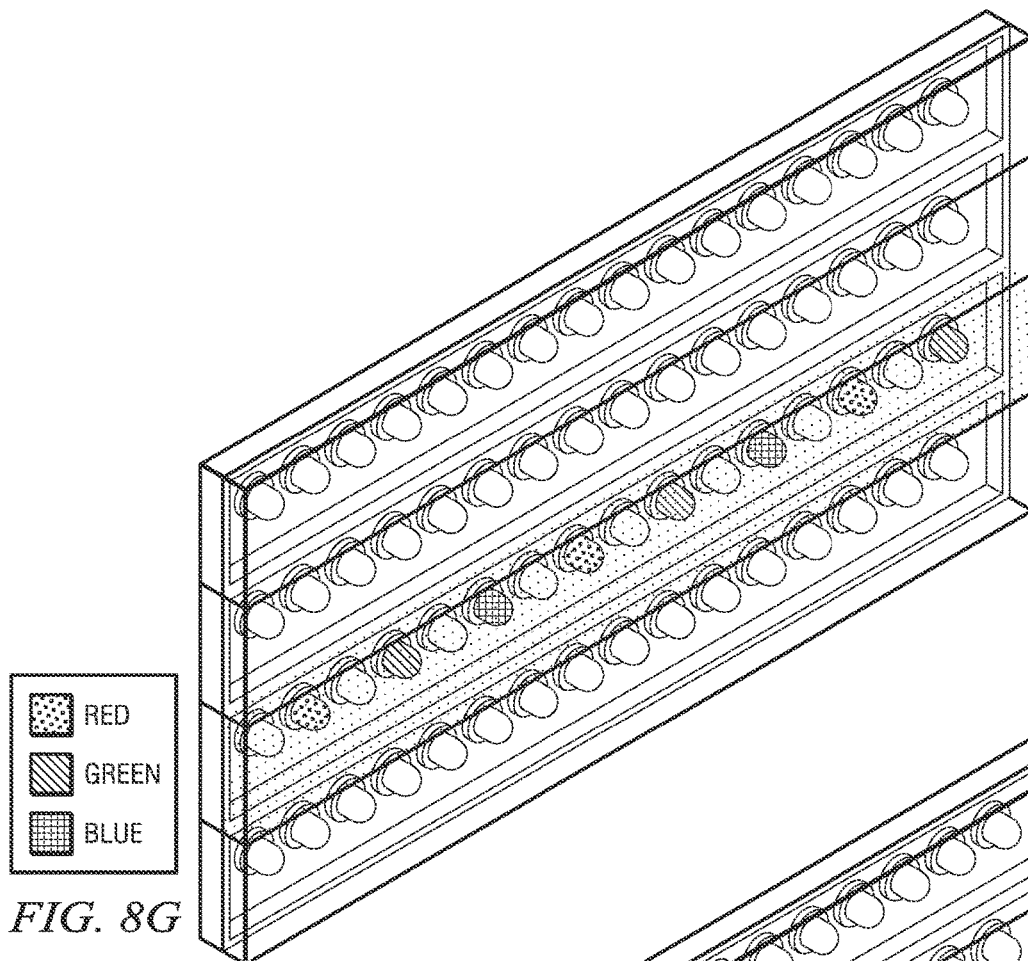
Figure 8H:
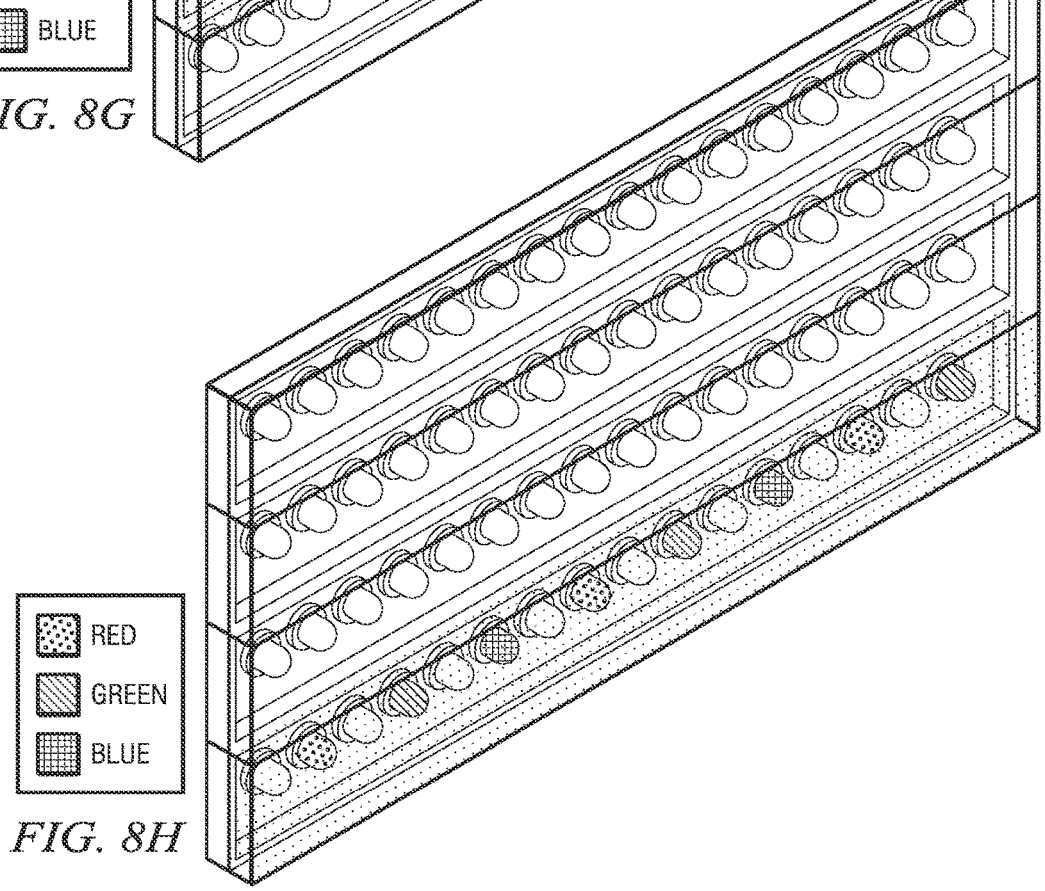

FIGS. 7A-7H illustrate a sequential illumination of sub-arrays 702-708 for first and second sets of spectral emitters 710, 720 in a backlight 700. FIG. 7A shows a first set of spectral emitters 710 in a first subarray 702 providing illumination. In sequence, FIG. 7B then shows a first set of spectral emitters 710 in a second subarray 704 providing illumination. The sequence for the first set of spectral emitters 710 continues in turn through FIGS. 7C and 7D. Following that, FIG. 7E shows a second set of spectral emitters 720 in a first subarray 702 providing illumination—and in sequence, illumination of the second set of spectral emitters 720 in second subarray 704, third subarray 706, and fourth subarray 708, as shown by FIGS. 7F-7H respectively.

FIGS. 8A-8H are schematic diagrams illustrating another embodiment of an LED-based scanning backlight 800 with light control films 840. The sequence of operation in this embodiment is similar to that shown above with reference to FIGS. 7A-7H. In this embodiment, light control film 840 may provide filtering, and dispersion of the light from each set of spectral emitters to provide homogeneity in illumination, particularly in the vicinity of the respective barriers between the subarrays. Light control film 840 may also provide matching of LED luminance and chrominance in the sub-arrays 802, 804, 806, 808.

Note that the actual operation of the LED array is largely dependent upon the functionality of the panel. For panels that are capable of global-update at fast enough rates, such a scanning backlight technique using sub-arrays may be avoided and the illumination can operate in a blinking mode with little sacrifice in brightness. In such cases, the illuminator simply alternates between flood-illuminating the panel with either of two sets of primaries (for example, simultaneously flash all R1G1B1 spectral emitters, then flash R2G2B2 spectral emitters, et cetera). A black interval can be inserted between frames to allow the LC (light modulating panel) to settle. The extent of the blanking function (if used) depends upon the response time of the panel. In a progressive-scan panel, a blinking backlight can also be used, though there is some additional sacrifice in brightness.

Enhanced Color Gamut Mode

A display using a backlight 300 in accordance with the present disclosure is capable of producing a much richer color palette than conventionally backlit displays using CCFLs or three-primary LED backlights. As discussed previously, a six-primary gamut with improved saturation of each primary may be achieved in an enhanced gamut mode. Through careful selection of the six primary bands and the color filter array spectra, a greatly expanded color gamut is achievable. This permits displaying a broader range of colors that are simply not possible with conventional AMLCD displays.

When the backlight 300 is operated in an enhanced color gamut mode (displaying a two-dimensional picture), the benefits of two sets of spectral emitters with different color points may be realized. In this case, the illuminating segments can utilize all LEDs in a sub-array simultaneously for maximum brightness and color gamut. In the maximum brightness condition, the backlight 300 provides the product of R1 and R2 with the red color filter, G1 and G2 with the green color filter, and B1 and B2 with the blue color filter. When dimming is required, it can be performed in a way that is beneficial to the color gamut for the displayed image(s). Current can be selectively applied to specific spectral emitters such that the color gamut is expanded. Furthermore, specific spectral emitters may be illuminated or dimmed to provide selective illumination to areas of the display requiring enhanced or reduced brightness respectively.

The above scanning backlight functionality for optimized two-dimensional display is very similar to the requirements for implementing an optimized six-primary display, a spectral-division stereo display, a privacy screen display, or a channel-multiplexed display. By supplying at least two sets of RGB LED arrays in each backlight sub-array, a spectrally-switchable scanning backlight is realized. To the extent that sequential operation is used, at least a 2.times. frame rate should be employed to avoid flicker. Unlike color sequential displays, however, such operation should be free of the color-break up issues. This is because each frame contains a full representation of the image in RGB.

A six-primary display has several important applications where an enhanced gamut is beneficial. When incorporated with measures to provide accuracy in transmitting/displaying color, such displays are already very important. Nowhere is this a more timely issue than in e-commerce, where certain products cannot be accurately marketed on the internet. This is due to inconsistency, or inability, to accurately represent the product appearance on conventional displays. Already, the limitations in selling fashion apparel on the internet are significant, as the appearance on a monitor does not adequately match the actual product. These situations result in mass product returns, and a general distrust among the public in the ability to successfully carry out certain purchases on the internet. This can extend to products such as motor vehicles, furniture, interior decorating (e.g. draperies, counter tops, flooring) etc.

The six-primary display is also an important part of the infrastructure necessary to support next generation photography. Image capture devices capable of six-primary capture require both image printing and display technologies. Since a relatively low percentage of electronically captured images are viewed in hard copy, it will be increasingly important for such images to be displayed with no sacrifice in image quality. In fact, such a system enables electronic imaging to step ahead of film photography in both performance and convenience. Images captured with a six-color camera, and displayed on a large screen six-color AMLCD should provide a far superior experience to viewing hard-copy.

Insofar as the spectral emitters can be individually addressed, and the display is sufficiently fast switching, a backlight embodiment of the present disclosure can also support sequential color display. In such an embodiment, the CFA is removed, such that each pixel is capable of full-color. The demands of switching speed to support multi-functional displays using sequential color operation are of course greatly increased. A video display operated in a six-color mode probably calls for a 360 Hz field rate to avoid flicker. However, such displays are vulnerable to color breakup effects, which can further increase field rate requirements.

Privacy Screen Mode

An aspect of the present disclosure includes providing a privacy screen mode of operation for the direct view display. This mode can be used to prevent others from viewing sensitive or proprietary information, with applications including, for example, mobile computing. Such concerns can limit the work activities of professionals traveling on airliners or trains. It can also be used to view imagery or text that may be of a personal nature. In the home, the privacy screen display can be used to allow adults to view programming that may not be suitable for children. It can also be used to allow viewers to watch programming without distraction to others in line of sight of the display. In the latter cases, eyewear affixed with audio input can be worn so that there are no distractions. This allows, for example, one person to watch a television program while another reads a book in the same room.

In the privacy screen mode, two sets of spectral emitters (for example, R1G1B1 and R2G2B2 LEDs) may be used to sequentially illuminate a primary and a secondary image. The primary image, illuminated by R1G1B1 spectral emitters, is intended for viewing, while the secondary image, illuminated by R2G2B2 spectral emitters, is intended for obscuring the primary image when viewed in natural light. The secondary image is synthesized as the inverse of the primary image, such that a neutral gray screen is observed as the time-average of the two images when viewed in natural light. Moreover, the screen will also appear content-free when viewed by conventional polarizing eyewear. However, a specialized set of wavelength-selective eyewear can decode the two images. The filters in the eyewear are designed to pass primarily or only the primary image spectrum, while blocking the secondary image spectrum.

Eyewear for use with the privacy screen mode can be fabricated using conventional interference filter technology (formed either from deposition or stretching of co-extruded films), rugate filter technology, holographic technology, or polarization interference technology. In one disclosed embodiment, both lenses are identical in construction; using a retarder stack, followed by a linear polarizer. Since the direct view display of the present disclosure may provide an analyzing polarizer, the eyewear can omit any input polarizer. Since any filtering operation is incomplete without this polarizer, the eyewear will appear neutral in natural (unpolarized) light. All other advantages of polarization interference, such as improved light control (through lack of reflection), and improved field-of-view are considered helpful in presenting a high contrast image that is comfortable to observe for extended periods. Aspects, such as low spectral leakage of the secondary primary set, are key aspects to providing high contrast, since the display is operated in a 50% duty ratio mode. Without the privacy-screen eyewear, secondary image ghosts, which are by definition inverse images, tend to strongly wash out the primary image.

An important aspect of polarization interference filter eyewear is that uniform retarder stacks are realizations of finite impulse response (FIR) filters. Increased retardation in the base film has an inverse relationship with sampling rate, thus increasing oscillations in the frequency (wavelength) domain. Such periodic comb functions are utilized for partitioning the spectrum according to primary set, and are a natural phenomenon in FIR filters. Through network synthesis techniques, as described in the commonly assigned U.S. Pat. No. 5,751,384, which is incorporated herein by reference, retarder stacks can be designed according to desired edge functions and duty ratios. Further details of design approaches for retarder stacks are described in greater detail in U.S. patent application Ser. No. 09/754,091, which is hereby incorporated by reference herein.

Conversely, thin-film interference filters (such as those taught for use with the Jorke system), which are realizations of infinite impulse response (IIR) filters require many layers to implement a narrow notch, with very tight control on layer thickness to meet stringent center wavelength and band edge wavelength tolerances. Multiple notches of course require stacks of individual notch filters. Multi-notch interference filters are difficult to fabricate with tight tolerances on 50% points, and are destined to be an expensive option. Moreover, filters with such high wavelength selectivity are sensitive to incidence angle. The view angle effect allows the secondary image to bleed through and reduce contrast and uniformity in appearance.

Multiplexed Image Mode

In accordance with another aspect of the disclosure, viewers wearing different sets of eyewear can independently view different multimedia images on the same display using time multiplexing of channels.

In a channel-multiplexed display mode, the time-averaged superposition of imagery from two channels is observed in natural light. A first viewer wears a first set of eyewear that passes imagery displayed in the first color gamut using primaries R1G1B1. A second viewer wears a second set of eyewear that passes imagery displayed in the second color gamut using primaries R2G2B2. Accordingly, through the respective eyewear, the first viewer sees imagery corresponding to a first color gamut and the second viewer sees imagery corresponding to the second color gamut. To the extent that the images as observed through the filters are spectrally non-overlapping, no ghost images of the alternate channel should be observed. With a display operated at 120 Hz, each person independently views a 50% duty cycle image at 60 Hz. Thus, for example, an application of the multiplexed image mode allows for watching two television channels on the same direct view display, with each channel being presented occupying the entire screen. Another application allows for a first viewer watching television while a second viewer surfs the internet A third application allows for a first video game player to view a first displayed image for a multiplayer video game, while a second player views a second displayed image. Of course, it should be apparent that various other applications may utilize multiplexed image mode.

Stereo Image Mode

Stereo imagery is used to create the appearance of depth on a 2D display. Unlike some other stereo display methods, such as micro-polarizer array, the present disclosure provides three-dimensional imagery without loss in spatial resolution. Provided that the display can be operated sufficiently fast to avoid the effects of flicker, a superior 3D experience can be realized.

Through careful backlight designs, high quality 3D displays can be implemented with practically no degradation to 2D performance, and with minimal additional hardware. A stereo display according to the present disclosure is operated in a similar fashion to the above-described privacy screen display or enhanced gamut six-primary display. In the stereo imaging mode, first and second images are sequentially presented that represent left-right views, which (preferably) have substantially non-overlapping spectral components through the action of the backlight having first and second sets of spectral emitters (as discussed previously). These views appear overlaid on the display when viewed in natural light. An appropriate set of eyewear is used to decode the images, such that the left view image is blocked by the right lens and the right view image is blocked by the left lens. This can in principle be accomplished using a number of technologies, as discussed above. However, polarization interference filter technology is superior to other technologies in the aspects discussed previously.

In a described stereo display embodiment, polarization-interference eyewear is used to separate left and right views of an image. The lenses of such eyewear comprise a stack of linear retarder films, followed by an analyzing polarizer. According to the described embodiment, a linearly polarized output is provided by the analyzing polarizer of the AMLCD, which is oriented parallel to the polarizer in a first lens, and is crossed with the polarizer of a second lens. The retarder stack design is identical in the first and second lens. Furthermore, the retarder stack design, in particular the duty-ratio, is selected so as to maximize light coupling to each eye, with minimal spectral overlap between the lenses (which causes image cross-talk).

Eyewear Design Considerations

Unlike the privacy screen eyewear discussed previously, the stereo-display eyewear is used to alternately present different images to each eye sequentially. In construction, the eyewear is much as discussed previously. However, for stereoscopic viewing applications, the spectra associated with each left and right filters are, like the illumination source, substantially non-overlapping. The extent of ghost image appearance (neglecting software corrections) depends largely on the dynamic range of the filter, and the extent of spectral overlap of filters in the vicinity of LED (or other spectral emitter) emission. The more confined the source emission (a laser being best, and a super resonant LED being the next best), the less demanding the filtering operation needed by the eyewear. In general, improved dynamic range is desirable, though selective sources permit a relaxation in filter transition slope. In practice, the extent of this relaxation depends upon tolerances in emission center wavelength in manufacturing. Accordingly, utilization of super resonant LEDs as spectral emitters may provide a good compromise solution that addresses the above design factors.

An embodiment of stereo-display eyewear includes the use of retarder stacks for left and right filters using the identical retardation value. Using network synthesis techniques, as described in the commonly assigned U.S. Pat. No. 5,751,384 incorporated by reference, the duty ratio for each lens can be selected. Referring back to FIG. 4I, the graph illustrates transmission profiles for an embodiment that includes first and second polarization interference filters for viewing respective first and second images illuminated with respective first and second sets of spectral emitters. The profile for each filter has a series of steep transition slopes with flat pass-bands and stop-bands. According to the present disclosure, the duty ratio of the spectral profile of each lens may be selected to control the extent of spectral overlap. When the parallel polarizer spectrum of the left image is overlaid with the crossed polarizer spectrum of the right image, a constant overlap factor is assured. This is a consequence of using identical retarder films in each stack, in combination with the principles of conservation of power.

Such polarization-interference eyewear lenses are, much like conventional 3D polarizing lenses, neutral in appearance, as retarder stacks are fully transparent in natural light. In that respect, the viewer will appear to be wearing matched neutral eyewear to any observer. To the wearer, the natural world will likewise appear identical through each lens, and will primarily or only appear different when viewing a polarized input. The lenses will thus act to diminish the brightness of surroundings by 50%, with (neglecting the filtering operation of the lens) little insertion loss when viewing the display. Using current high-performance linear polarizers, internal insertion losses of polarized light is about 6% in the green.

According to an embodiment of the present disclosure, absorption-based eyewear with highly selective spectral filtering provided by polarization interference can be used to give optimum performance in comfort, see-through, brightness, and cross-talk. Moreover, the lenses can be formed in either cylindrical shapes, or even thermoformed for compound curvature, to minimize field-of-view effects. Retarder stacks based on biaxial-stretched retarder film are additionally virtually insensitive to angle-of-incidence spectral shifts. Using eyewear can also help with head tracking for full surround 3D, as the infinity point won't move with the user.

As discussed previously, in some embodiments, the input polarizer for each filter may be omitted when using a display that provides a linearly polarized output, thus there is one and only one polarizer in each filter. The addition of an input polarizer on each filter reduces the throughput slightly, but it may also have an effect on the appearance of the natural world. (Such a filter, with an input polarizer is taught by commonly-assigned U.S. Pat. No. 7,106,509, and is hereby incorporated by reference in its entirety). This can take the form of a luminance and/or a chrominance difference as viewed through each filter. Since a viewer typically takes in both the displayed image, and some portion of the surroundings, the differences seen through each filter may be distracting. Moreover, it is difficult to correct for such differences, in part because stereo displays can be viewed in a number of spectrally distinct ambient lighting conditions (e.g., sunlight, fluorescent light, incandescent light, et cetera). While the conditions of the displayed image can be carefully controlled, the relative appearance of the natural world can vary dramatically when viewed through each filter. As such, it may be desirable to provide a left/right filter system that is matched in chrominance and luminance under all ambient light conditions. When viewing the display, careful corrections can be applied by altering the spectral emissions of R1G1B1 and R2G2B2 to match the chrominance and luminance of the white point seen by each eye, which are not possible in the natural world. By omitting the input polarizer of each filter, these conditions are most likely to occur, insofar as the natural world is virtually unpolarized.

A beneficial aspect of polarization interference eyewear is in contrast enhancement. The filtration of light, such that only the appropriate set of primaries (for example, R1G1B1 or R2G2B2) are allowed to pass, has the effect of eliminating broad band glare incident on the display from ambient sources. While the addition of an input polarizer to each lens eliminates the neutral appearance, it has the benefit of further increasing contrast by rejecting the glare by blocking the orthogonal polarization. In addition, the input polarizer minimizes the sensitivity to head tilt on image cross-talk. In this case, head tilt acts primarily to decrease brightness of the display.

A technique for decreasing sensitivity to head tilt, without the addition of a secondary polarizer, is to place a quarter-wave retarder (or circular retarder) on both the display and eyewear. A quarter-wave retarder, oriented at 45-degrees with respect to the polarizer on the display, produces substantially circular polarization of a particular handedness. A secondary matched quarter-wave retarder, oriented at minus 45-degrees on the eyewear, has the effect of canceling the polarization effect of the former. The transformation from a linear to a quasi-circular coordinate system produces first-order elimination in head tilt sensitivity. For zero-order quarter-wave retarders, the retardation values are preferably closely matched to minimize ghost images.

In another embodiment, quarter-wave retarders are provided on both the display and eyewear, as described above, with the addition of an input polarizer on the eyewear. In this way, cross-talk is minimized, while substantially reducing the sensitivity of throughput on head-tilt. Such eyewear may be particularly suited to the privacy screen displays discussed above, where the lenses in each eye are matched. In the case where filters in left and right eyes are matched (e.g., in privacy screen and multiplexed display modes), the objectionable effect of appearance difference of the natural world does not apply.

The foregoing provides various embodiments, which are intended to illustrate the considerations that come into play with multi-functional displays. It shows that a multi-functional display capable of various modes of operation is possible with a single backlight. It further shows that no special film or modulator is required, adding to the cost of the display, to implement multi-functional displays. A number of factors contribute to the selection of LED backlight design to achieve a balanced output when operating in (e.g.) stereo mode. Clearly this example shows that the photopic response is critical to the long-red output requirements, perhaps arguing for a blue shift in center wavelength. The reality is that a number of factors, including cost of spectral emitters (versus emission wavelength), spectral broadening, availability of center wavelength and peak output power, lifetime (and changes over lifetime), thermal management, number of each type of LED, etc., are all important practical design considerations.

As previously discussed, stereoscopic and multi view displays can be created by providing a sequential backlight with multiple primaries as generally discussed, for example in, U.S. Pat. No. 8,233,034 entitled "Multi-functional active matrix liquid crystal displays" by Sharp and Robinson, the entirety of which is herein incorporated by reference. Light-emitting diode (LED) sources have limited options for center wavelength and have wide spectral bandwidths, both due to technology constraints. For low stereoscopic cross-talk and wide color-gamut, narrowband sources with tuned center wavelengths are desired.

According to the present disclosure, an optical structure may provide light to a display. The optical structure may include an excitation source operable to transmit illumination, an input filter operable to receive illumination from the excitation source and operable to substantially transmit a first wavelength band of light and operable to substantially reflect a second wavelength band of light. The optical structure may also include an emitter region with emitters, wherein the emitter region is operable to receive at least the first wavelength band light, and the emitters are operable to be excited by at least the first wavelength band of light and emit a third wavelength band of light and an output filter operable to receive at least the third wavelength band of light from the emitter region, and operable to output at least a fourth wavelength band of light in which the bandwidth of the fourth wavelength band of light is narrower than the bandwidth of the third wavelength band of light. The emitters may be tuned to emit light at a wavelength longer than the light received from the input filter.

Either one or both of the input filter and output filter may be a dichroic filter. The input filter, emitter region and output filter may be completely or partially surrounded by a cavity which may be operable to receive illumination from the excitation source. The cavity may include at least one of white or metallized internal walls.

The optical structure may also include an angle reducing element operable to receive illumination from the emitter region, in which the angle reducing element may be prismatic tape. The optical structure may also include an angle transforming non imaging optic operable to receive illumination from at least the excitation source and which may be one of a light pipe or compound parabolic concentrator. Additionally, the optical structure may include an angle increasing element operable to receive light from the output filter. An optical spacer may be located in the optical structure between the output filter and at least a first light guide plate. Further, an integrator may be located between the excitation source and the input filter.

The optical structure may provide light to a display and the display may receive addressing for a stereoscopic image. A first light guide plate and a second light guide plate may be scrolled so that a left image and a right image may be illuminated by spectrally separated sources.

Also, according to the present disclosure a method for backlighting a display may include providing at least a first wavelength band of light from an illumination source, receiving the first wavelength band of light at an input filter and transmitting the first wavelength band of light through the input filter and receiving the first wavelength band of light at an emitter region and exciting emitters in the emitter region thereby producing at least a second wavelength band of light and transmitting at least some of the first wavelength band of light through the emitter region. The method may also include receiving the at least second wavelength band of light at an output filter and outputting a third wavelength band of light in which the bandwidth of the third wavelength of light may be narrower than the bandwidth of the at least second wavelength of light. The method may further include receiving at least some of the first wavelength band of light from the emitter region at an output filter and transmitting a fourth wavelength band of light, wherein bandwidth of the fourth wavelength band of light is narrower than the first wavelength band of light from the emitter region. The input filter may receive a third wavelength of light produced by the emitter region. Wavelengths outside of the bandwidth of the third wavelength band may be directed back towards the emitter region by the input filter.

Continuing the discussion, the method for backlighting a display may include receiving the wavelengths of light outside of the bandwidth of the third wavelength of light at the emitter region which may excite emitters in the emitter region and produce light within the bandwidth of the third wavelength of light. The third wavelength of light may be directed back towards the output filter. The output filter may direct light to at least a first light guide plate and address a stereoscopic image to a display. The light guide plates may be scrolled so that a first image and a second image on the display are illuminated by spectrally separated sources. The right and left images may be separated by a dark band of illumination during the display switching period for high contrast.

Further to the present disclosure, adjacent passbands may be placed in stereoscopic eyewear and the output filter, in which the passband of the output filter may be red-shifted relative to the passbands of the stereoscopic eyewear.

Generally discussed herein, is an optical structure as a narrowband, highly color saturated light source for a liquid-crystal display backlight. The light source for the optical structure may include an excitation source such as a blue LED. Although the excitation source may be discussed herein as a blue LED, the excitation source may be any source with the appropriate energy to excite the emitters in the emitter region. Also, the terms excitation source, light source, and illumination source may be used interchangeably herein for discussion purposes only and not of limitation.

The optical structures may provide light to light guide plates and may be used as a backlight for liquid crystal displays. In one example, more than one optical structure may produce two sets of colors, for example R1G1B1 and R2G2B2, which may be used in a stereoscopic backlit liquid crystal display. The optical structure may be used to produce a brighter backlight structure through light recycling of the wider bandwidth light back into the optical structure.

In one embodiment, quantum dots may be used with an excitation source, such as an LED, to create tuned, narrow-band sources of light for use in a backlight, providing a wide color gamut and low stereoscopic cross-talk. Quantum dots or phosphors may be emitters engineered to have a particular approximate center wavelength and narrow spectral distribution. The quantum dot emitters, along with supplemental light sources, can form the appropriate spectral emitter groups which may be employed for a multi-functional display. In one example, the spectral emitter groups that may be formed may be R1G1B1 and R2G2B2. The supplemental light sources may be, but are not limited to LEDs, lasers, laser diodes, semiconductor sources, any combination thereof, and so forth.

The optical structure may include an input filter, an emitter region, and an output filter. This optical structure may produce more saturated colors for a wider display color gamut. Furthermore, the optical structure may produce a brighter backlight structure through light recycling of the wider bandwidth light back into the optical structure. Light recycling will be discussed in detail herein.

In one example, the output filter may transmit one band of wavelengths, for example $\lambda_{blue1}+/-\Delta\lambda_{blue1}$, and reflect another band of wavelengths, for example $\lambda_{yellow1}+/-\Delta\lambda_{yellow1}$. The emitter region may include emitter material such as phosphors or quantum dots and may be excited by short wavelength light such as $\lambda_{blue1}+/-\Delta\lambda_{blue1}$. Continuing, the emitters or emitter material may be tuned to emit light at one or more particular longer wavelengths such as $\lambda_{green1}+/-\Delta\lambda_{green1}$, and/or $\lambda_{red1}+/-\Delta\lambda_{red1}$. Further, the output filter may transmit one or more bands of wavelengths, for example $\lambda_{blue1}+/-\Delta\lambda_{blue11}$, $\lambda_{green1}+/-\Delta\lambda_{green11}$, and/or $\lambda_{red1}+/-\Delta\lambda_{red11}$). The bandwidths of transmitted light may be substantially narrower than the input light. The light or wavelengths outside of the narrowed bands may be reflected by the output filter back toward the emitter region and input filter. As such, this light may excite emitter material in the emitter region and produce light which can transmit through the output filter. Additionally, the light generated from the emitter region traveling back toward the input filter may be reflected by the input filter toward the output filter to substantially enhance the brightness of the output light.

The input and/or output filters of the optical structure may be dichroic filters constructed using thin film deposition technology. Part of the optical structure may be contained in a reflective cavity. The reflective cavity may have white or metallized walls for increasing the excitation light in the emitter region and for increasing the amount of light exiting the output filter as indicated and discussed with respect to at least FIG. 16 herein.

Figure 15:
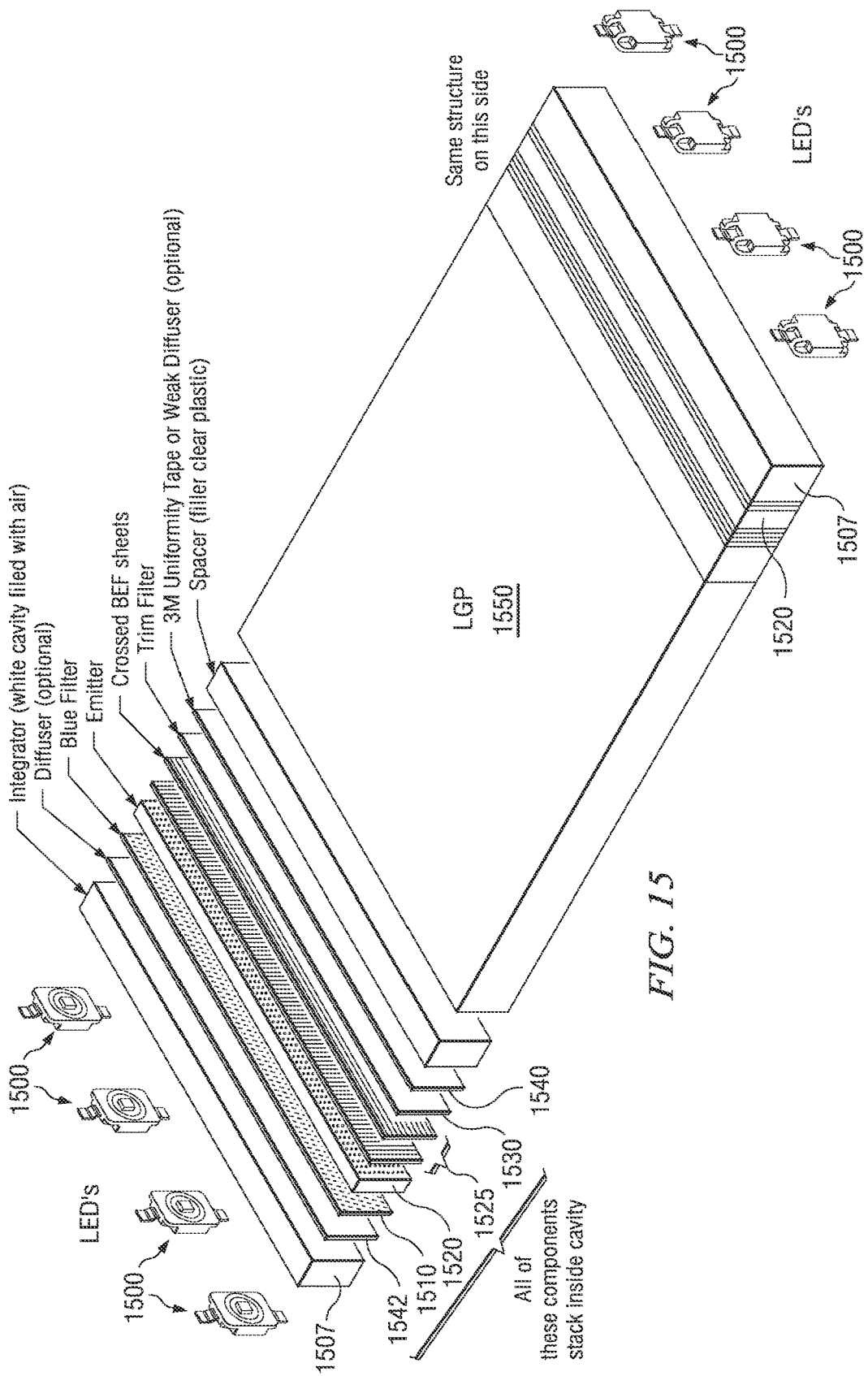
FIG. 15 is a schematic diagram illustrating an embodiment of another backlight structure, in accordance with the present disclosure.

Generally, an integrator may be placed between the excitation source such as LEDs, and input filter to substantially homogenize the excitation light prior to reaching the emitter region as depicted and discussed with respect to at least FIG. 15. The integrator may be a white-walled cavity, light pipe, and/or diffuser which will be discussed in detail herein.

An angle reducing element may be included in the optical structure. This angle reducing angle may be any type of prismatic tape such as the 3M BEF II tape. Generally, angle reducing optical elements may be prismatic films, molded structures, cylindrical lens arrays, spherical lens arrays, any combination thereof, and so forth. An angle transforming element may also be included in the optical structure. The angle transforming element may be a non-imaging optic such as a tapered light pipe or compound parabolic concentrator. The angle transforming element may be placed between the emitter region and output filter to control the angles of incidence of light at the filter plane for less filter cutoff angle shift as illustrated in at least FIG. 15 and discussed herein.

The optical structure may also include an angle increasing element. The angle increasing element may be any of a diffuser film, roughened optical surface, lenticular lens film individually or any combination thereof and so forth. The angle increasing element may be located after the output filter to improve the uniformity of light entering the light guide plate portion of the backlight as indicated and discussed with respect to at least FIG. 15 herein.

Also included in the optical structure may be an optical spacer. The optical spacer may be an optically thick plate and may be included between the output filter and light guide plate to allow substantially seamless abutting of optical structures along the side of a light guide plate. This is indicated and discussed with respect to at least FIG. 19 herein.

The optical structure may be employed as an illumination source for light guide plates and a display. The display may be a multi-functional display and may display 2D or stereoscopic images. Using this optical structure, a stereoscopic image may be addressed to the display or LCD and the backlight may be scrolled such that left and right eye images on the LCD may be illuminated by spectrally separated sources. These spectrally separated sources may be provided by separate optical structures. The separate optical structures may provide light to light guide plates. One optical structure may provide light to one or more light guide plates and one or more optical structures may provide light to one light guide plate, or any number of optical structures may provide light to any number of light guide plates. The left and right eye images may be separated by a dark band of illumination during the LC switching period for high contrast and low stereoscopic crosstalk as depicted and discussed with respect to at least FIG. 20 herein. The separate two or more optical structures may produce at least two sets of colors, for example R1G1B1 and R2G2B2. These optical structures may be used in a stereoscopic backlit liquid crystal display as depicted and discussed with respect to at least FIG. 20.

In one example, the spectrally distinct optical structures may illuminate the same light guide plate, and may be driven in a time-sequential fashion to illuminate the light guide plate in synchrony with left and right eye images which may be sequentially driven to the liquid crystal display panel. This is illustrated and discussed with respect to at least FIG. 20.

Further to the discussion of stereoscopic systems, spectral gaps may be placed between adjacent passbands in stereoscopic eyewear and the output filter. The spectral gaps may be approximately 5 nanometers. The passbands of the output filter may be red-shifted relative to the eyewear passbands to provide low stereoscopic crosstalk across a wide range of light angles of incidence at the output filter as depicted and discussed with respect to at least FIG. 17.

Figure 10:
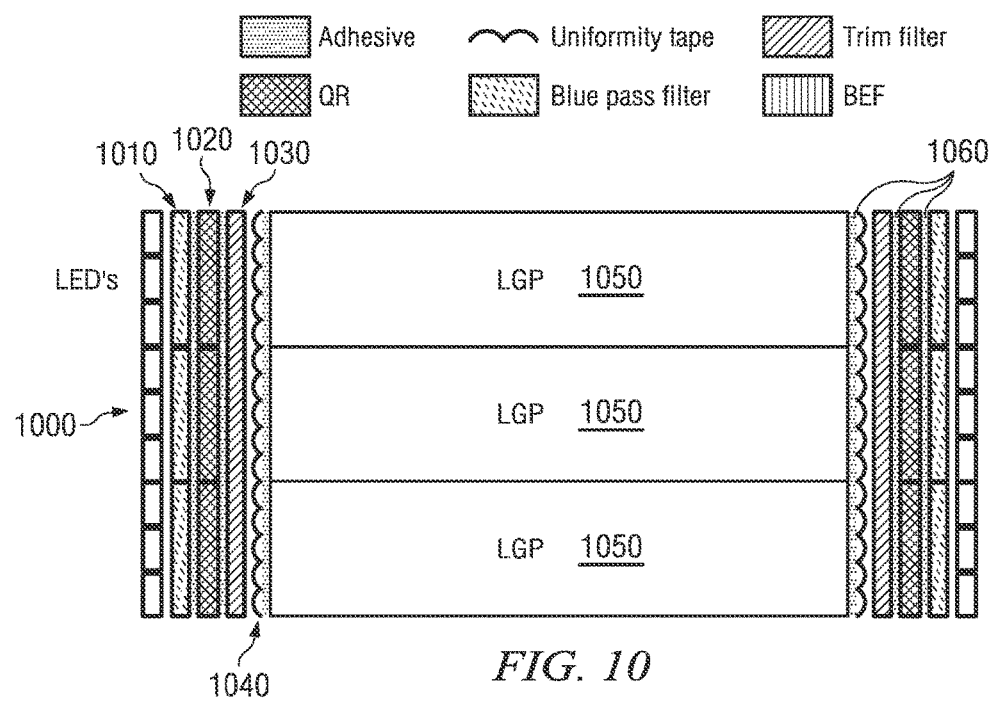
FIG. 10 is a schematic diagram illustrating an embodiment of a backlight structure, in accordance with the present disclosure.

As illustrated in FIG. 10, sources and quantum dots for each spectral emitter group may be stacked vertically at both ends of the light guide plate (LGP). FIG. 10 is a schematic diagram illustrating an embodiment of a backlight structure. The backlight structure 1005 of FIG. 10 includes a light source 1000, a pass filter 1010, an emitter region 1020, a trim filter 1030, a diffuser, 1040, and light guide plates 1050. The light source 1000, as well as the pass filter 1010, the emitter region 1020, the tri filter 1030, and the diffuser 1040, may be located at both ends of the LGPs to illuminate the LGPs from both sides during any particular image frame, thus creating a more uniform illumination source. Although the light source 1000 is illustrated in FIG. 10 as LEDs and discussed herein as LEDs, the light source 1000 may be any appropriate light source including, but not limited to, LEDs, lasers, laser diodes, semiconductor illumination sources, any combination thereof, and so forth. In FIG. 10, the pass filter 1010, emitter region 1020, and trim filter 1030 may be included in a cavity. The cavity will be discussed in further detail herein.

Continuing the discussion of FIG. 10, the light source 1000 may provide illumination to the pass filter 1010, which may transmit a wavelength band. In one example, the pass filter 1010 may be a blue pass filter. The pass filter 1010 may be any appropriate filter that provides the appropriate wavelengths. Further, the pass filter or passband filter may be any input filter operable to transmit a first wavelength band and operable to reflect a second wavelength band. In one example, short wavelength light may be provided to the emitter region and operable to function as an excitation source to the emitter or emitter material in the emitter region. In this example, the transmission wavelength band may be an approximate range of 400-480 nm and a reflective wavelength band may be an approximate range of 480-700 nm. The transmitted wavelengths or wavelength band may then be provided to the emitter region. The wavelength band may function to excite the emitter material. The emitter material may be phosphors or quantum dots, and may be excited by short wavelength light. Furthermore, the emitters may be tuned to emit light at one or more predetermined wavelengths, in which the one or more predetermined wavelengths may be longer than the excitation wavelength. The quantum dots may also be denoted herein as and/or referred to as "QR" or a quantum rail. Additionally, the terms emitters and emitter material may be used interchangeably herein. The output filter may be operable to transmit one or more wavelengths in which the transmitted wavelengths may have narrower bandwidths than the input light wavelengths.

Once the wavelength band is provided to the emitter region, the emitters may be excited by the short wavelength light and produce the appropriate wavelengths or wavelength bands or colors for a backlight. The wavelength bands may be broader than the desired narrow bandwidth, thus the trim filter 1030 may be employed. The trim filter may serve to narrow the emission wavelength bands received from the emitter region to the appropriate narrow wavelength bands employed by the LGPs. Some of the wavelengths may not pass through the trim filter as the wavelengths may not be within the appropriate narrow wavelength band transmitted through the trim filter. These wavelengths outside the narrow band may be "color recycled" and reflected back into the emission region and may serve to excite the emitters in the emission region to produce more light. This light may exit out back to the trim filter.

At the LGP entrance face as illustrated in FIG. 10, a diffuser or uniformity controlling film 1040 (such as the Uniformity Film offered by 3M Corporation) may be airspaced near, proximate to, attached to, molded to, any combination thereof, and so forth, by the LGP for increasing the angle of incidence's (AOI's) illumination inside the LPG. This allows for substantially uniform illumination distribution inside the LGP over a short optical path. The diffuser 1040 may be an optional element to the backlight.

As indicated in FIG. 10, the pass filter 1010 may be attached to the emitter region 1020 by an adhesive 1060. Similarly, the emitter region 1020 may be attached to the trim filter 1030 and the diffuser 1040 may be attached to the LGPs via an adhesive 1060. The adhesive may be any appropriate adhesive including, but not limited to, pressure sensitive adhesive tape, epoxy, UV glue, any combination thereof, and so forth To note, although in FIG. 10 the adhesive between the pass filter and emitter region, between the emitter region and the trim filter, and between the diffuser and the LGPs are all labeled as 1060, they may or may not be the same adhesive.

Figure 11:
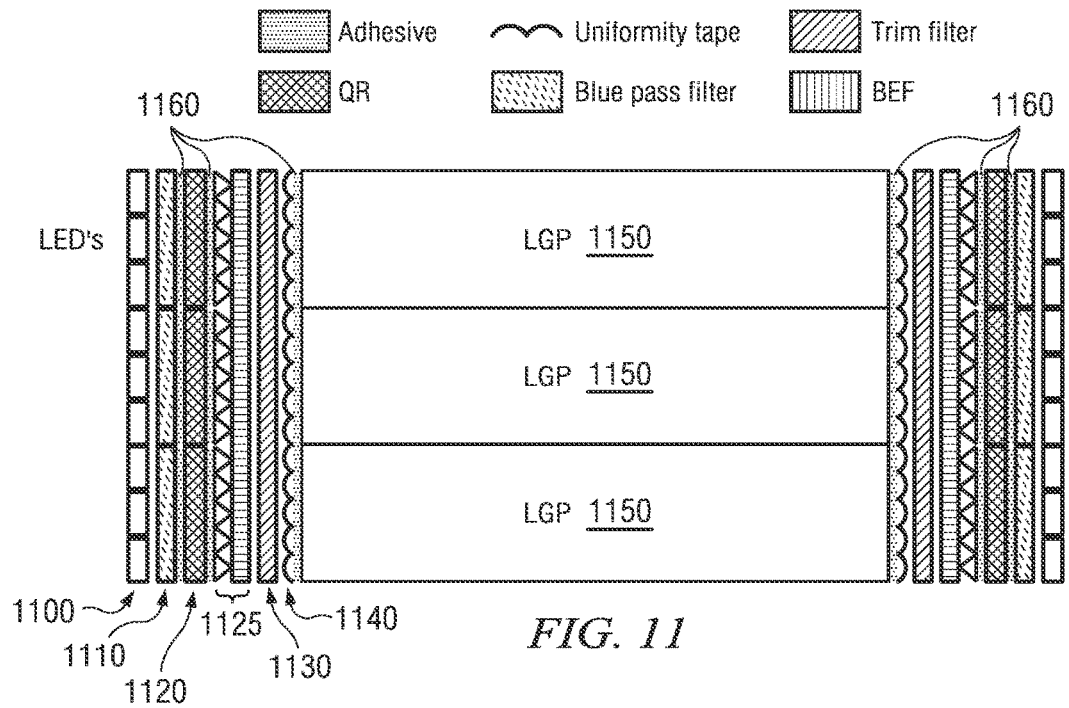
FIG. 11 is a schematic diagram illustrating another embodiment of a backlight structure, in accordance with the present disclosure.

Although FIG. 10 illustrates only nine LEDs that comprise the illumination source, fewer light sources or more light sources may comprise the illumination source. Likewise, although there are three light guiding panels, more LGPs, or fewer LGPs may be employed as appropriate. The quantum rail and the pass filter are depicted as three elements, for illustrative purposes only and not of limitation. There may be any number of quantum rails in the optical structure. The number of quantum rails may be primarily related to the vertical resolution of a panel, for example 1920×1080. In one embodiment, less than ten quantum rails may be employed in the optical structure. Additionally, although there are breaks illustrated between the quantum rails and the pass filters in FIG. 10, this is for illustrative purposes only and not of limitation. In the optical structure, breaks may be present, but may not cause a significant loss of uniformity. FIG. 11 is a schematic diagram illustrating another embodiment of a backlight structure, similar to FIG. 10. As illustrated in FIG. 11, another embodiment of a backlight structure 1105 may include an illumination source 1100, a pass filter 1110, an emission region 1120, a prismatic film 1125, a trim filter 1130, a diffuser 1140, and LGPs 1150. Similar to FIG. 10, the backlight structure 1105 also includes adhesive 1160.

As shown in FIG. 11, a prismatic film 1125 (such as BEF film offered by 3M Corporation) may be placed between the quantum dots and trim filter to control the angles of incidence through the trim filter. The quantum dots or emission region 1120 and pass filter 1110 may be integrated into the entrance of the prismatic film and similarly, the trim filter 1130 may be integrated into the prismatic film exit face. For example, the coatings may be deposited on the prismatic structure instead of making a separate plate for the coatings. Either one or both of the emission region 1120 and pass filter 110, and/or trim filter 1130 may be integrated into the prismatic film entrance and exit, respectively.

In yet another embodiment, the trim filters may be dichroic or polymeric filters may be added to the backlight structure to further narrow the emission in a particular color band, thus preventing undesirable emission resulting in desaturated color and stereo cross-talk as illustrated in FIGS. 10 and 11. If the trim filter is located at one end of the light guide plate, it also may serve to substantially reflect emissions of the other spectral emitter group located on the opposite side of the LGPs, back into the light guide plate, thus preventing undesirable emission resulting in desaturated color and stereo cross-talk.

Thickening the LCD's color filter array can also improve the narrowband emission and prevent adjacent or nearby colors from desaturating the color of interest.

As illustrated in both FIGS. 10 and 11, a pass-band filter may be located between the excitation or illumination source and the emission region or quantum dots. The passband filter may serve to substantially reflect light emitted from the quantum dots away from the excitation source and toward the light guide plate. Further, the passband filter may be any input filter operable to transmit a first wavelength band and operable to reflect a second wavelength band. In one example, the excitation source may be a blue LED, although the excitation source may be blue or ultraviolet. Generally, for phosphors and quantum dots, the appropriate excitation wavelength may be lower than the emission wavelength.

The transmission of dichroic trim filters may be dependent on the angle of incidence (AOI) of light entering the filter. The transmission bands may shift toward the blue part of the spectrum as the AOI increases. This can cause stereo cross-talk between the two eye views. A non-imaging optic (NIO) may be inserted between the substantially isotropically emitting quantum dots and trim filter to transform the emission from a high AOI source to a lower AOI source, thereby improving stereo contrast as illustrated in FIG. 12.

Figure 12:
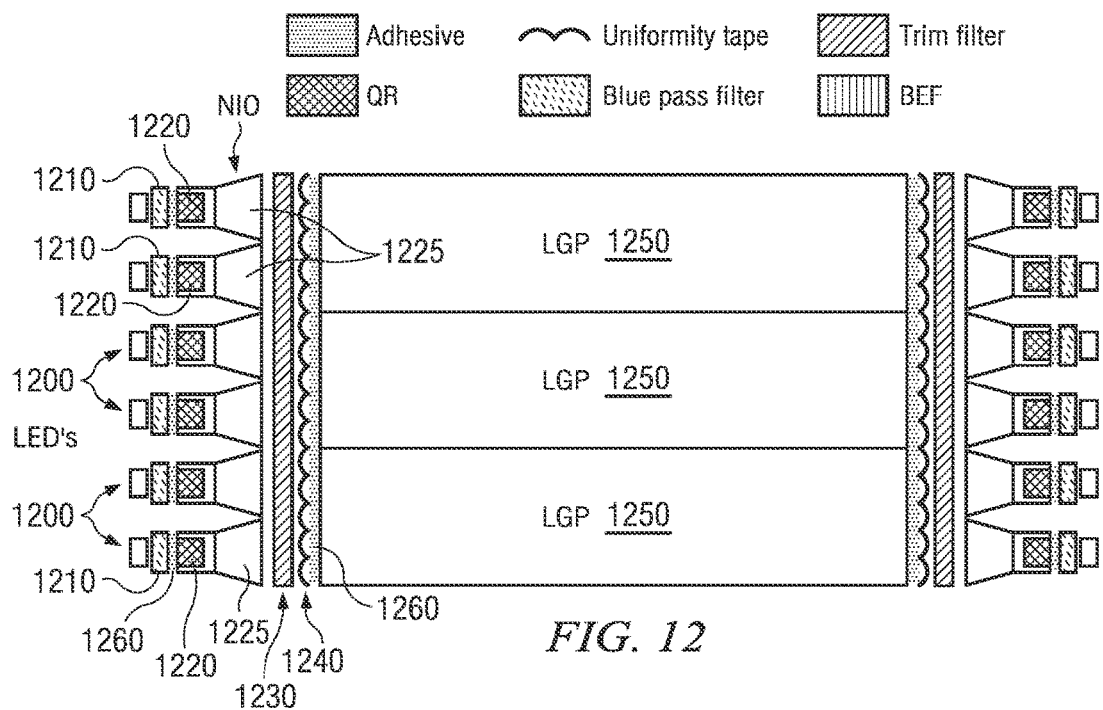
FIG. 12 is a schematic diagram illustrating another embodiment of a backlight structure, in accordance with the present disclosure.

FIG. 12 is a schematic diagram illustrating another embodiment of a backlight structure 1205. As shown in FIG. 12, the backlight structure 1205 includes illumination sources 1200, the pass filters 1210, the emissions region 1220, the non-imaging optics 1225, the trim filter 1230, the diffuser 1240 and the LGPs 1250. Similar to FIGS. 10 and 11, the backlight structure 1205 also includes adhesive 1260. The NIO may take the form of, but is not limited to, a tapered light pipe, a compound parabolic concentrator (CPC), a lens, any combination thereof, and so forth. In the case of the tapered light pipe or CPC, the taper may be in one or two dimensions and the structure may be filled with glass, plastic or air. If the NIO is tapered in one dimension, the angle of light in the approximately orthogonal dimension at the output of the NIO may be primarily controlled with a prismatic structure molded into the exit face of the NIO. Also, as illustrated in FIG. 12, the emission region or quantum dots 1220 may be integrated into the NIO. In FIG. 12, a gap is illustrated between the trim filter and the NIO. The trim filter and the NIO may be butt coupled together such that a substantial amount of the light may pass from the NIO to the filter. Alternatively, an adhesive layer may be between the trim filter and the NIO.

Although the pass filter is illustrated as individual elements, one pass filter for each NIO, the pass filter may be a larger filter that covers the input area of two, three, etc . . . , or all of the NIOs. Conversely, although the trim filter and the diffuser or uniformity tape are illustrated in FIG. 12 as a single piece, the trim filter and the diffuser may be more than one piece.

Figure 13:
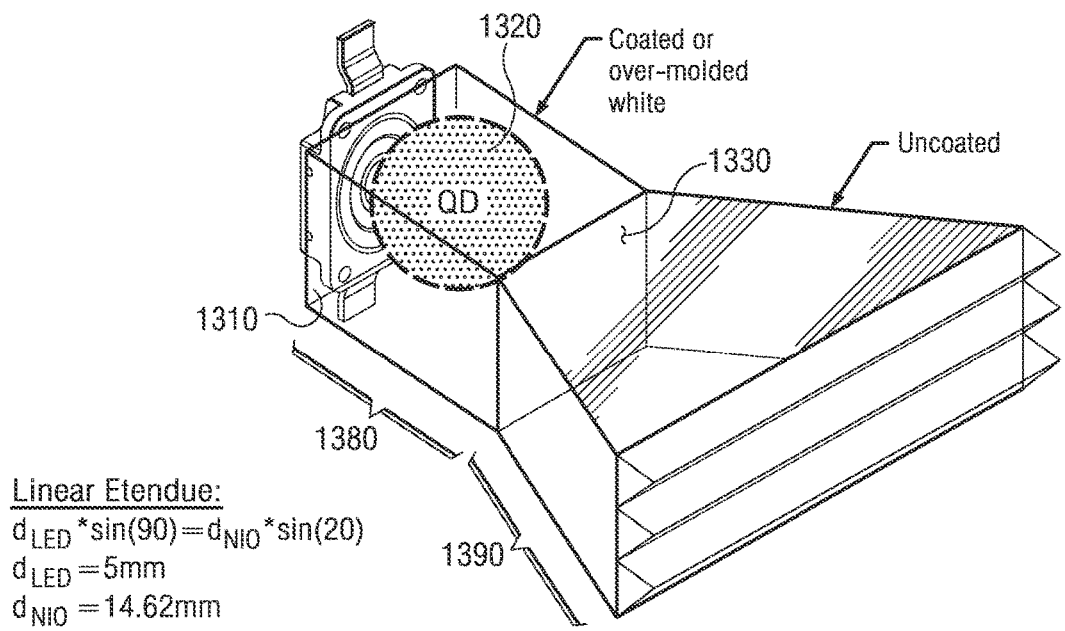
FIG. 13 is a schematic diagram illustrating an embodiment of non-imaging optical element, in accordance with the present disclosure.

FIG. 13 is a schematic diagram illustrating an embodiment of a non-imaging optical element. As shown in FIG. 13, the quantum dots or emitter region 1320, trim filter 1330, and blue filter 1310 may each be integrated into the NIO structure 1325. Stated differently, the blue filter and the trim filter may be coatings on the entrance and exit faces of the NIO, respectively. For example, the quantum dots, trim filter and the blue filter may be integrated by providing cavities for the quantum dot material or directly coating the filters at an exit or entrance face of the NIO as illustrated in FIG. 13. In FIG. 13, the pass filter 1310 may be created by coating the entrance face of the NIO 1325, and the trim filter 1330 may be created by coating the exit face and/or facets of the NIO 1325.

In the case of the quantum dots integrated into the NIO, the quantum dots may be contained in an integrating cavity, formed by coating or over-molding a white exterior to a light pipe, in which one face at or near the tapered end of the NIO is oriented substantially towards the excitation source, and another exit face is oriented substantially towards the angle transforming portion of the NIO, for example at the wide end of the tapered light pipe as illustrated in FIG. 13. As illustrated in FIG. 13, the cavity 1380 may be coated or over-molded white while the tapered region of the light pipe 1390 may be uncoated. The cavity may be coated in a white material to reflect and scatter the emissions from the isotropically emitting quantum dots back into the emitting material Additionally, the tapered region of the light pipe may be uncoated to maintain angles of incidence and enhance reflectivity in the light pipe by using total internal reflection. The NIO may function as an angle transforming element in the optical structure.

Figure 14:
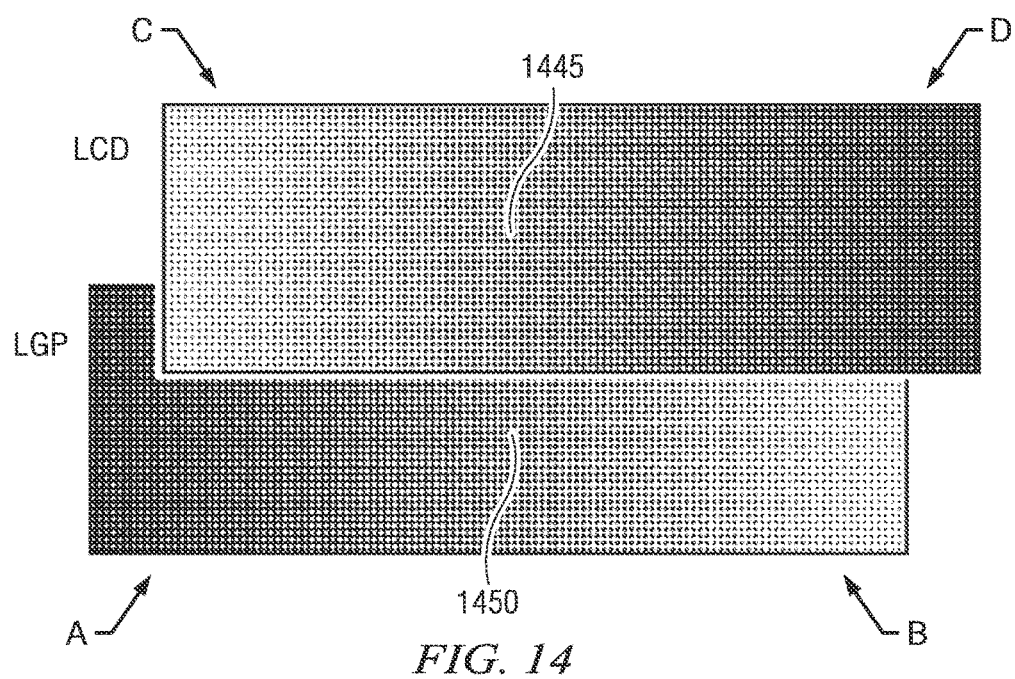
FIG. 14 is a schematic diagram illustrating an embodiment of an LCD transmission compensated for tapered illumination, in accordance with the present disclosure.

In the example of non-uniform illumination exiting the LGP(s), the LCD transmission may be tapered (electronically) to compensate for the non-uniform illumination and create a uniformly illuminated image as illustrated in FIG. 14. FIG. 14 is a schematic diagram illustrating an embodiment of an LCD transmission compensated for tapered illumination. As shown in the example of FIG. 14, the light guide plate 1450 may provide a non-uniform illumination. In this example, the light guide plate 1450 may provide less illumination on side A and more illumination on side B. To compensate for this non-uniform illumination, the LCD 1455 may electronically taper and may provide a higher transmission level on side C and lower transmission level on side D. As a result, the LCD display may appear substantially uniform.

Figure 16:
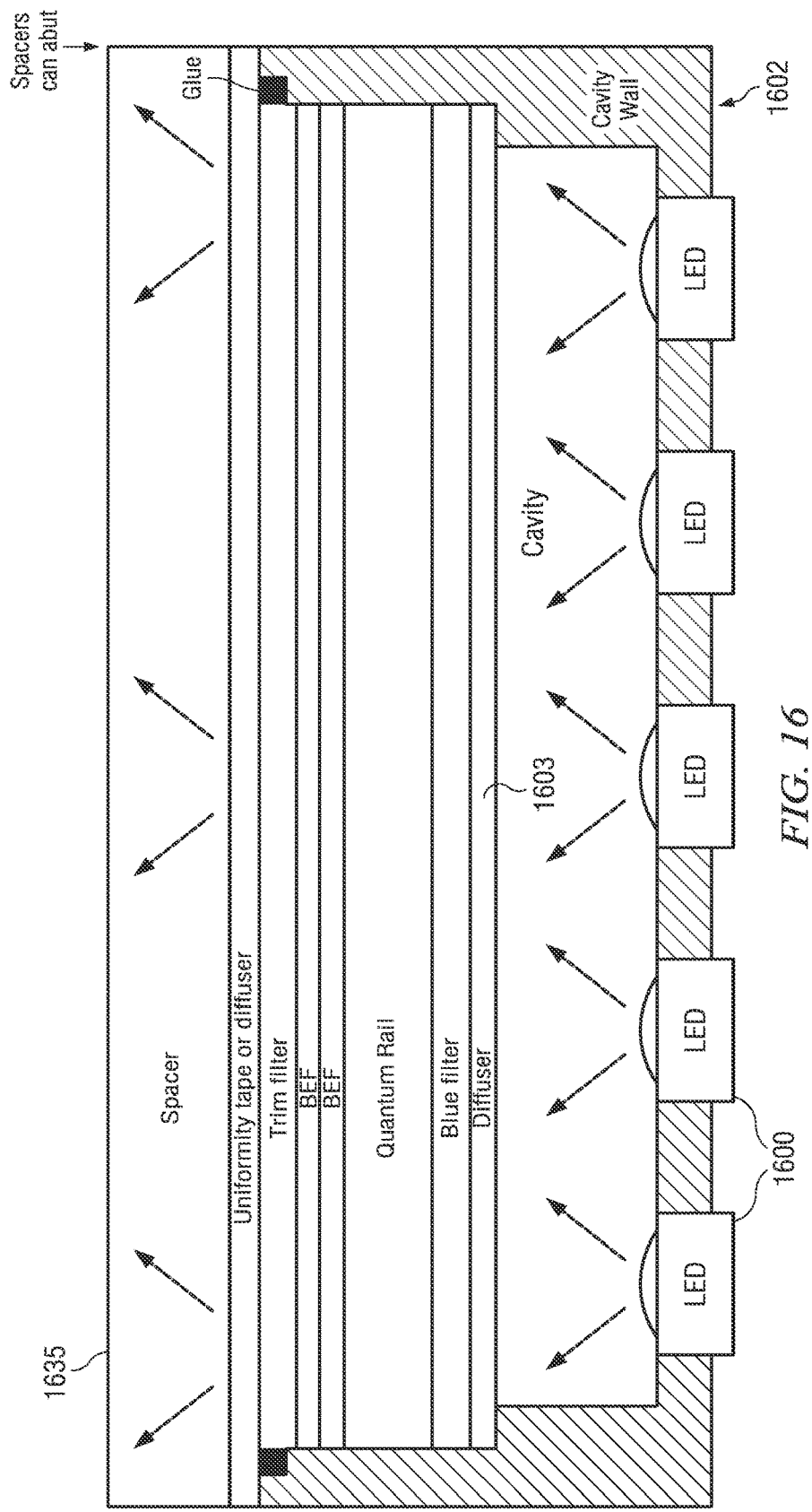
FIG. 16 is a schematic diagram illustrating an embodiment of a white cavity assembly, in accordance with the present disclosure.

FIG. 16 is a schematic diagram illustrating an embodiment of a white cavity assembly. Similar to previous figures, included in FIG. 16 is an illumination source 1600, a second diffuser 1603, a pass filter 1610, a quantum rail 1620, a prismatic filter 1625, a trim filter 1630, and a diffuser 1640. Also included in FIG. 16 is the cavity 1602, and a spacer region 1635. The spacer region 1635 may allow for nearby cavity assemblies to be abutted at the spacer edge and provide substantially uniform illumination over the spacer face The illumination source 1600, second diffuser 1603, pass filter 1610, quantum rail 1620, prismatic filter 1625, trim filter 1630, and diffuser 1640 may be contained in the cavity 1602. cavity 1602 may be a reflective cavity that may have white or metallized cavity walls, silvered walls any combination thereof, and so forth, for increasing the excitation light in the emitter region, and for increasing the amount of light exiting the output filter. Further, the end walls of the quantum rail may also be reflective, white, and/or metallized so that light may be substantially prevented from leaking, while the rest of the quantum rail may remain transmissive. Although only part of the illumination sources, specifically LEDs in FIG. 16, are contained within the cavity 1602, all of the illumination source may be contained within the cavity 1602, or light may be coupled into the cavity 1602 with the light source outside of the cavity 1602.

Figure 17:
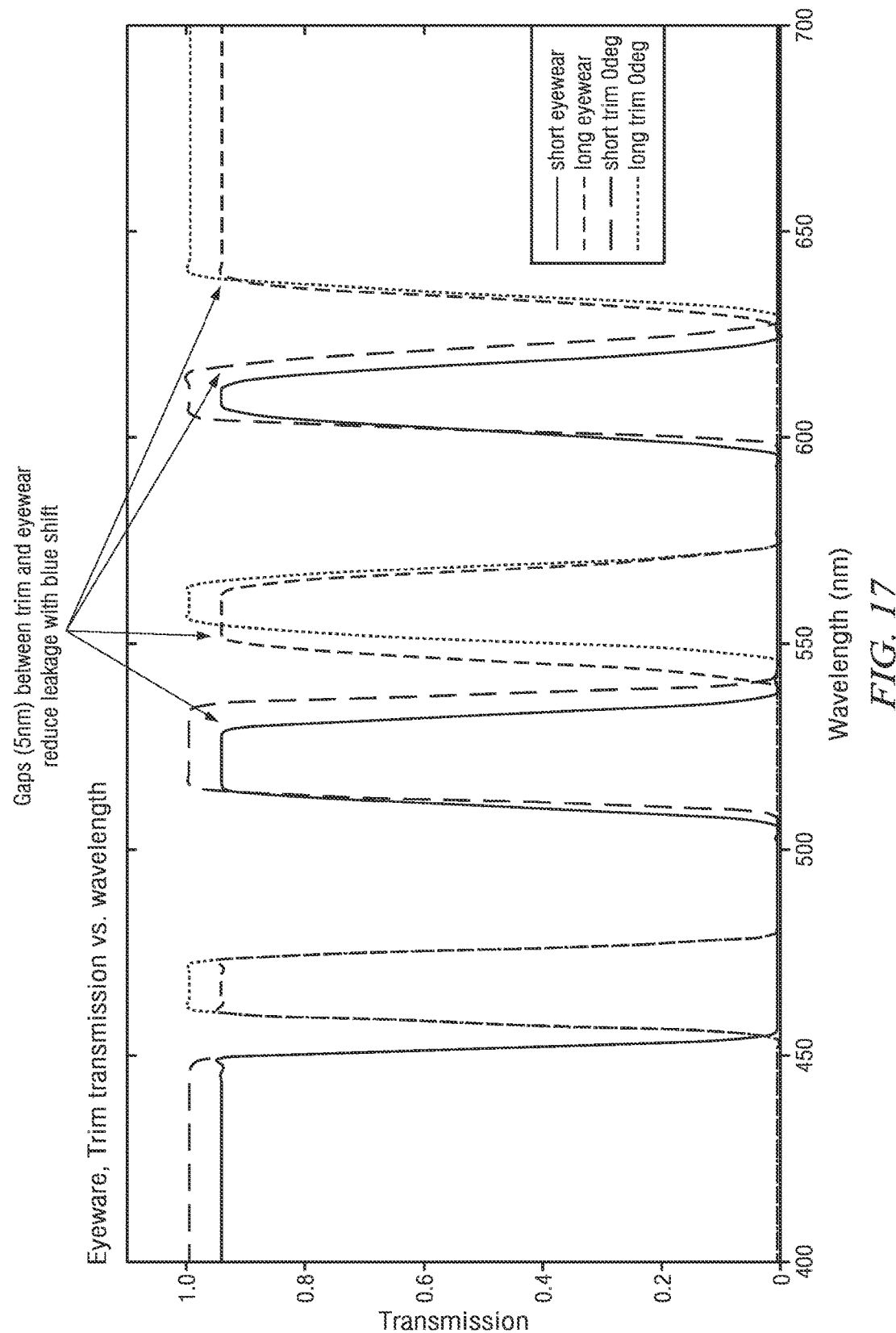
FIG. 17 is a graph illustrating a wavelength gap between a trim filter and eyewear, in accordance with the present disclosure.

Eyewear for decoding imagery, for example stereo imagery, from the multi-functional display may be implemented with dichroic filters or polymeric stacks of spectrally-dependent polarization controlling filters. In one example and as illustrated in FIG. 17, spectral gaps, for example approximately 5 nm, may be located between adjacent passbands in the stereoscopic eyewear and output filter of the backlight structure. FIG. 17 is a graph illustrating a wavelength gap between a trim filters and eyewear. The passbands of the output filter or trim filter of the backlight structure may be red-shifted relative to the eyewear passbands to provide low stereoscopic crosstalk across a wide range of light angles of incidence at the output filter.

As described herein, a backlight for a multi-functional LCD display may include a wide color gamut and high stereo contrast. Additionally, better light efficiency, high color correction efficiency and good left/right luminance balance may be achieved.

Figure 18:
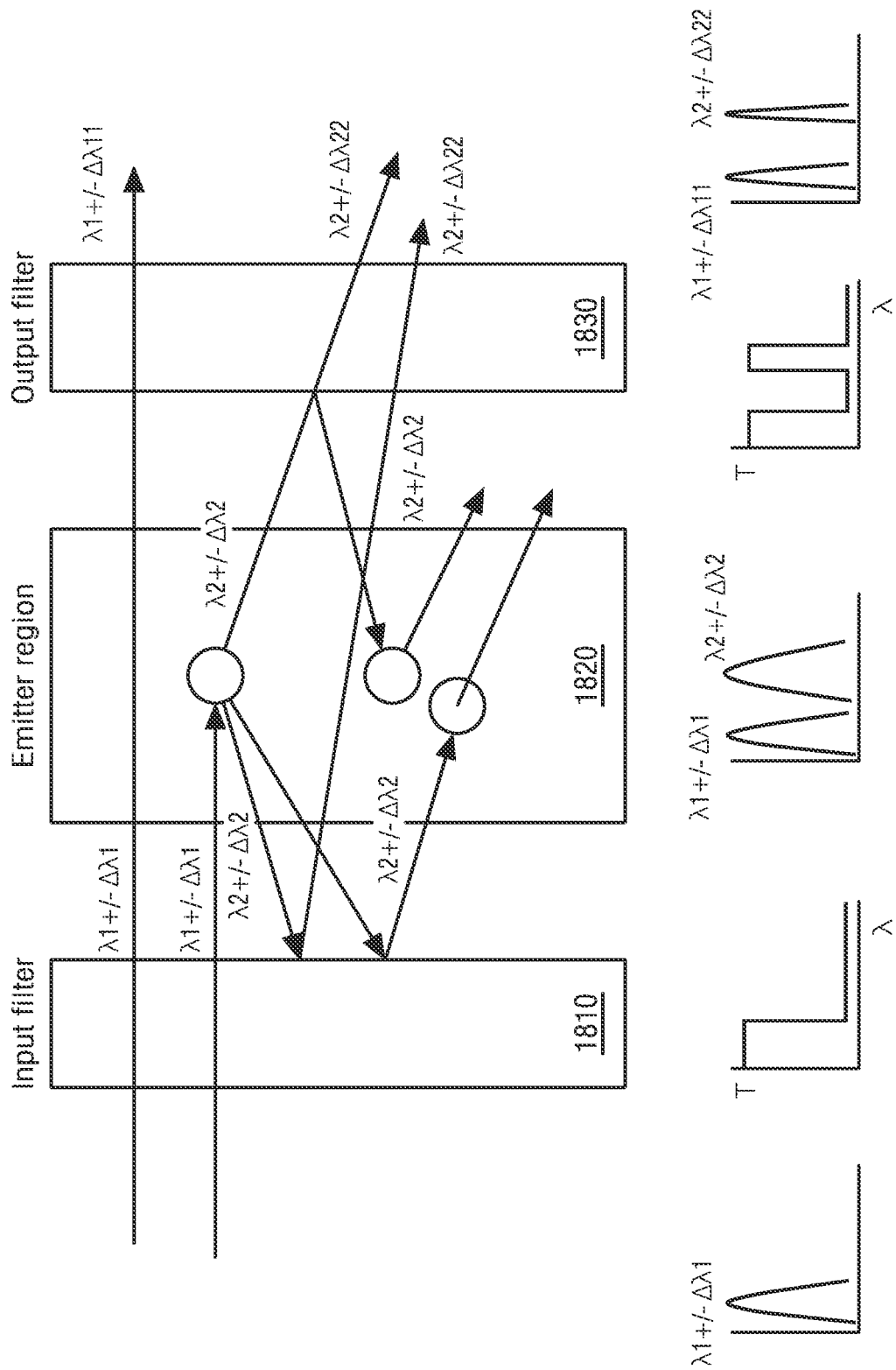
FIG. 18 is a schematic diagram illustrating a reduction in leakage with a blue shift between a trim filter and eyewear transmission, in accordance with the present disclosure.

In one embodiment, an optical structure may be a narrowband, highly color saturated light source for a liquid-crystal display backlight or general lighting, for example, precision color lighting. The optical structure may also be used to produce more saturated colors for a wider display color gamut and also may be used to produce a brighter backlight structure through light recycling of the wider bandwidth light back into the optical structure. As illustrated in FIG. 18, the optical structure may include at least an excitation source for example blue LEDs (not shown in FIG. 18), and an input filter 1810 for transmitting a first band of wavelengths and reflecting a second band of wavelengths.

FIG. 18 is a schematic diagram illustrating a reduction in leakage with a blue shift between a trim filter and eyewear transmission. As shown in FIG. 18, an input filter 1810 may receive initial light or illumination from an excitation source or illumination source. The initial light may pass through the input filter 1810 and enter the emitter region 1820. The initial light may pass directly through the emission region and additionally through the output filter 1830. Alternatively, the initial light at the input filter 1810 may encounter some emitters in the emission region 1820. Once excited by the initial light, the emitters may produce emitted light which may be a second subset of light. The emitted light may be directed either back towards the input filter 1810 or in the other direction to the output filter 1830. The emitted light at the input filter 1810 may be reflected off of the input filter and back to the emitter region, and the light recycling process may start over. Meanwhile, the emitted light directed at the output filter 1830 may be partially directed through the output filter and partially reflected back to the emitter region 1820. The partially reflected light in the emitter region 1820 begins the light recycling process again.

In one embodiment, the transmitted first band of wavelengths may be $\lambda_{blue1}+/-\Delta\lambda_{blue1}$ and the reflected second band of wavelengths may be $\lambda_{yellow1}+/-\Delta\lambda_{yellow1}$. The light source may also include an emitter region. The emitter material may be phosphors or quantum dots, and may be excited by short wavelength light, for example, $\lambda_{blue1}+/-\Delta\lambda_{blue1}$. The emitter material may also be tuned to emit light at approximately one or more particular longer wavelengths, for example, $\lambda_{green1}+/-\Delta\lambda_{green1}$, and/or $\lambda_{red1}+/-\Delta\lambda_{red1}$. The light source may also include an output filter for transmitting one or more bands of wavelengths, for example, $\lambda_{blue1}+/-\Delta\lambda_{blue11}$, $\lambda_{green1}+/-\Delta\lambda_{green11}$, and/or $\lambda_{red1}+/-\Delta\lambda_{red11}$, in which the bandwidths of transmitted light may be substantially narrower than the input light.

As previously described, the light outside of the narrowed bandwidths may be substantially reflected by the output filter back toward the emitter region and input filter, and may have an opportunity to excite emitter material and produce light, which may then be transmitted through the output filter. The light generated or produced by the emitter region may also travel back toward the input filter and may be reflected by the input filter toward the output filter to substantially enhance the brightness of the output light. In one example, the input and output filters may be dichroic filters and may be constructed using thin film deposition technology. Further to this example, an angle reducing element, for example, a prismatic tape such as 3M BEF II or an angle-transforming non-imaging optic such as a tapered light pipe or compound parabolic concentrator, may be placed between the emitter region and output filter to substantially control the angles of incidence of light approximately at the filter plane for less filter cutoff angle shift.

FIG. 15 is a schematic diagram illustrating an embodiment of another backlight structure. Included in FIG. 15 are an illumination source 1500, a diffuser 1542, a pass filter 1510, an emission region 1520, a prismatic film 1525, a tri filter 1530, a diffuser 1540, and an LGP 1550. The diffusers 1542 and the diffuser 1540 are optional. Additionally, the optical structure of FIG. 15 may or may not employ the prismatic film 1525. Further, the illumination sources 1500 are noted as LEDs, but may be any appropriate illumination source as described herein.

FIG. 15 illustrates an angle increasing element such as diffuser film 1540, roughened optical surface or lenticular lens film, may also be located after the output or trim filter 1530 to improve the uniformity of light entering the light guide plate portion of the backlight. FIG. 15 also illustrates that an integrator 1507 such as a white-walled cavity, light pipe, and/or diffuser, may be placed between the excitation source such as LEDs and input filter or pass filter 1510 to substantially homogenize the excitation light prior to reaching the emitter region 1520. In FIG. 15, the integrator, diffuser, blue filter, emitter, BEF sheets, and trim filter may be stacked inside of a cavity as illustrated in FIG. 16.

In one example, more than one structure may be used to produce two sets of colors, for example, R1G1B1 and R2G2B2, for use in a stereoscopic backlit liquid crystal display as illustrated in FIG. 20. Also as illustrated in FIG. 20, the optical structures may be spectrally distinct and may illuminate the same light guide plate, and may be driven in time-sequential fashion to illuminate the light guide plate in approximate synchrony with left and right eye images sequentially driven to the liquid crystal display panel. Although illustrated as a single optical structure paired to a single LGP, more than one optical structure may be paired to a single LGP and multiple LGPs may be paired to a single optical structure, and so forth. FIG. 20 will be described in further detail below.

Figure 19:
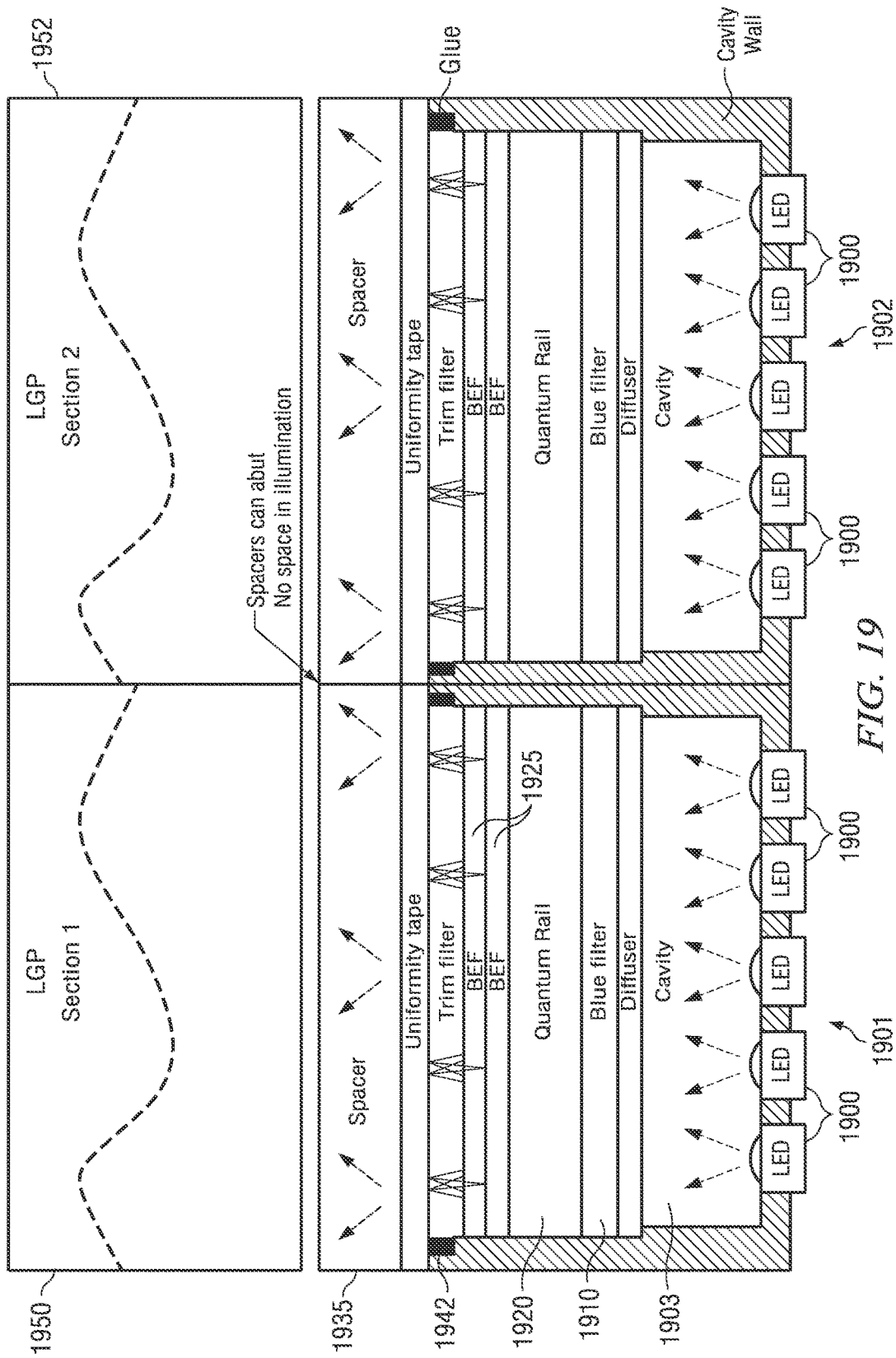
FIG. 19 is a schematic diagram illustrating an embodiment of abutting optical structures and light guide plate sections, in accordance with the present disclosure.

FIG. 19 is a schematic diagram illustrating an embodiment of abutting optical structures and light guide plate sections. FIG. 19 includes optical structure 1901A and optical structure 1902, LGP 1950 and LGP 1952. Optical structures 1 and 2 may both include an illumination source 1900, a cavity 1903 and a spacer 1935. The cavity 1903 may include a diffuser 1942, a pass filter 1910, an emission region 1920, a prismatic film 1925, a trim filter 1930, and a diffuser 1940. The elements depicted in FIG. 19 are comparable to similarly named elements in the figures, examples, and embodiments previously described. Although FIG. 19 illustrates only two optical structures and two LGPs, any number of optical structures and LGPs may be employed in any combination. For example, one optical structure may be associated with one or more LGPs, one LGP may be associated with one of more optical structures, of any combination of optical structures and LGPs may be associated with one another.

As illustrated in FIG. 19, an optical spacer 1935 such as an optically thick plate may be included between the output filter and light guide plate to allow substantially seamless abutting of optical structures along the side of a light guide plate such that the gap in illumination may be substantially reduced or eliminated. The optical structures of FIG. 19 may be proximate to one another, abutting, adjacent to one another, and so forth.

FIG. 20 is a schematic diagram illustrating an embodiment of a stereoscopic scrolling backlight structure. As illustrated in FIG. 20, a stereoscopic image may be addressed to the LCD and the backlight may be scrolled such that left and right eye images on the LCD are illuminated by substantially spectrally separated sources from separate optical structures. The left and right images may be separated by a dark band of illumination during the LC switching period for high contrast and low stereoscopic crosstalk.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and are not limiting. Thus, the breadth and scope of the embodiment(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An optical structure for providing light to a display, comprising:
    an excitation source operable to transmit illumination;
    an input filter operable to receive illumination from the excitation source and operable to substantially transmit a first wavelength band of light and substantially reflect a second wavelength band of light;
    an emitter region with emitters, wherein the emitter region is operable to receive at least the first wavelength band light, and the emitters are operable to be excited by at least the first wavelength band of light and emit a third wavelength band of light; and
    an output filter operable to receive at least the third wavelength band of light from the emitter region, and operable to output at least a fourth wavelength band of light in which the bandwidth of the fourth wavelength band of light is narrower than the bandwidth of the third wavelength band of light, wherein the display receives addressing for a stereoscopic image, and a first light guide plate and a second light guide plate are scrolled so that a left image and a right image are illuminated by spectrally separated sources.

2. The optical structure for providing light to a display of claim 1, wherein the input filter comprises a dichroic filter and the output filter comprises a dichroic filter.

3. The optical structure for providing light to a display of claim 1, further comprising a cavity surrounding at least the input filter, the emitter region and the output filter, wherein the cavity is operable to receive illumination from the excitation source.

4. The optical structure for providing light to a display of claim 3, wherein the cavity further comprises at least one of white or metallized internal walls.

5. The optical structure for providing light to a display of claim 1, further comprising an angle reducing element operable to receive illumination from the emitter region.

6. The optical structure for providing light to a display of claim 5, wherein the angle reducing element further comprises prismatic tape.

7. The optical structure for providing light to a display of claim 1, further comprising an angle transforming non imaging optic operable to receive illumination from at least the excitation source.

8. The optical structure for providing light to a display of claim 7, wherein the angle transforming non imaging optic is one of a light pipe or compound parabolic concentrator.

9. The optical structure for providing light to a display of claim 1, further comprising an angle increasing element operable to receive light from the output filter.

10. The optical structure for providing light to a display of claim 1, further comprising an optical spacer located between the output filter and at least a first light guide plate.

11. The optical structure for providing light to a display of claim 3, further comprising, an integrator located between the excitation source and the input filter.

12. The optical structure for providing light to a display of claim 1, wherein the emitters are tuned to emit light at a wavelength longer than the light received from the input filter.

13. A method for backlighting a display, comprising:
    providing at least a first wavelength band of light from an illumination source;
    receiving the first wavelength band of light at an input filter and transmitting the first wavelength band of light through the input filter;

receiving the first wavelength band of light at an emitter region and exciting emitters in the emitter region, thereby producing at least a second wavelength band of light, and transmitting at least some of the first wavelength band of light through the emitter region;

receiving the at least second wavelength band of light at an output filter and outputting a third wavelength band of light in which the bandwidth of the third wavelength of light is narrower than the bandwidth of the at least second wavelength of light; and receiving at least some of the first wavelength band of light from the emitter region at an output filter and transmitting a fourth wavelength band of light, wherein the bandwidth of the fourth wavelength band of light is narrower than the first wavelength band of light from the with emitter region, wherein the display receives addressing for a stereoscopic image, and a first light guide plate and a second light guide plate are scrolled so that a left image and a right image are illuminated by spectrally separated sources.

14. The method for backlighting a display of claim 13, further comprising receiving a third wavelength band of light at the input filter produced by the emitter region.

15. The method for backlighting a display of claim 13, further comprising directing wavelengths of light outside of the bandwidth of the third wavelength band of light back towards the emitter region.

16. The method for backlighting a display of claim 15, wherein receiving the wavelengths of light outside of the bandwidth of the third wavelength band of light at the emitter region further comprises exciting emitters in the emitter region and producing light within the bandwidth of the third wavelength of light.

17. The method for backlighting a display of claim 14, further comprising directing the third wavelength band of light back towards the output filter.

18. The method of backlighting a display of claim 13, further comprising scrolling the light guide plates so that a first image and a second image on the display are illuminated by spectrally separated sources.

\* \* \* \* \*